US010149318B2

(12) United States Patent
Sun et al.

(10) Patent No.: US 10,149,318 B2
(45) Date of Patent: Dec. 4, 2018

(54) TECHNIQUES FOR TRANSMITTING AND RECEIVING DOWNLINK CONTROL INFORMATION FOR A SET OF NOMA DOWNLINK TRANSMISSIONS

(71) Applicant: QUALCOMM Incorporated, San Diego, CA (US)

(72) Inventors: Jing Sun, San Diego, CA (US); Tao Luo, San Diego, CA (US); Yongbin Wei, La Jolla, CA (US); Durga Prasad Malladi, San Diego, CA (US); Siddhartha Mallik, San Diego, CA (US); Xiaoxia Zhang, San Diego, CA (US); Hao Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 514 days.

(21) Appl. No.: 14/812,983

(22) Filed: Jul. 29, 2015

(65) Prior Publication Data

US 2016/0066345 A1 Mar. 3, 2016

Related U.S. Application Data

(60) Provisional application No. 62/044,787, filed on Sep. 2, 2014, provisional application No. 62/044,850, filed on Sep. 2, 2014.

(51) Int. Cl.
*H04W 74/00* (2009.01)
*H04W 72/08* (2009.01)
(Continued)

(52) U.S. Cl.
CPC ......... *H04W 74/006* (2013.01); *H04J 11/004* (2013.01); *H04W 72/082* (2013.01); *H04W 72/121* (2013.01); *H04W 72/1289* (2013.01)

(58) Field of Classification Search
CPC ............... H04B 7/0619; H04L 5/0048; H04L 29/06319
See application file for complete search history.

(56) References Cited

U.S. PATENT DOCUMENTS 9,344,229 B2 * 5/2016 Huang ................... H04L 5/0007
9,572,145 B2 * 2/2017 Johansson ........... H04W 72/042
(Continued)

FOREIGN PATENT DOCUMENTS

WO WO-2013068834 A1 5/2013

OTHER PUBLICATIONS

IPEA/EPO, Partial International Search Report of the International Preliminary Examining Authority, Int'l. App. No. PCT/US2015/042818, dated Oct. 28, 2015, European Patent Office, Rijswijk, NL, 10 pgs.

(Continued)

*Primary Examiner* — Rasheed Gidado
(74) *Attorney, Agent, or Firm* — Holland & Hart LLP

(57) ABSTRACT

Techniques are described for wireless communication. A first method includes receiving downlink control information for a first UE based at least in part on a group identifier associated with a NOMA group including the first UE and at least a second UE; and receiving a set of NOMA downlink transmissions at the first UE based at least in part on the downlink control information for the first UE. A second method includes receiving downlink control information for a first UE, the downlink control information for the first UE including an indication of at least a second UE; receiving downlink control information for the second UE based at least in part on the indication of at least the second UE; and receiving a set of NOMA downlink transmissions at the first
(Continued)

UE based at least in part on the downlink control information for the first UE and the downlink control information for the second UE.

29 Claims, 35 Drawing Sheets

(51) Int. Cl.
*H04W 72/12* (2009.01)
*H04J 11/00* (2006.01)

(56) References Cited

U.S. PATENT DOCUMENTS

| | | | | |
|---|---|---|---|---|
| 9,584,206 | B2* | 2/2017 | Kim | H04B 7/0452 |
| 9,749,819 | B2* | 8/2017 | Sun | H04W 4/08 |
| 2011/0164536 | A1* | 7/2011 | Lin | H04B 7/155 |
| | | | | 370/259 |
| 2012/0315938 | A1* | 12/2012 | Van Nee | H04B 7/0434 |
| | | | | 455/507 |
| 2013/0148563 | A1* | 6/2013 | Brueck | H04W 4/06 |
| | | | | 370/312 |
| 2013/0173905 | A1* | 7/2013 | Inatomi | H04L 9/0662 |
| | | | | 713/150 |
| 2013/0195041 | A1* | 8/2013 | Papasakellariou | H04W 72/042 |
| | | | | 370/329 |
| 2013/0196700 | A1* | 8/2013 | Tiirola | H04J 11/0043 |
| | | | | 455/501 |
| 2013/0196701 | A1* | 8/2013 | Tiirola | H04J 11/0026 |
| | | | | 455/501 |
| 2015/0312074 | A1* | 10/2015 | Zhu | H04L 27/2627 |
| | | | | 370/329 |
| 2016/0205695 | A1* | 7/2016 | Kishiyama | H04W 72/082 |
| | | | | 370/315 |
| 2016/0219529 | A1* | 7/2016 | Benjebbour | H04W 52/14 |

OTHER PUBLICATIONS

Saito et al., "Non-Orthogonal Multiple Access (NOMA) for Cellular Future Radio Access," 2013 IEEE 77th Vehicular Technology Conference (VTC Spring), Dresden, Jun. 2-5, 2013, 5 pgs., ISSN 1550-2252, Institute of Electrical and Electronics Engineers.

* cited by examiner

2100

Uplink - downlink configurations

| Uplink - downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 21

TECHNIQUES FOR TRANSMITTING AND RECEIVING DOWNLINK CONTROL INFORMATION FOR A SET OF NOMA DOWNLINK TRANSMISSIONS

CROSS REFERENCES

The present application for patent claims priority to U.S. Provisional Patent Application No. 62/044,787 by Sun et al., entitled "Techniques for Transmitting and Receiving Downlink Control Information for a Set of NOMA Downlink Transmissions," filed Sep. 2, 2014, and U.S. Provisional Application No. 62/044,850 by Sun et al., entitled "Techniques for Canceling Interference by Wireless Devices," filed Sep. 2, 2014, assigned to the assignee hereof, and expressly incorporated by reference herein.

FIELD OF THE DISCLOSURE

The present disclosure, for example, relates to wireless communication systems, and more particularly to techniques for transmitting and receiving downlink control information for a set of non-orthogonal multiple access (NOMA) downlink transmissions.

BACKGROUND

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and NOMA systems. Additionally, some systems may operate using time-division duplex (TDD), in which a single carrier is used for both uplink and downlink communications, and some systems may operate using frequency-division duplex (FDD), in which separate carrier frequencies are used for uplink and downlink communications.

By way of example, a wireless multiple-access communication system may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station).

As wireless communications systems become more congested, operators are seeking ways to increase capacity. Various approaches include the use of small cells, the use of an unlicensed radio frequency spectrum band, or the use of wireless local area networks (WLANs) to offload some of the traffic or signaling of a wireless communication system. Another approach includes the transmission of a set of NOMA downlink transmissions to increase the capacity of a wireless communication system. The transmission of a set of NOMA downlink transmissions may increase capacity using existing system resources. Many of the approaches for enhancing capacity may cause interference with concurrent communications in a cell. In order to provide enhanced data rates through a wireless communication system, it may be beneficial to mitigate such interference.

SUMMARY

The present disclosure, for example, relates to one or more techniques for transmitting and receiving downlink control information for a set of NOMA downlink transmissions. A set of NOMA downlink transmissions may include downlink transmissions for multiple UEs, including, for example, a first downlink transmission for a first UE and a second downlink transmission for a second UE. The resources (e.g., resource blocks) used by the second downlink transmission may partially or fully overlap the resources used by the first downlink transmission. In some examples, a UE may perform one or more interference cancellation operations on a set of NOMA downlink transmissions, to cancel downlink transmissions that are not intended for the UE, and to enable an identification of a downlink transmission that is intended for the UE. To perform an interference cancellation operation on a set of NOMA downlink transmissions, a UE may need to know the parameters for the downlink transmission(s) to be canceled.

Prior to transmitting a set of NOMA downlink transmissions, a base station may transmit downlink control information to each of the UEs having a downlink transmission in the set of NOMA downlink transmissions. Techniques disclosed herein enable downlink control information to be transmitted such that a first UE may receive the downlink control information for at least a second UE, thereby enabling the first UE to obtain the parameters for a downlink transmission for at least the second UE. A first set of techniques involves the definition of a NOMA group, in which a group of UEs, for which downlink transmissions may be included in a NOMA group, is assigned a group identifier. Downlink control information for the downlink transmissions included in a set of NOMA downlink transmissions may then be transmitted and received using the group identifier (e.g., encoded and decoded using the group identifier), such that any UE having knowledge of the group identifier may receive the downlink control information of any UE in the NOMA group. A second set of techniques involves blindly detecting the downlink control information for the UEs for which downlink transmissions are included in a set of NOMA downlink transmissions. A third set of techniques involves including an indication of at least a second UE, which second UE has a downlink transmission included in a set of NOMA downlink transmissions, in the downlink control information for a first UE having a downlink transmission included in the set of NOMA downlink transmissions. The first UE may use the indication of at least the second UE to receive downlink control information for at least the second UE. A fourth set of techniques involves the forwarding of downlink control information for a second UE, which second UE has a downlink transmission included in a set of NOMA downlink transmissions, to a first UE having a down link transmission included in the set of NOMA downlink transmissions.

In a first set of illustrative examples, a method for wireless communication is described. In one configuration, the method may include receiving downlink control information for a first UE based at least in part on a group identifier associated with a NOMA group including the first UE and at least a second UE. The method may also include receiving a set of NOMA downlink transmissions at the first UE based at least in part on the downlink control information for the first UE.

In some examples of the method, receiving the downlink control information for the first UE may include receiving the downlink control information for the first UE based at least in part on a deterministic function of the group identifier and a UE identifier assigned to the first UE In some examples, the method may include receiving the group identifier from a base station. In some examples, the group identifier may be received from the base station during a random access procedure.

In some examples of the method, the downlink control information for the first UE may reference a first UE identifier assigned to the first UE. In some examples, the method may include identifying the downlink control information for the first UE based at least in part on the first UE identifier. In some examples, the method may include identifying, in the set of NOMA downlink transmissions, a first downlink transmission for the first UE using a first RNTI based at least in part on the first UE identifier. In some examples of the method, the first RNTI may be based at least in part on a deterministic function of the first UE identifier and the group identifier.

In some examples, the method may include receiving downlink control information for at least the second UE based at least in part on the group identifier associated with the NOMA group. In some examples of the method, receiving the downlink control information for the second UE may include receiving the downlink control information for the second UE based at least in part on a deterministic function of the group identifier and a second UE identifier assigned to the second UE. In some examples, the method may include receiving a range of UE identifiers associated with the NOMA group. The range of UE identifiers may include at least the second UE identifier.

In some examples, the method may include determining, based at least in part on the downlink control information for the first UE and the downlink control information for at least the second UE, that an interfering transmission overlaps a downlink transmission for the first UE. In some examples, the method may include performing an interference cancellation operation on the interfering transmission based at least in part on the downlink control information for at least the second UE. In some examples of the method, the downlink control information for at least the second UE may reference a second UE identifier assigned to the second UE. In some examples of the method, the interference cancellation operation may be performed using a second RNTI based at least in part on the second UE identifier. In some examples of the method, the second RNTI may be based at least in part on a deterministic function of the second UE identifier and the group identifier. In some examples of the method, receiving the downlink control information for at least the second UE may include receiving all downlink control information associated with the NOMA group based at least in part on the group identifier.

In a second set of illustrative examples, an apparatus for wireless communication is described. In one configuration, the apparatus may include means for receiving downlink control information for a first UE based at least in part on a group identifier associated with a set of NOMA group including the first UE and at least a second UE. The apparatus may also include means for receiving a set of NOMA downlink transmissions at the first UE based at least in part on the downlink control information for the first UE. In some examples, the apparatus may further include means for implementing one or more aspects of the method for wireless communication described above with respect to the first set of illustrative examples.

In a third set of illustrative examples, another apparatus for wireless communication is described. In one configuration, the apparatus may include a processor, and memory coupled to the processor. The processor may be configured to receive downlink control information for a first UE based at least in part on a group identifier associated with a set of NOMA group including the first UE and at least a second UE. The processor may also be configured to receive a set of NOMA downlink transmissions at the first UE based at least in part on the downlink control information for the first UE. In some examples, the processor may further be configured to implement one or more aspects of the method for wireless communication described above with respect to the first set of illustrative examples.

In a fourth set of illustrative examples, a computer-readable medium for storing instructions executable by a processor is described. In one configuration, the computer-readable medium may include instructions to receive downlink control information for a first UE based at least in part on a group identifier associated with a set of NOMA group including the first UE and at least a second UE. The computer-readable medium may also include instructions to receive a set of NOMA downlink transmissions at the first UE based at least in part on the downlink control information for the first UE. In some examples, the computer-readable medium may also include instructions to implement one or more aspects of the method for wireless communication described above with respect to the first set of illustrative examples.

In a fifth set of illustrative examples, another method for wireless communication is described. In one configuration, the method may include receiving downlink control information for a first UE, the downlink control information for the first UE including an indication of at least a second UE. The method may also include receiving downlink control information for the second UE based at least in part on the indication of at least the second UE, and receiving a set of NOMA downlink transmissions at the first UE based at least in part on the downlink control information for the first UE and the downlink control information for the second UE.

In some examples of the method, the indication of at least the second UE may include an indication of the second UE, and receiving the downlink control information for the second UE may include receiving the downlink control information for the second UE based at least in part on the indication of the second UE.

In some examples, the method may include determining, based at least in part on the downlink control information for the first UE and the downlink control information for at least the second UE, that an interfering transmission overlaps a first downlink transmission for the first UE. In these examples, the method may also include performing an interference cancellation operation on the interfering transmission based at least in part on the downlink control information for at least the second UE.

In some examples of the method, the indication of at least the second UE may include an RNTI associated with the second UE. In some examples of the method, the indication of at least the second UE may include an index associated with a set of other UEs that can be configured to operate in a NOMA group with the first UE. In some examples, the method may include determining an RNTI associated with the second UE based at least in part on the index.

In a sixth set of illustrative examples, another apparatus for wireless communication is described. In one configuration, the apparatus may include means for receiving downlink control information for a first UE. The downlink control information for the first UE may include an indication of at least a second UE. The apparatus may also include means for receiving downlink control information for the second UE based at least in part on the indication of at least the second UE, and means for receiving a set of NOMA downlink transmissions at the first UE based at least in part on the downlink control information for the first UE and the downlink control information for the second UE. In some examples, the apparatus may further include means for implementing one or more aspects of the method for wireless communication described above with respect to the fifth set of illustrative examples.

In a seventh set of illustrative examples, another apparatus for wireless communication is described. In one configuration, the apparatus may include a processor, and memory coupled to the processor. The processor may be configured to receive downlink control information for a first UE. The downlink control information for the first UE may include an indication of at least a second UE. The processor may also be configured to receive downlink control information for the second UE based at least in part on the indication of at least the second UE, and receive a set of NOMA downlink transmissions at the first UE based at least in part on the downlink control information for the first UE and the downlink control information for the second UE. In some examples, the processor may further be configured to implement one or more aspects of the method for wireless communication described above with respect to the fifth set of illustrative examples.

In an eighth set of illustrative examples, another computer-readable medium for storing instructions executable by a processor is described. In one configuration, the computer-readable medium may include instructions to receive downlink control information for a first UE. The downlink control information for the first UE may include an indication of at least a second UE. The computer-readable medium may also include instructions to receive downlink control information for the second UE based at least in part on the indication of at least the second UE, and instructions to receive a set of NOMA downlink transmissions at the first UE based at least in part on the downlink control information for the first UE and the downlink control information for the second UE. In some examples, the computer-readable medium may also include instructions to implement one or more aspects of the method for wireless communication described above with respect to the fifth set of illustrative examples.

In a ninth set of illustrative examples, another method for wireless communication is described. In one configuration, the method may include receiving, at a first UE, at least one control channel element associated with the first UE. The at least one control channel element may include downlink control information for the first UE and at least a second UE. The method may also include receiving a set of NOMA downlink transmissions at the first UE based at least in part on the downlink control information for the first UE and at least the second UE.

In some examples of the method, receiving the at least one control channel element may include receiving a single control channel element associated with the first UE. The single control channel element may include the downlink control information for the first UE and at least the second UE.

In some examples of the method, receiving the at least one control channel element may include receiving a first control channel element associated with the first UE, with the first control channel element including the downlink control information for the first UE, and receiving at least a second control channel element associated with the first UE, with at least the second control channel element including the downlink control information for at least the second UE.

In some examples, the method may include determining, based at least in part on the downlink control information for the first UE and the downlink control information for at least the second UE, that an interfering transmission overlaps a first downlink transmission for the first UE. The method may also include performing an interference cancellation operation on the interfering transmission based at least in part on the downlink control information for at least the second UE. In some examples of the method, receiving the at least one control channel element may include receiving a UE identifier associated with the second UE, and performing the interference cancellation operation on the interfering transmission may be further based at least in part on the UE identifier. In some examples of the method, the UE identifier may include an RNTI associated with the second UE, and performing the interference cancellation operation on the interfering transmission may include decoding (e.g., descrambling (e.g., cyclic redundancy check (CRC)-descrambling) the interfering transmission using the RNTI associated with the UE identifier.

In a tenth set of illustrative examples, another apparatus for wireless communication is described. In one configuration, the apparatus may include means for receiving, at a first UE, at least one control channel element associated with the first UE. The at least one control channel element may include downlink control information for the first UE and at least a second UE. The apparatus may also include receiving a set of NOMA downlink transmissions at the first UE based at least in part on the downlink control information for the first UE and at least the second UE. In some examples, the apparatus may further include means for implementing one or more aspects of the method for wireless communication described above with respect to the ninth set of illustrative examples.

In an eleventh set of illustrative examples, another apparatus for wireless communication is described. In one configuration, the apparatus may include a processor, and memory coupled to the processor. The processor may be configured to receive, at a first UE, at least one control channel element associated with the first UE. The at least one control channel element may include downlink control information for the first UE and at least a second UE. The processor may also be configured to receive a set of NOMA downlink transmissions at the first UE based at least in part on the downlink control information for the first UE and at least the second UE. In some examples, the processor may further be configured to implement one or more aspects of the method for wireless communication described above with respect to the ninth set of illustrative examples.

In a twelfth set of illustrative examples, another computer-readable medium for storing instructions executable by a processor is described. In one configuration, the computer-readable medium may include instructions to receive, at a first UE, at least one control channel element associated with the first UE. The at least one control channel element may include downlink control information for the first UE and at least a second UE. The computer-readable medium may also include instructions to receive a set of NOMA downlink transmissions at the first UE based at least in part on the downlink control information for the first UE and at least the second UE. In some examples, the computer-readable medium may also include instructions to implement one or more aspects of the method for wireless communication described above with respect to the ninth set of illustrative examples.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 21 shows a table of various TDD uplink-downlink (UL/DL) configurations (e.g., configurations 0, 1, 2, 3, 4, 5, and 6) used for a frame of communications in an LTE system, in accordance with various aspects of the present disclosure;

DETAILED DESCRIPTION

Figure 1:
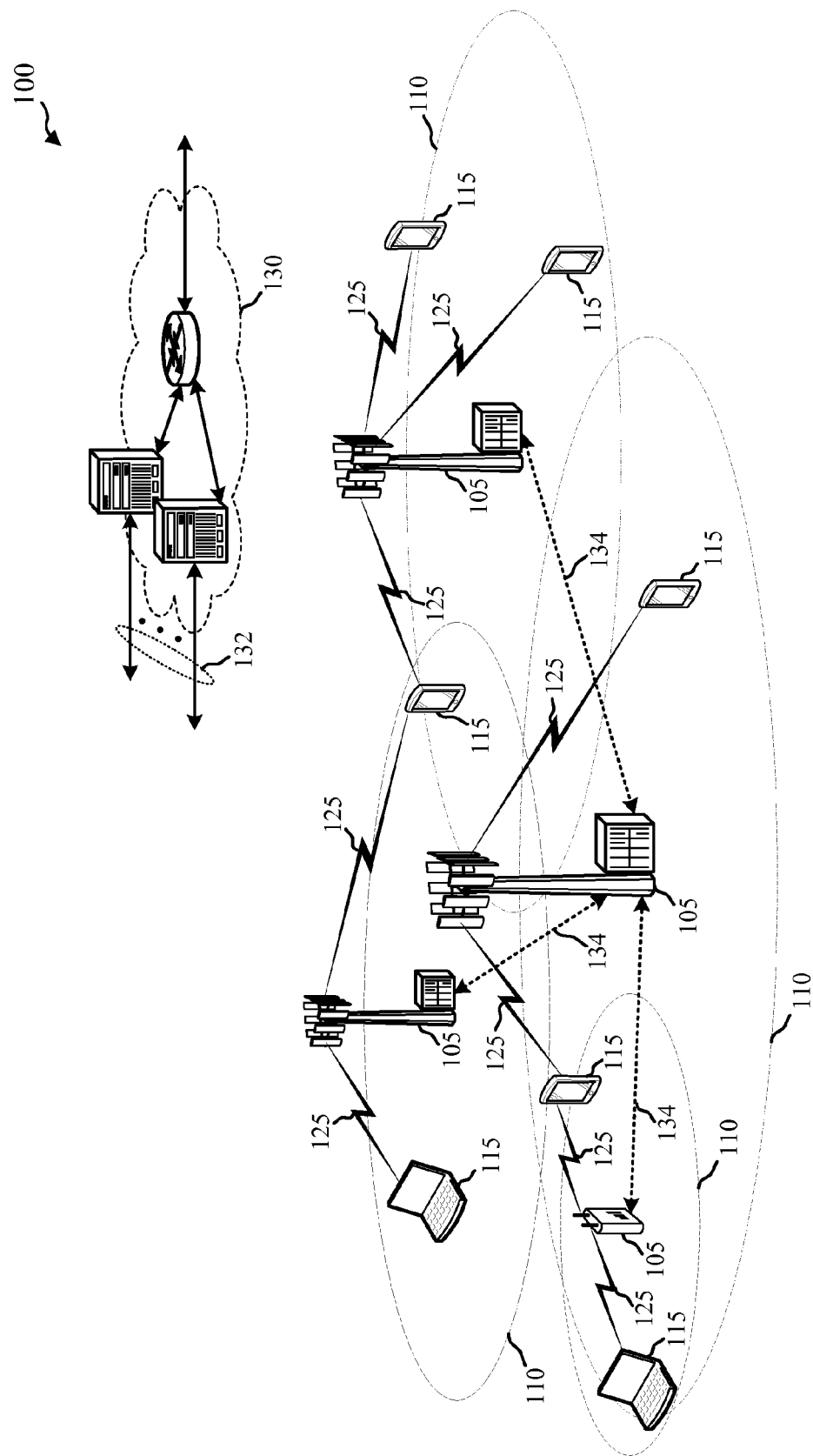
FIG. 1 illustrates an example of a wireless communications system, in accordance with various aspects of the disclosure.

Techniques are described for transmitting and receiving downlink control information for a set of NOMA downlink transmissions. In some examples, a base station (e.g., a base station including an enhanced Node B (eNB)) or a UE may be configured to operate within a wireless communication system and transmit or receive wireless communications on a base modulation layer as well as on an enhancement modulation layer that is modulated on the base modulation layer. Thus, concurrent, non-orthogonal data streams may be provided to the same or different UEs, and each modulation layer may be used to transmit content that may be selected based on particular deployments or channel conditions. Such concurrent, non-orthogonal data streams may be referred to as a set of NOMA transmissions, and in the case of downlink transmissions, a set of NOMA transmissions may be referred to as a set of NOMA downlink transmissions. Various interference mitigation techniques may be implemented to compensate for interfering signals received from within a cell.

In some examples, a set of NOMA downlink transmissions may be provided to a UE from a base station through hierarchical modulation, in which first content may be selected for transmission on a base modulation layer and different content may be selected for transmission on an enhancement modulation layer. The base modulation layer content may be modulated onto the base modulation layer, and then the enhancement layer content may be modulated onto the enhancement modulation layer. The enhancement modulation may be superpositioned on the base modulation layer and transmitted to one or more UE(s). In some examples, a UE may transmit multiple hierarchical layers to a base station in a similar manner.

A UE receiving both the base modulation layer and the enhancement modulation layer may decode content received on the base modulation layer, and then perform interference cancellation to cancel the signal of the base modulation layer. The UE may then decode content received on the enhancement modulation layer.

In some examples, the base modulation layer may support transmissions having a higher likelihood of transmission success, and the base modulation layer may be used to transmit content having a relatively lower error threshold. The enhancement modulation layer, in some examples, may support transmissions having relatively lower likelihood of transmission success, and may be used for transmission of content having a relatively higher error threshold.

When a plurality of downlink transmissions in a set of NOMA downlink transmissions share some or all of the same resources (e.g., have partially or fully overlapping resource blocks), a UE may perform an interference cancellation operation on one or more downlink transmissions included in the set of NOMA downlink transmissions to identify one of the downlink transmissions that is intended for the UE. To perform an interference cancellation operation on a set of NOMA downlink transmissions, a UE may need to know the parameters for the downlink transmission(s) to be canceled. These parameters may be acquired from downlink control information for the downlink transmission(s). In some examples, the downlink control information may be included in a physical downlink control channel (PDCCH) or enhanced PDCCH (ePDCCH).

The following description provides examples, and is not limiting of the scope, applicability, or examples set forth in the claims. Changes may be made in the function and arrangement of elements discussed without departing from the spirit and scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 shows a block diagram of a wireless communication system 100, in accordance with various aspects of the present disclosure. The wireless communication system 100 may include a plurality of base stations 105 (e.g., base stations forming parts or all of one or more eNBs), a number of UEs 115, and a core network 130. Some of the base stations 105 may communicate with the UEs 115 under the control of a base station controller (not shown), which may be part of the core network 130 or certain ones of the base stations 105 in various examples. Some of the base stations 105 may communicate control information or user data with the core network 130 through backhaul 132. In some examples, some of the base stations 105 may communicate, either directly or indirectly, with each other over backhaul links 134, which may be wired or wireless communication links. The wireless communication system 100 may support operation on multiple carriers (waveform signals of different frequencies). Multi-carrier transmitters can transmit modulated signals simultaneously on the multiple carriers. For example, each communication link 125 may be a multi-carrier signal modulated according to various radio technologies. Each modulated signal may be sent on a different carrier and may carry control information (e.g., reference signals, control channels, etc.), overhead information, data, etc.

The base stations 105 may wirelessly communicate with the UEs 115 via one or more base station antennas. Each of the base stations 105 may provide communication coverage for a respective coverage area 110. In some examples, a base station 105 may be referred to as an access point, a base transceiver station (BTS), a radio base station, a radio transceiver, a basic service set (BSS), an extended service set (ESS), a NodeB, an evolved NodeB (eNB), a Home NodeB, a Home eNodeB, or some other suitable terminology. The coverage area 110 for a base station 105 may be divided into sectors making up just a portion of the coverage area. The wireless communication system 100 may include base stations 105 of different types (e.g., macro, micro, or pico base stations). The base stations 105 may also utilize different radio technologies, such as cellular or WLAN radio access technologies. The base stations 105 may be associated with the same or different access networks or operator deployments (e.g., collectively referred to herein as "operators"). The coverage areas of different base stations 105, including the coverage areas of the same or different types of base stations 105, utilizing the same or different radio technologies, or belonging to the same or different access networks, may overlap.

In some examples, the wireless communication system 100 may include an LTE/LTE-A communication system (or network). In LTE/LTE-A communication systems, the term evolved NodeB or eNB may be, for example, used to describe ones or groups of the base stations 105. In some examples, the wireless communication system 100 may include an LTE/LTE-A communication system that supports hierarchical modulation and interference cancellation, such as an LTE/LTE-A communication system that supports the transmission of a set of NOMA downlink transmissions. In some examples, the wireless communication system 100 may support wireless communication using one or more access technologies different from LTE/LTE-A.

The wireless communication system 100 may be or include a Heterogeneous LTE/LTE-A network in which different types of base stations 105 provide coverage for various geographical regions. For example, each base station 105 may provide communication coverage for a macro cell, a pico cell, a femto cell, or other type of cell. Small cells such as pico cells, femto cells, or other types of cells may include low power nodes or LPNs. A macro cell, for example, covers a relatively large geographic area (e.g., several kilometers in radius) and may allow unrestricted access by UEs with service subscriptions with the network provider. A pico cell would, for example, cover a relatively smaller geographic area and may allow unrestricted access by UEs with service subscriptions with the network provider. A femto cell would also, for example, cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the base stations 105 via a backhaul 132 (e.g., S1 application protocol, etc.). The base stations 105 may also communicate with one another, e.g., directly or indirectly via backhaul links 134 (e.g., X2 application protocol, etc.) or via backhaul 132 (e.g., through core network 130). The wireless communication system 100 may support synchronous or asynchronous operation. For synchronous operation, the eNBs may have similar frame or gating timing, and transmissions from different eNBs may be approximately aligned in time. For asynchronous operation, the eNBs may have different frame or gating timing, and transmissions from different eNBs may not be aligned in time.

The UEs 115 may be dispersed throughout the wireless communication system 100. A UE 115 may also be referred to by those skilled in the art as a mobile device, a mobile station, a subscriber station, a mobile unit, a subscriber unit, a wireless unit, a remote unit, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, etc. A UE 115 may be able to communicate with macro eNBs, pico eNBs, femto eNBs, relays, and the like. A UE 115 may also be able to communicate over different types of access networks, such as cellular or other WWAN access networks, or WLAN access networks. In some modes of communication with a UE 115, communication may be conducted over a plurality of communication links 125 or channels (i.e., component carriers), with each channel using a component carrier between the UE 115 and one of a number of cells (e.g., serving cells, which cells may in some cases be operated by the same or different base stations 105).

The communication links 125 shown in wireless communication system 100 may include uplink channels (using component carriers) for carrying uplink (UL) communications (e.g., transmissions from a UE 115 to a base station 105) or downlink channels (using component carriers) for carrying downlink (DL) communications (e.g., transmissions from a base station 105 to a UE 115). The UL communications or transmissions may also be called reverse link communications or transmissions, while the DL communications or transmissions may also be called forward link communications or transmissions. In some examples, one or more downlink channels may carry a set of NOMA downlink transmissions.

Depending on the proximity of the base stations 105 and/or UEs 115 with respect to one another and/or other objects, the transmissions of one wireless device (e.g., a base station 105 or UE 115) may interfere with the reception of transmissions at another wireless device (e.g., another base station or UE 115). Examples of interference scenarios are described with reference to FIG. 2. To combat this interference, a first wireless device may use control information received for at least a second wireless device to identify and cancel interfering transmissions by or to the second wireless device. The control information may be received using an interfering group identifier associated with a group to which the second wireless device belongs.

Figure 2:
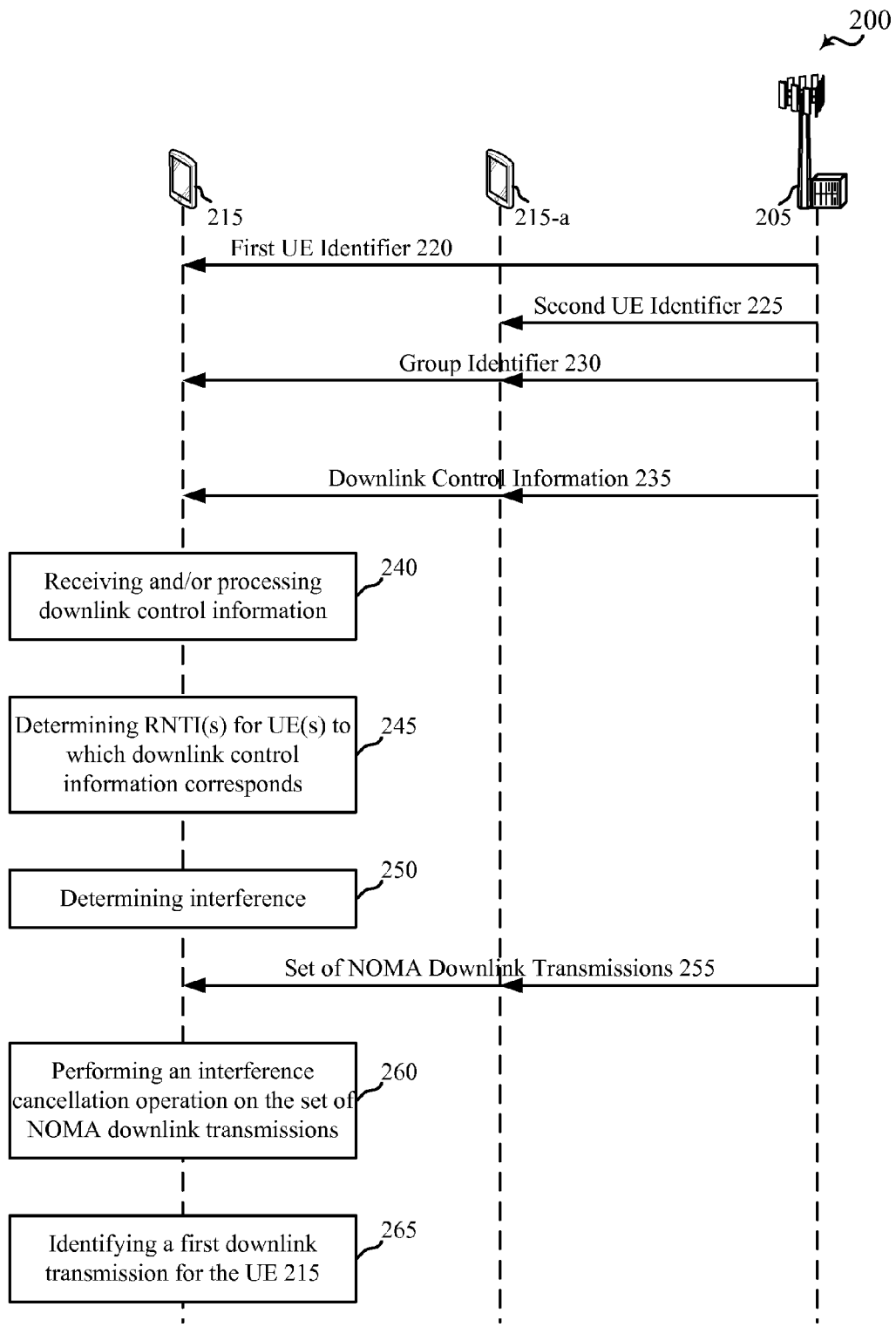
FIG. 2 shows a message flow between a base station, a first UE, and a second UE, in accordance with various aspects of the present disclosure.

In some examples, the reception of downlink control information for at least a second UE that has a downlink transmission included in a set of NOMA downlink transmissions, at a first UE that has a downlink transmission included in the set of NOMA downlink transmissions, may be facilitated by the establishment of a NOMA group. In some examples, a base station may define a NOMA group as a set of active UEs that may potentially be served in NOMA fashion. In some examples, a NOMA group may include up to 256 UEs. In other examples, a NOMA group may include more or fewer UEs. NOMA pairing of UEs (e.g., for downlink transmissions over a base modulation layer and an enhancement modulation layer) are made between UEs in a same NOMA group. In some examples, a base station may define multiple NOMA groups. Transmissions to UEs belonging to different NOMA groups may be orthogonal and may not share resources. A NOMA group may be identified by a group identifier. In some examples, the group identifier may include a group radio network temporary identifier (RNTI). All of the downlink control information (or PDCCHs or ePDCCHs) transmitted to the UEs in a NOMA group may be encoded (e.g., scrambled (e.g., cyclic redundancy check (CRC) scrambled)) using the group identifier (e.g., the group RNTI) for the NOMA group. As a result, any UE in a NOMA group that knows the group identifier for the NOMA group may decode (e.g., descramble (e.g., CRC-descramble)) the downlink control information (or PDCCHs or ePDCCHs) for any other UE in the NOMA group. This differs from the way downlink control information is currently transmitted in LTE/LTE-A communication systems, in which downlink control information for a UE is encoded (e.g., scrambled (e.g., CRC-scrambled)) using an identifier of the UE (e.g., a UE identifier). FIG. 2 provides an example of how a NOMA group may be used to facilitate the receipt of downlink control information at a UE.

FIG. 2 shows a message flow 200 between a base station 205, a first UE 215, and a second UE 215-a, in accordance with various aspects of the present disclosure. In some examples, the base station 205 may be an example of aspects of one or more of the base stations 105 described with reference to FIG. 1. In some examples, the first UE 215 or the second UE 215-a may be an example of aspects of one or more of the UEs 115 described with reference to FIG. 1. In some examples, each of the first UE 215, the second UE 215-a, and in some examples other UEs (not shown), may be members of a NOMA group. Messages may be transmitted between the base station 205, the first UE 215, or the second UE 215-a over at least one radio frequency spectrum band.

As shown in FIG. 2, the base station 205 may transmit a respective UE identifier to each of the UEs in the NOMA group. For example, the base station 205 may transmit a first UE identifier 220 to the first UE 215 and a second UE identifier 225 to the second UE 215-a. The first UE identifier 220 may identify the first UE 215, and the second UE identifier 325 may identify the second UE 315-a. In some examples, the base station 205 may transmit a range of UE identifiers associated with the NOMA group. A range of UE identifiers transmitted to the first UE 215 may include, for example, the second UE identifier 225, and a range of UE identifiers transmitted to the second UE 215-a may include, for example, the first UE identifier 220. In some examples, each of the UEs in the NOMA group, including the first UE 215 and the second UE 215-a, may transmit its UE identifier to the base station 205.

The base station 205 may also transmit a group identifier 230 to each of the UEs in the NOMA group (e.g., to the first UE 215 and the second UE 215-a). In some examples, the group identifier may be transmitted to the first UE 215 and the second UE 215-a during a random access procedure. In some examples, the group identifier 230 may include a group RNTI.

The base station 205 may further transmit downlink control information 235 to each of the UEs in the NOMA group (e.g., to the first UE 215 and the second UE 215-a). In some examples, the downlink control information 235 may be transmitted for a subframe of wireless communications between the base station 205 and one or more of the UEs in the NOMA group. In some examples, the downlink control information 235 may be transmitted at the beginning of a subframe. In some examples, the downlink control information 235 may be transmitted in a PDCCH or ePDCCH. In some examples, the downlink control information 235 may include downlink control information for each of the UEs, in the NOMA group, to which the base station 205 intends to transmit a downlink transmission during a subframe. In a given subframe, the base station 205 may transmit a downlink transmission to all, some, or none of the UEs in the NOMA group. In some examples, the downlink control information 235 may be scrambled (e.g., CRC-scrambled) using the group identifier 230.

At block 240, the first UE 215 may receive the downlink control information 235 and determine the UE(s) to which the downlink control information 235 corresponds. In some examples, the downlink control information received for a UE may be received based at least in part on the group identifier. For example, the downlink control information for the first UE may be decoded (e.g., descrambled (e.g., CRC-descrambled)) using the group identifier, and the downlink control information for the second UE may be decoded (e.g., descrambled (e.g., CRC-descrambled)) using the group identifier. In some examples, the downlink control information received for a UE may be received based at least in part on a deterministic function (e.g., an exclusive-OR (XOR)) of the group identifier and a UE identifier. For example, the downlink control information for the first UE may be decoded (e.g., descrambled (e.g., CRC-descrambled)) based at least in part on a deterministic function of the group identifier and the first UE identifier, and the downlink control information for the second UE may be decoded (e.g., descrambled (e.g., CRC-descrambled)) based at least in part on a deterministic function of the group identifier and the second UE identifier.

In examples in which the downlink control information for a UE is scrambled using the group identifier 230, the operation(s) at block 240 may include decoding (descrambling (e.g., CRC-descrambling) the downlink control information 235 using the group identifier 230, and determining the UEs to which the downlink control information 235 corresponds. In some examples, the downlink control information 235 may be determined to correspond to a UE when it references (e.g., includes) a UE identifier of the UE. In examples in which the downlink control information for a UE is scrambled using a deterministic function of the group identifier 230 and a UE identifier, the operation(s) at block 240 may include decoding (descrambling (e.g., CRC-descrambling) the downlink control information for a UE using the group identifier and the UE identifier, and determining that the downlink control information 235 corresponds to the UE based at least in part on an ability to descramble the downlink control information for the UE. When the first UE 215 determines that the downlink control information 235 does not contain downlink control information for the first UE 215, the first UE 215 may not perform any operations at blocks 245, 250, 260, or 265 (e.g., for a current subframe of wireless communications between the base station 205 and one or more of the UEs in the NOMA group). When the first UE 215 determines that the downlink control information 235 does contain downlink control information for the first UE 215, the first UE 215 may process the downlink control information for the first UE 215 to determine, for example, a transmission format, data rate, rank, modulation and coding scheme (MCS), or hybrid automatic repeat request (HARD) information for a first downlink transmission (e.g., a first PDSCH transmission) for the first UE 215. The first downlink transmission may be received as part of the set of NOMA downlink transmissions 255. When the first UE 215 determines that the downlink control information 235 contains downlink control information for the second UE 215-a or other UEs in the NOMA group, the first UE 215 may process the downlink control information for each of the UEs represented in the downlink control information 235.

At block 245, the first UE 215 may determine a first RNTI corresponding to the first downlink transmission for the first UE. The first RNTI may be determined based at least in part on the first UE identifier 220. In some examples, the first RNTI may be determined based at least in part on a deterministic function (e.g., an XOR) of the first UE identifier 220 and the group identifier 230. The first UE 215 may also determine a second RNTI corresponding to a second downlink transmission for the second UE, or a respective RNTI corresponding to each downlink transmission for each UE represented in the downlink control information 235.

At block 250, the first UE 215 may determine, based at least in part on downlink control information for the first UE 215, downlink control information for the second UE 215-a, or downlink control information for each UE represented in the downlink control information 235, whether there is an interfering transmission that overlaps the first downlink transmission for the first UE (e.g., whether there is a transmission that may interfere with receipt of the first downlink transmission at the first UE 215). In some examples, the interfering transmission may include a second downlink transmission for the second UE. In some examples, the interfering transmission may include a downlink transmission for each of a number of UEs, other than the first UE 215, represented in the downlink control information 235. When the first UE 215 determines that there is no interfering transmission, the first UE 215 may not perform any operations at blocks 260 or 265 (e.g., for a current subframe of wireless communications between the base station 205 and one or more of the UEs in the NOMA group).

At some point in time following transmission of the downlink control information 235 (and in some examples, immediately following), the base station 205 may transmit a set of NOMA downlink transmissions 255. The set of NOMA downlink transmissions 255 may be received by each of the UEs in the NOMA group, including the first UE 215 and the second UE 215-a. In some examples, the set of NOMA downlink transmissions 255 may be received at the first UE 215 based at least in part on downlink control information for the first UE 215. In some examples, the set of NOMA downlink transmissions 255 may also be received at the first UE 215 based at least in part on downlink control information for the second UE 215-a or other UEs represented in the downlink control information 235.

At block 260, and upon determining at block 245 that there is an interfering transmission, the first UE 215 may perform an interference cancellation operation (e.g., a codeword-level interference cancellation (CWIC) operation or a symbol-level interference cancellation (SLIC) operation) on the interfering transmission. The interference cancellation operation may be performed on an interfering transmission corresponding to a UE based at least in part on received downlink control information for the UE. In some examples, the interference cancellation operation may include decoding (e.g., descrambling (e.g., CRC-descrambling)) an interfering transmission corresponding to a UE based at least in part on a UE identifier for the UE. For example, an interfering transmission corresponding to the second UE 215-a may be descrambled (e.g., CRC-descrambled) based at least in part on the second UE identifier 225 (or an RNTI) associated with the second UE 215-a. In some examples, the first UE 215 may perform the interference cancellation operation for each UE, other than the first UE 215, for which downlink control information is provided in the downlink control information 235.

At block 265, the first UE 215 may identify, in the set of NOMA downlink transmissions 255, the first downlink transmission for the first UE 215. The first downlink transmission for the first UE 215 may be identified using the first UE identifier 220 (e.g., the first RNTI). In some examples, identifying the first downlink transmission for the first UE 215 may include decoding (e.g., descrambling (e.g., CRC-descrambling)) the first downlink transmission for the first UE 215 based at least in part on the first UE identifier 220.

In one example of the message flow described with reference to FIG. 2, the group identifier 230 may have a value of 0x800, the first UE identifier 220 may have a value of 0x01, and the second UE identifier 225 may have a value of 0x02. In a subframe of communications in which the first UE 215 and the second UE 215-a are both served in NOMA fashion by the base station 205, with all resource blocks assigned to both UEs (e.g., to the first UE 215 and to the second UE 215-a), a PDCCH1 may be assigned to the first UE 215 and be scrambled with the group identifier 230 (e.g., 0x8000), and a PDCCH2 may be assigned to the second UE 215-a and be scrambled with the group identifier 230 (e.g., 0x8000). Also, a PDSCH1 scrambled with an RNTI having a value of 0x8001 (XOR(0x8000, 0x01) may be transmitted to the first UE 215, and a PDSCH2 scrambled with an RNTI having a value of 0x8002 (XOR(0x8000, 0x02) may be transmitted to the second UE 215-a. Upon receipt of the various transmissions at the first UE 215, the first UE 215 may receive both the PDCCH1 and the PDCCH2 using the group identifier (0x8000). Upon determining that the PDCCH1 is for the first UE 215, the first UE 215 may check the PDCCH2 to determine whether the PDSCH2 uses resource blocks that overlap the resource blocks used by the PDSCH1. Upon determining that the resource blocks assigned to the PDSCH1 and the PDSCH2 overlap, the first UE 215 may decode the PDSCH1 using parameters obtained from the PDCCH1, and decode the PDSCH2 using parameters obtained from the PDCCH2. The first UE 215 may then perform an interference cancellation operation on the PDSCH2, thereby enabling the first UE 215 to identify the PDSCH1.

In some examples, the reception of downlink control information for at least a second UE that has a downlink transmission included in a set of NOMA downlink transmissions, at a first UE that has a downlink transmission included in the set of NOMA downlink transmissions, may be facilitated by a blind detection of downlink control information transmitted to the second UE. In this approach, it may be assumed that downlink control information transmitted to the first UE offers little if any help in detecting the downlink control information transmitted to the second UE. To limit the number of blind detections that the first UE performs, a base station may limit the aggregation level for NOMA transmissions to a number such as four. The base station may also or alternatively adjust the power of the downlink control information transmitted to the second UE to help the first UE receive the downlink control information transmitted to the second UE. The first UE may in some examples detect an energy on one or more control channel elements to determine if downlink control information for the second UE has been transmitted. After the downlink control information for the second UE is blindly detected, the first UE may attempt to recover an RNTI from the downlink control information. In some examples, the first UE may determine whether a location of the downlink control information for the second UE (or a location of a PDCCH or ePDCCH including the downlink control information for the second UE) is located in a search space for the recovered RNTI. If not, the blindly detected downlink control information may be considered a false alarm. If so, the first UE may decode the downlink control information and determine whether information such as the modulation order match. In some examples, a false alarm may be declared if the posteriori probability for the detected downlink control information is too low.

Figure 3:
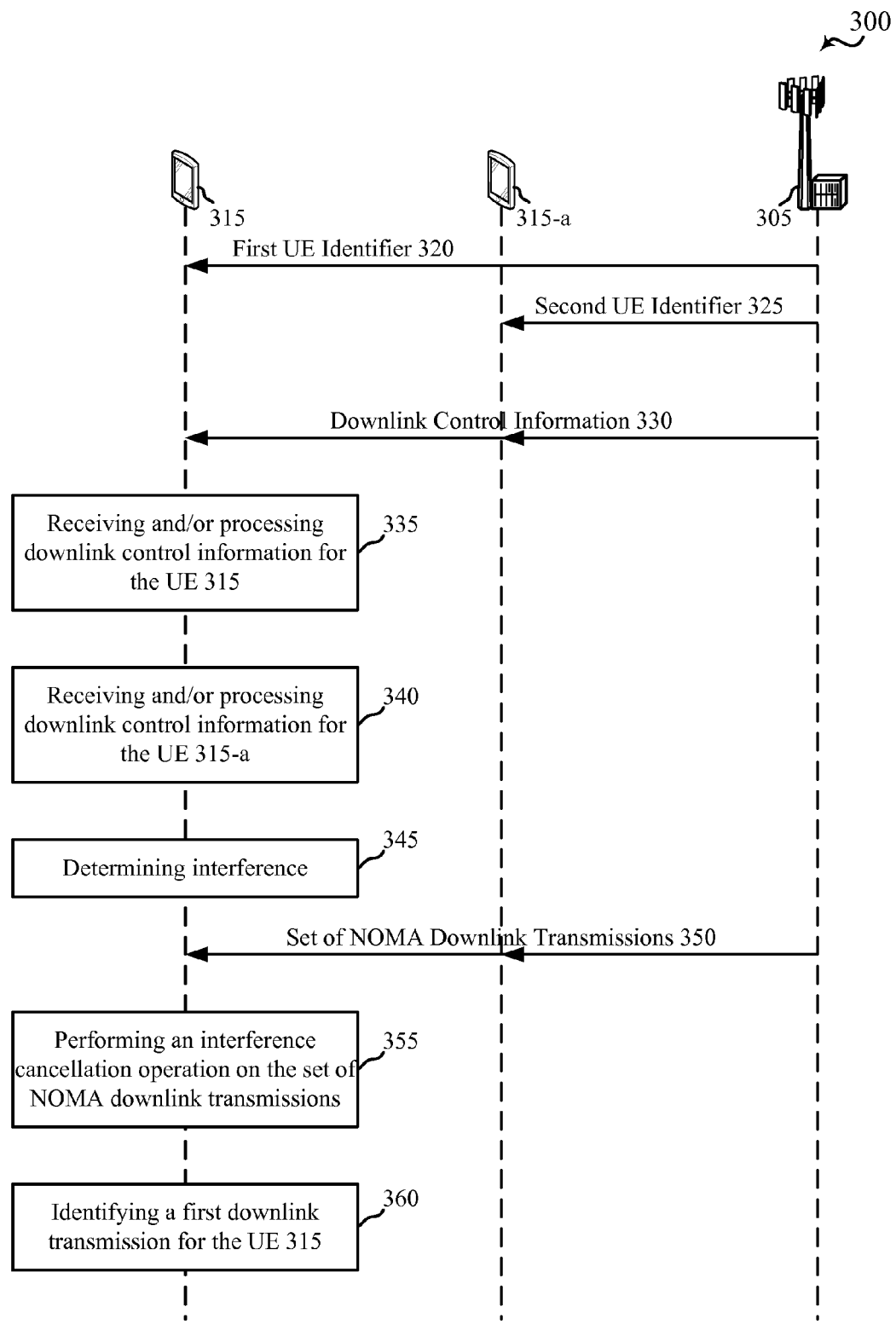
FIG. 3 shows a message flow between a base station, a first UE, and a second UE, in accordance with various aspects of the present disclosure.

FIG. 3 shows a message flow 300 between a base station 305, a first UE 315, and a second UE 315-a, in accordance with various aspects of the present disclosure. In some examples, the base station 305 may be an example of aspects of one or more of the base stations 105 described with reference to FIG. 1. In some examples, the first UE 315 or the second UE 315-*a* may be an example of aspects of one or more of the UEs 115 described with reference to FIG. 1. In some examples, each of the first UE 315, the second UE 315-*a*, and in some examples other UEs (not shown), may be served in NOMA fashion (e.g., as a NOMA group, regardless of whether the NOMA group is defined as such). Messages may be transmitted between the base station 305, the first UE 315, or the second UE 315-*a* over at least one radio frequency spectrum band.

As shown in FIG. 3, the base station 305 may transmit a respective UE identifier to each of the UEs in the NOMA group. For example, the base station 305 may transmit a first UE identifier 320 (e.g., a first RNTI) to the first UE 315 and a second UE identifier 325 (e.g., a second RNTI) to the second UE 315-*a*. The first UE identifier 320 may identify the first UE 315, and the second UE identifier 325 may identify the second UE 315-*a*. In other examples, each of the UEs in the NOMA group, including the first UE 315 and the second UE 315-*a*, may transmit its UE identifier to the base station 305.

The base station 305 may further transmit downlink control information 330 to one or more of the UEs in the NOMA group (e.g., to the first UE 315 and the second UE 315-*a*). In some examples, the downlink control information 330 may be transmitted for a subframe of wireless communications between the base station 305 and one or more of the UEs in the NOMA group. In some examples, the downlink control information 330 may be transmitted at the beginning of a subframe.

In some examples, the downlink control information 330 may include downlink control information, such as a first PDCCH or first ePDCCH, for the first UE 315. In some examples, the downlink control information 330 may include downlink control information for other UEs in the NOMA group, such as a second PDCCH or second ePDCCH for the second UE 315-*a*. In some examples, the PDCCH or ePDCCH for one UE may include an indication of at least one other UE for which downlink control information is transmitted. For example, when the downlink control information 330 includes downlink control information for the first UE 315 and at least the second UE 315-*a*, the downlink control information for the first UE 315 may include an indication of at least the second UE 315-*a* (e.g., a second RNTI associated with the second UE 315-*a*) or the downlink control information for the second UE 315 may include an indication of at least the first UE 315 (e.g., a first RNTI associated with the first UE 315). In other examples, the PDCCH or ePDCCH for one UE may include an index associated with a set of other UEs that can be configured to operate in a NOMA group with the UE. For example, a first PDCCH or first ePDCCH for the first UE 315 may include an index associated with a set of other UEs, including the second UE 315-*a*, that can be configured to operate in a NOMA group with the first UE 315.

At block 335, the first UE 315 may receive downlink control information for the first UE 315. In some examples, the downlink control information for the first UE 315 may be decoded (e.g., descrambled (e.g., CRC-descrambled)) based at least in part on the first UE identifier 320 (e.g., a first RNTI associated with the first UE 315). In some examples, receiving the downlink control information for the first UE 315 may include receiving an indication of at least the second UE 315-*a*. In some examples, the indication of at least the second UE 315-*a* may include an RNTI associated with the second UE 315-*a*. In other examples, the indication of at least the second UE 315-*a* may include an index associated with a set of other UEs that can be configured to operate in a NOMA group with the first UE 315. The set of other UEs may include the second UE 315-*a*. In some examples, the operation(s) at block 335 may include determining an RNTI associated with the second UE 315-*a* based at least in part on the index. In some examples, receiving the downlink control information for the first UE 315 may include receiving an indication of each of one or more other UEs for which downlink control information is transmitted in the downlink control information 330.

In some examples, the number of bits available for providing the indication of at least the second UE 315-*a* in a PDCCH or ePDCCH may be limited, and the number of UEs that may be identified given the limited number of bits may be less than the number of UEs that may otherwise be included in a NOMA group. In these examples, the overlap of downlink transmissions may likewise be limited.

In examples in which the indication of at least the second UE 315-*a* includes an index associated with a set of other UEs that can be configured to operate in a NOMA group with the first UE 315, the base station 305 may preselect the set of other UEs and maintain the set of other UEs in a semi-static manner. In some examples, updating the set of other UEs may require signaling and take a somewhat long time. However, pairings of the first UE 315 with UEs in the set of other UEs may be undertaken dynamically. In some examples, the number of UEs that may be included in the set of other UEs may be fixed. In some examples, the indication of at least the second UE 315-*a* may include a set of paired UE indicator fields (PIFs), with each PIF providing an index into the set of other UEs. In some examples, the number of PIFs in a set of PIFs may be fixed. In other examples, the number of PIFS in a set of PIFs may be variable. In some examples, there may be a tradeoff between the number of pair-able UEs and the maximum number of paired UEs by providing an ability to indicate any UE, but possibly fewer UEs in the downlink control information for a UE (e.g., by providing an ability to include an RNTI of any UE in downlink control information for the first UE) or by providing an ability to indicate selected UEs, but possibly more UEs in the downlink control information for a UE (e.g., by providing a plurality of PIFs).

At block 340, the first UE 315 may receive downlink control information for the second UE 315-*a* based at least in part on the indication of at least the second UE 315-*a*. In some examples, the indication of at least the second UE may include an indication of the second UE 315-*a* (e.g., the second UE identifier 325 or an RNTI associated with the second UE 315-*a*), and the downlink control information for the second UE 315-*a* may be decoded (e.g., descrambled (e.g., CRC-descrambled)) based at least in part on the indication of the second UE 315-*a*.

At block 345, the first UE 315 may determine, based at least in part on downlink control information for the first UE 315, downlink control information for the second UE 315-*a*, or downlink control information for other UEs for which downlink control information is provided in the downlink control information 330, whether there is an interfering transmission (e.g., an interfering PDSCH transmission) that overlaps a first downlink transmission (e.g., a first PDSCH transmission) for the first UE (e.g., whether there is a transmission that may interfere with receipt of the first downlink transmission at the first UE 315). In some examples, the interfering transmission may include a second downlink transmission (e.g., a second PDSCH transmission) for the second UE 315-*a*. In some examples, the interfering transmission may include a downlink transmission for each of a number of UEs, other than the first UE 315, for which downlink control information is provided in the downlink control information 330. When the first UE 315 determines that there is no interfering transmission, the first UE 315 may not perform any further operations at blocks 355 or 360 (e.g., for a current subframe of wireless communications between the base station 305 and one or more of the UEs of the NOMA group).

At some point in time following transmission of the downlink control information 330 (and in some examples, immediately following), the base station 305 may transmit a set of NOMA downlink transmissions 350. The set of NOMA downlink transmissions 350 may be received by each of the UEs in the NOMA group, including the first UE 315 and the second UE 315-a. In some examples, the set of NOMA downlink transmissions 350 may be received at the first UE 315 based at least in part on downlink control information for the first UE 315. In some examples, the set of NOMA downlink transmissions 350 may also be received at the first UE 315 based at least in part on downlink control information for the second UE 315-a or other UEs for which downlink control information is provided in the downlink control information 330.

At block 355, and upon determining at block 345 that there is an interfering transmission, the first UE 315 may perform an interference cancellation operation (e.g., a CWIC operation) on each interfering transmission. The interference cancellation operation may be performed on an interfering transmission corresponding to a UE based at least in part on received downlink control information for the UE. In some examples, the interference cancellation operation may include decoding (e.g., descrambling (e.g., CRC-descrambling)) an interfering transmission corresponding to a UE based at least in part on a UE identifier for the UE. For example, an interfering transmission corresponding to the second UE 315-a may be descrambled (e.g., CRC-descrambled) based at least in part on the second UE identifier 325 (or an RNTI) associated with the second UE 315-a. In some examples, the first UE 315 may perform the interference cancellation operation for each UE, other than the first UE 315, for which downlink control information is provided in the downlink control information 330.

At block 360, the first UE 315 may identify, in the set of NOMA downlink transmissions 350, the first downlink transmission for the first UE 315. The first downlink transmission for the first UE 315 may be identified using the first UE identifier 320 (e.g., the first RNTI). In some examples, identifying the first downlink transmission for the first UE 315 may include decoding (e.g., descrambling (e.g., CRC-descrambling)) the first downlink transmission for the first UE 315 based at least in part on the first UE identifier 320.

Figure 4:
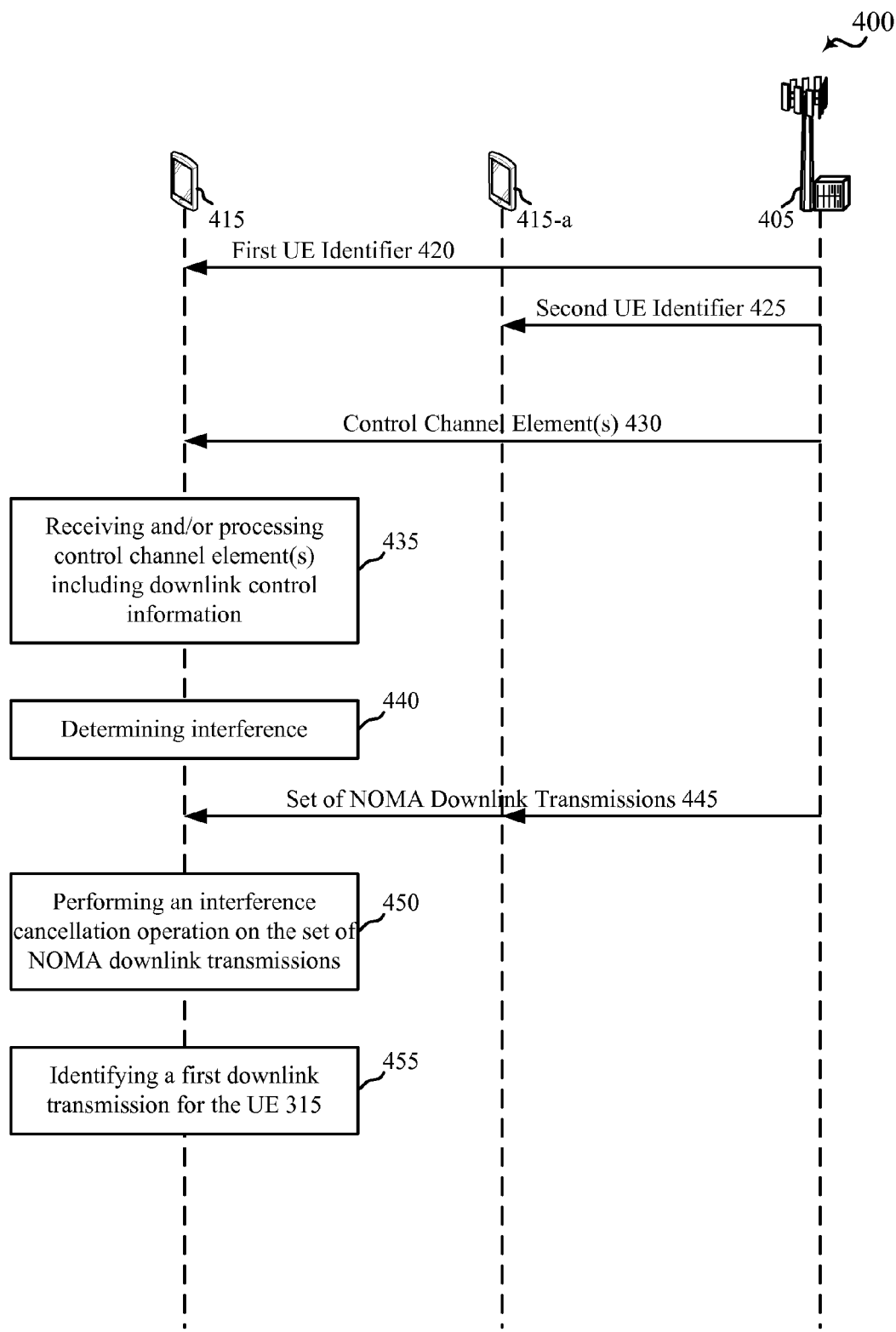
FIG. 4 shows a message flow between a base station, a first UE, and a second UE, in accordance with various aspects of the present disclosure.

FIG. 4 shows a message flow 400 between a base station 405, a first UE 415, and a second UE 415-a, in accordance with various aspects of the present disclosure. In some examples, the base station 405 may be an example of aspects of one or more of the base stations 105 described with reference to FIG. 1. In some examples, the first UE 415 or the second UE 415-a may be an example of aspects of one or more of the UEs 115 described with reference to FIG. 1. In some examples, each of the first UE 415, the second UE 415-a, and in some examples other UEs (not shown) may be served in NOMA fashion (e.g., as a NOMA group, regardless of whether the NOMA group is defined as such). Messages may be transmitted between the base station 405, the first UE 415, or the second UE 415-a over at least one radio frequency spectrum band.

As shown in FIG. 4, the base station 405 may transmit a respective UE identifier to each of the UEs in the NOMA group. For example, the base station 405 may transmit a first UE identifier 420 (e.g., a first RNTI) to the first UE 415 and a second UE identifier 425 (e.g., a second RNTI) to the second UE 415-a. The first UE identifier 420 may identify the first UE 415, and the second UE identifier 425 may identify the second UE 415-a. In other examples, each of the UEs in the NOMA group, including the first UE 415 and the second UE 415-a, may transmit its UE identifier to the base station 405. In some examples, the base station 405 may transmit, to each of a plurality of UEs in a NOMA group, the UE identifiers of other UEs in the NOMA group (e.g., the base station 405 may transmit the second UE identifier 425 to the first UE 415 or transmit the first UE identifier 420 to the second UE 415-a.

The base station 405 may further transmit at least one control channel element (e.g., control channel element(s) 430) associated with the first UE 415 to the first UE 415. In some examples, the base station 405 may transmit a different control channel element or elements to the second UE 415-a. In some examples, the control channel element(s) 430 may be transmitted for a subframe of wireless communications between the base station 405 and one or more of the UEs in the NOMA group. In some examples, the control channel element(s) 430 may be transmitted at the beginning of a subframe. In some examples, the control channel element(s) 430 may be transmitted in one or more PDCCHs or ePDCCHs for the first UE 415. In some examples, the control channel element(s) 430 may include downlink control information for the first UE 415. The control channel element(s) 430 may also include a copy of downlink control information for other UEs (e.g., other UEs in the NOMA group) with which the base station 405 intends to communicate with during a subframe. In some examples, the other UEs with which the base station 405 intends to communicate with during a subframe may include the second UE 415-a.

In some examples, the control channel element(s) 430 may include a single control channel element (e.g., a single PDCCH or ePDCCH) associated with the first UE 415. The single control channel element may include downlink control information for the first UE 415 and at least the second UE 415-a (e.g., the single control channel element may include a first PDCCH or first ePDCCH for the first UE 415, and a payload of a second PDCCH or second ePDCCH for the second UE 415-a may be duplicated in the payload of the first PDCCH or first ePDCCH). In some examples, the control channel element(s) 430 may include a first control channel element associated with the first UE 415 and at least a second control channel element associated with the first UE 415. The first control channel element may include downlink control information for the first UE 415, and at least the second control channel element may include downlink control information for at least the second UE 415-a (e.g., the first control channel element may include a first PDCCH or first ePDCCH for the first UE 415, and the second control channel element may include a second PDCCH or second ePDCCH for the first UE, which second PDDCH or second ePDCCH for the first UE contains a copy of a PDCCH or ePDCCH for the second UE 415-a). In some examples, the control channel element(s) 430 may include the UE identifier (e.g., RNTI) associated with each UE for which downlink control information is provided in the control channel element(s) 430.

At block 435, the first UE 415 may decode the downlink control information received in the control channel element(s) 430 and determine the UE(s) to which the downlink control information corresponds. In some examples, the first UE 415 may process the downlink control information for the first UE 415 to determine, for example, a transmission format, data rate, rank, MCS, or hybrid automatic repeat request (HARD) information for a first downlink transmission (e.g., a first PDSCH transmission) for the first UE 415. When the first UE 415 determines that the downlink control information contains downlink control information for the second UE 415-*a* or other UEs in the NOMA group, the first UE 415 may process the downlink control information for each of the UEs represented in the downlink control information.

At block 440, the first UE 415 may determine, based at least in part on downlink control information for the first UE 415, downlink control information for the second UE 415-*a*, or downlink control information for other UEs for which downlink control information is provided in the control channel element(s) 430, whether there is an interfering transmission (e.g., an interfering PDSCH transmission) that overlaps a first downlink transmission (e.g., a first PDSCH transmission) for the first UE (e.g., whether there is a transmission that may interfere with receipt of the first downlink transmission at the first UE 415). In some examples, the interfering transmission may include a second downlink transmission (e.g., a second PDSCH transmission) for the second UE 415-*a*. In some examples, the interfering transmission may include a downlink transmission for each of a number of UEs, other than the first UE 415, for which downlink control information is provided in the control channel element(s) 430. When the first UE 415 determines that there is no interfering transmission, the first UE 415 may not perform any further operations at blocks 450 or 455 (e.g., for a current subframe of wireless communications between the base station 405 and one or more of the UEs of the NOMA group).

At some point in time following transmission of the control channel element(s) 430 (and in some examples, immediately following), the base station 405 may transmit a set of NOMA downlink transmissions 445. The set of NOMA downlink transmissions 445 may be received by each of the UEs in the NOMA group, including the first UE 415 and the second UE 415-*a*. In some examples, the set of NOMA downlink transmissions 445 may be received at the first UE 415 based at least in part on downlink control information for the first UE 415. In some examples, the set of NOMA downlink transmissions 445 may also be received at the first UE 415 based at least in part on downlink control information for the second UE 415-*a* or other UEs represented in downlink control information provided in the control channel element(s) 430.

At block 450, and upon determining at block 440 that there is an interfering transmission, the first UE 415 may perform an interference cancellation operation (e.g., a CWIC operation) on each interfering transmission. The interference cancellation operation may be performed on an interfering transmission corresponding to a UE based at least in part on received downlink control information for the UE. In some examples, the interference cancellation operation may include decoding (e.g., descrambling (e.g., CRC-descrambling)) an interfering transmission corresponding to a UE based at least in part on a UE identifier for the UE. For example, an interfering transmission corresponding to the second UE 415-*a* may be descrambled (e.g., CRC-descrambled) based at least in part on the second UE identifier 425 (or an RNTI) associated with the second UE 415-*a*. In some examples, the first UE 415 may perform the interference cancellation operation for each UE, other than the first UE 415, for which downlink control information is provided in the control channel element(s) 430.

At block 455, the first UE 415 may identify, in the set of NOMA downlink transmissions 445, the first downlink transmission for the first UE 415. The first downlink transmission for the first UE 415 may be identified using the first UE identifier 420 (e.g., the first RNTI). In some examples, identifying the first downlink transmission for the first UE 415 may include decoding (e.g., descrambling (e.g., CRC-descrambling)) the first downlink transmission for the first UE 415 based at least in part on the first UE identifier 420.

Figure 5:
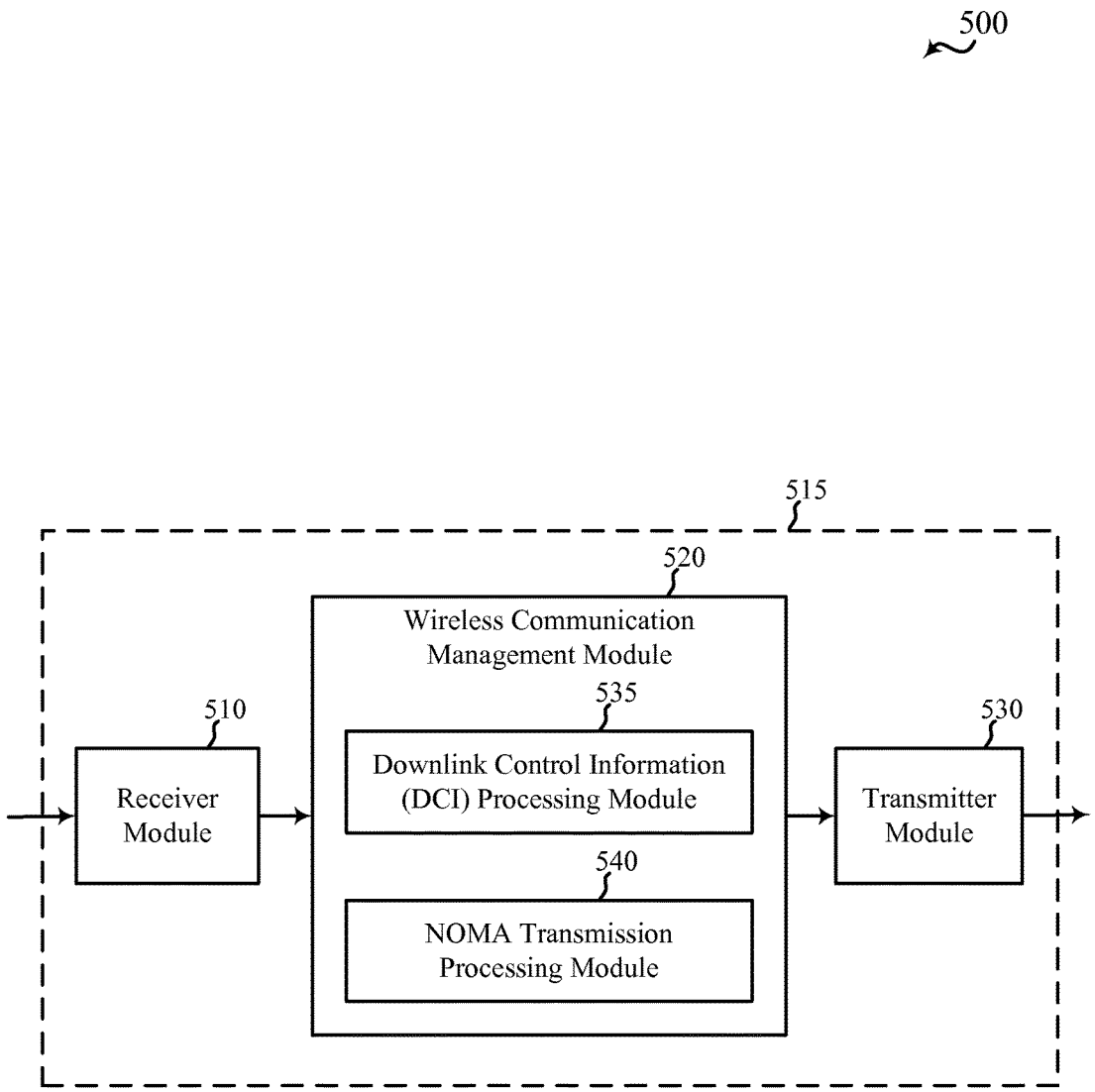
FIG. 5 shows a block diagram of an apparatus for use in wireless communication, in accordance with various aspects of the present disclosure.

FIG. 5 shows a block diagram 500 of an apparatus 515 for use in wireless communication, in accordance with various aspects of the present disclosure. In some examples, the apparatus 515 may be an example of aspects of one or more of the UEs 115, 215, or 215-*a* described with reference to FIG. 1 or 2. The apparatus 515 may also be a processor. The apparatus 515 may include a receiver module 510, a wireless communication management module 520, or a transmitter module 530. Each of these components may be in communication with each other.

The components of the apparatus 515 may, individually or collectively, be implemented using one or more Application-Specific Integrated Circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 510 may include at least one radio frequency (RF) receiver, such as at least one RF receiver operable to receive transmissions over at least one radio frequency spectrum band. In some examples, the at least one radio frequency spectrum band may be used for wireless communications, as described, for example, with reference to FIG. 1 or 2. The receiver module 510 may be used to receive various types of data or control signals (i.e., transmissions) over one or more communication links of a wireless communication system, such as one or more communication links of the wireless communication system 100 described with reference to FIG. 1.

In some examples, the transmitter module 530 may include at least one RF transmitter, such as at least one RF transmitter operable to transmit over at least one radio frequency spectrum band. The transmitter module 530 may be used to transmit various types of data or control signals (i.e., transmissions) over one or more communication links of a wireless communication system, such as one or more communication links of the wireless communication system 100 described with reference to FIG. 1.

The wireless communication management module 520 may be used to manage some or all of the wireless communications to or from the apparatus 515. In some examples, the wireless communication management module 520 may include a downlink control information (DCI) processing module 535 or a NOMA transmission processing module 540.

In some examples, the DCI processing module 535 may be used to receive downlink control information for a first UE (e.g., a UE including the apparatus 515) based at least in part on a group identifier associated with a NOMA group including the first UE and at least a second UE.

In some examples, the NOMA transmission processing module 540 may be used to receive a set of NOMA downlink transmissions at the first UE using the decoded downlink control information for the first UE.

Figure 6:
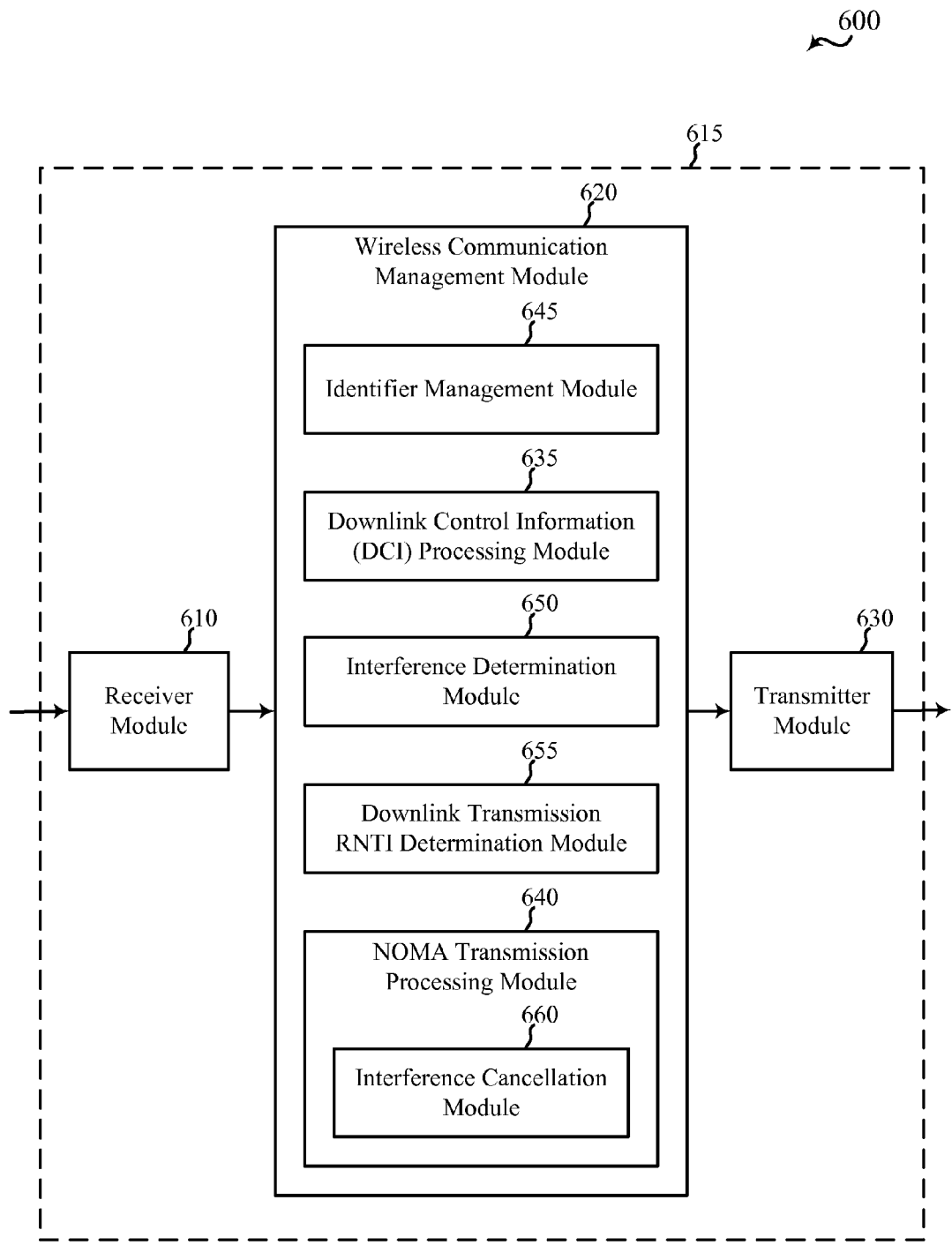
FIG. 6 shows a block diagram of an apparatus for use in wireless communication, in accordance with various aspects of the present disclosure.

FIG. 6 shows a block diagram 600 of an apparatus 615 for use in wireless communication, in accordance with various aspects of the present disclosure. In some examples, the apparatus 615 may be an example of aspects of one or more of the UEs 115, 215, or 215-*a* described with reference to FIG. 1 or 2, or aspects of the apparatus 515 described with reference to FIG. 5. The apparatus 615 may also be a processor. The apparatus 615 may include a receiver module 610, a wireless communication management module 620, or a transmitter module 630. Each of these components may be in communication with each other.

The components of the apparatus 615 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 610 may include at least one RF receiver, such as at least one RF receiver operable to receive transmissions over at least one radio frequency spectrum band. In some examples, the at least one radio frequency spectrum band may be used for wireless communications, as described, for example, with reference to FIG. 1 or 2. The receiver module 610 may be used to receive various types of data or control signals (i.e., transmissions) over one or more communication links of a wireless communication system, such as one or more communication links of the wireless communication system 100 described with reference to FIG. 1.

In some examples, the transmitter module 630 may include at least one RF transmitter, such as at least one RF transmitter operable to transmit over at least one radio frequency spectrum band. The transmitter module 630 may be used to transmit various types of data or control signals (i.e., transmissions) over one or more communication links of a wireless communication system, such as one or more communication links of the wireless communication system 100 described with reference to FIG. 1.

The wireless communication management module 620 may be used to manage some or all of the wireless communications to or from the apparatus 615. In some examples, the wireless communication management module 620 may include an identifier management module 645, a downlink control information (DCI) processing module 635, an interference determination module 650, a downlink transmission RNTI determination module 655, or a NOMA transmission processing module 640.

In some examples, the identifier management module 645 may be used to receive a group identifier or a first UE identifier from a base station. The group identifier may be associated with a NOMA group including a first UE (e.g., a UE including the apparatus 615) and at least a second UE. The first UE identifier may identify the first UE. In some examples, the identifier management module 645 may be used to receive a range of UE identifiers associated with the NOMA group. The range of UE identifiers may include at least a second UE identifier. The second UE identifier may identify the second UE. In some examples, the group identifier, the first UE identifier, or the range of UE identifiers may be received from the base station during a random access procedure. In some examples, the group identifier may include a group RNTI. In some examples, the identifier management module 645 may be used to transmit the first UE identifier to the base station.

In some examples, the DCI processing module 635 may be used to receive downlink control information based at least in part on the group identifier received by the identifier management module 645 (e.g., the DCI processing module 635 may be used to descramble (e.g., CRC-descramble) downlink control information using the group identifier). In some examples, the downlink control information may include downlink control information for the first UE, downlink control information for the second UE, or downlink control information for other UEs in the NOMA group. In some examples, receiving downlink control information based at least in part on the group identifier may include receiving all downlink control information associated with the NOMA group based at least in part on the group identifier.

In some examples, the DCI processing module 635 may be used to receive downlink control information for a UE based at least in part on the group identifier received by the identifier management module 645. For example, the DCI processing module 635 may decode (e.g., descramble (e.g., CRC-descramble)) the downlink control information for the first UE using the group identifier, and decode (e.g., descramble (e.g., CRC-descramble)) the downlink control information for the second UE using the group identifier. In other examples, the DCI processing module 635 may be used to receive downlink control information for a UE based at least in part on a deterministic function (e.g., an XOR) of the group identifier and a UE identifier. For example, the DCI processing module 635 may decode (e.g., descramble (e.g., CRC-descramble)) downlink control information for the first UE based at least in part on a deterministic function of the group identifier and the first UE identifier, and decode (e.g., descramble (e.g., CRC-descramble)) downlink control information for the second UE based at least in part on a deterministic function of the group identifier and the second UE identifier.

In some examples, the DCI processing module 635 may be used to determine whether the received downlink control information contains downlink control information for the first UE. The determination may be based at least in part on the first UE identifier assigned to the first UE. In examples in which the downlink control information for a UE is scrambled using the group identifier, the determining may be based at least in part on whether the downlink control information references (e.g., includes) the first UE identifier. In examples in which the downlink control information for the first UE is scrambled using a deterministic function of the group identifier and the first UE identifier, the determination may be based at least in part on an ability to decode (e.g., descramble (e.g., CRC-descramble)) the downlink control information for the first UE. In some examples, the DCI processing module 635 may be used to determine whether the received downlink control information contains downlink control information for the second UE. The determination may be based at least in part on the second UE identifier assigned to the second UE. In examples in which the downlink control information for a UE is scrambled using the group identifier, the determination may be based at least in part on whether the downlink control information references (e.g., includes) the second UE identifier. In examples in which the downlink control information for the second UE is scrambled using a deterministic function of the group identifier and the second UE identifier, the determination may be based at least in part on an ability to decode (e.g., descramble (e.g., CRC-descramble)) the downlink control information for the second UE. In some examples, the DCI processing module 635 may be used to determine whether the received downlink control information contains downlink control information for each of a number of UEs (or for all of the UEs) in the NOMA group.

In some examples, the interference determination module 650 may be used to determine, based at least in part on downlink control information for the first UE and downlink control information for the second UE (and possibly based on downlink control information for other UEs in the NOMA group), whether there is an interfering transmission that overlaps a first downlink transmission for the first UE (e.g., whether there is a transmission that may interfere with receipt of the first downlink transmission at the first UE). In some examples, the interfering transmission may include a second downlink transmission for the second UE. In some examples, the interfering transmission may include a downlink transmission for each of a number of UEs other than the first UE in the NOMA group, or the interfering transmission may include downlink transmissions for all of the UEs other than the first UE in the NOMA group.

In some examples, the downlink transmission RNTI determination module 655 may be used to determine a first RNTI corresponding to a first downlink transmission for the first UE. The first RNTI may be determined based at least in part on the first UE identifier. In some examples, the first RNTI may be determined based at least in part on a deterministic function (e.g., an XOR) of the first UE identifier and the group identifier. In some examples, the downlink transmission RNTI determination module 655 may be used to determine a second RNTI corresponding to a second downlink transmission for the second UE. The second RNTI may be determined based at least in part on the second UE identifier. In some examples, the second RNTI may be determined based at least in part on a deterministic function (e.g., an XOR) of the second UE identifier and the group identifier. In some examples, the downlink transmission RNTI determination module 655 may be used to determine a respective RNTI for each of a number of UEs other than the first UE in the NOMA group, or for all of the UEs other than the first UE in the NOMA group, depending, for example, on whether the downlink control information received by the DCI processing module 635 contains downlink control information for a UE or depending on whether there is an interfering transmission for the UE overlapping the first downlink transmission for the first UE.

In some examples, the NOMA transmission processing module 640 may be used to receive a set of NOMA downlink transmissions at the first UE based at least in part on the downlink control information for the first UE, the downlink control information for the second UE, or the downlink control information for any other UE in the NOMA group, which second UE or other UE may receive an interfering transmission that overlaps with the first downlink transmission for the first UE. In some examples, the NOMA transmission processing module 640 may be used to identify, in the set of NOMA downlink transmissions, the first downlink transmission for the first UE. The first downlink transmission for the first UE may be identified using the first RNTI. In some examples, identifying the first downlink transmission for the first UE may include descrambling (e.g., CRC-descrambling) the first downlink transmission for the first UE.

In some examples, the NOMA transmission processing module 640 may include an interference cancellation module 660. In some examples, the interference cancellation module 660 may be used to perform an interference cancellation operation on an interfering transmission identified by the interference determination module 650. The interference cancellation operation may be performed based at least in part on the downlink control information for any UE, in the NOMA group, that receives an interfering transmission that overlaps the first downlink transmission for the first UE. The interference cancellation operation may be performed using the RNTI(s) of the UE(s) receiving the interfering transmission(s). In some examples, the interference cancellation operation may include decoding the interfering transmission(s) and then canceling the interfering transmission(s) from the set of NOMA downlink transmissions.

Figure 7:
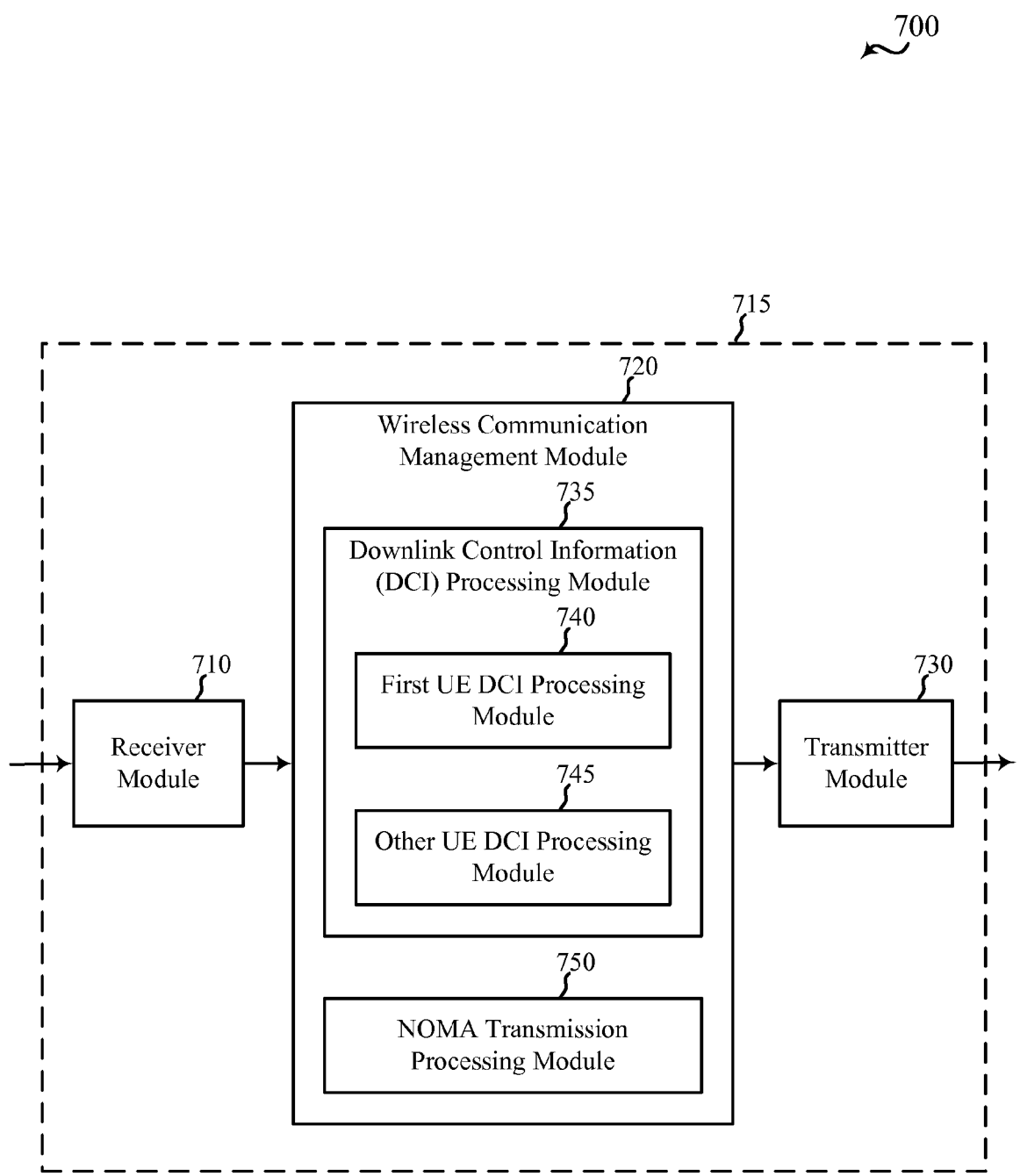
FIG. 7 shows a block diagram of an apparatus for use in wireless communication, in accordance with various aspects of the present disclosure.

FIG. 7 shows a block diagram 700 of an apparatus 715 for use in wireless communication, in accordance with various aspects of the present disclosure. In some examples, the apparatus 715 may be an example of aspects of one or more of the UEs 115, 315, or 315-a described with reference to FIG. 1 or 3. The apparatus 715 may also be a processor. The apparatus 715 may include a receiver module 710, a wireless communication management module 720, or a transmitter module 730. Each of these components may be in communication with each other.

The components of the apparatus 715 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 710 may include at least one RF receiver, such as at least one RF receiver operable to receive transmissions over at least one radio frequency spectrum band. In some examples, the at least one radio frequency spectrum band may be used for wireless communications, as described, for example, with reference to FIG. 1 or 3. The receiver module 710 may be used to receive various types of data or control signals (i.e., transmissions) over one or more communication links of a wireless communication system, such as one or more communication links of the wireless communication system 100 described with reference to FIG. 1.

In some examples, the transmitter module 730 may include at least one RF transmitter, such as at least one RF transmitter operable to transmit over at least one radio frequency spectrum band. The transmitter module 730 may be used to transmit various types of data or control signals (i.e., transmissions) over one or more communication links of a wireless communication system, such as one or more communication links of the wireless communication system 100 described with reference to FIG. 1.

The wireless communication management module 720 may be used to manage some or all of the wireless communications to or from the apparatus 715. In some examples, the wireless communication management module 720 may include a downlink control information (DCI) processing module 735 or a NOMA transmission processing module 750.

In some examples, the DCI processing module 735 may be used to receive downlink control information from a base station, and may include a first UE DCI processing module 740 or a second UE DCI processing module 745. The first UE DCI processing module 740 may be used to receive downlink control information for a first UE. The first UE may include the apparatus 715. In some examples, the downlink information for the first UE may be received based at least in part on an RNTI associated with the first UE. The downlink control information for the first UE may include an indication of at least a second UE. In some examples, the indication of at least the second UE may include an RNTI associated with the second UE. In some examples, the indication of at least the second UE may include an index associated with a set of other UEs that can be configured to operate in a NOMA group with the first UE. The set of other UEs may include the second UE. In some examples, the first UE DCI processing module 740 may be used to determine an RNTI associated with the second UE based at least in part on the index.

In some examples, the second UE DCI processing module 745 may be used to receive downlink control information for the second UE based at least in part on the indication of at least the second UE.

In some examples, the NOMA transmission processing module 750 may be used to receive a set of NOMA downlink transmissions at the first UE based at least in part on the downlink control information for the first UE and the downlink control information for the second UE.

Figure 8:
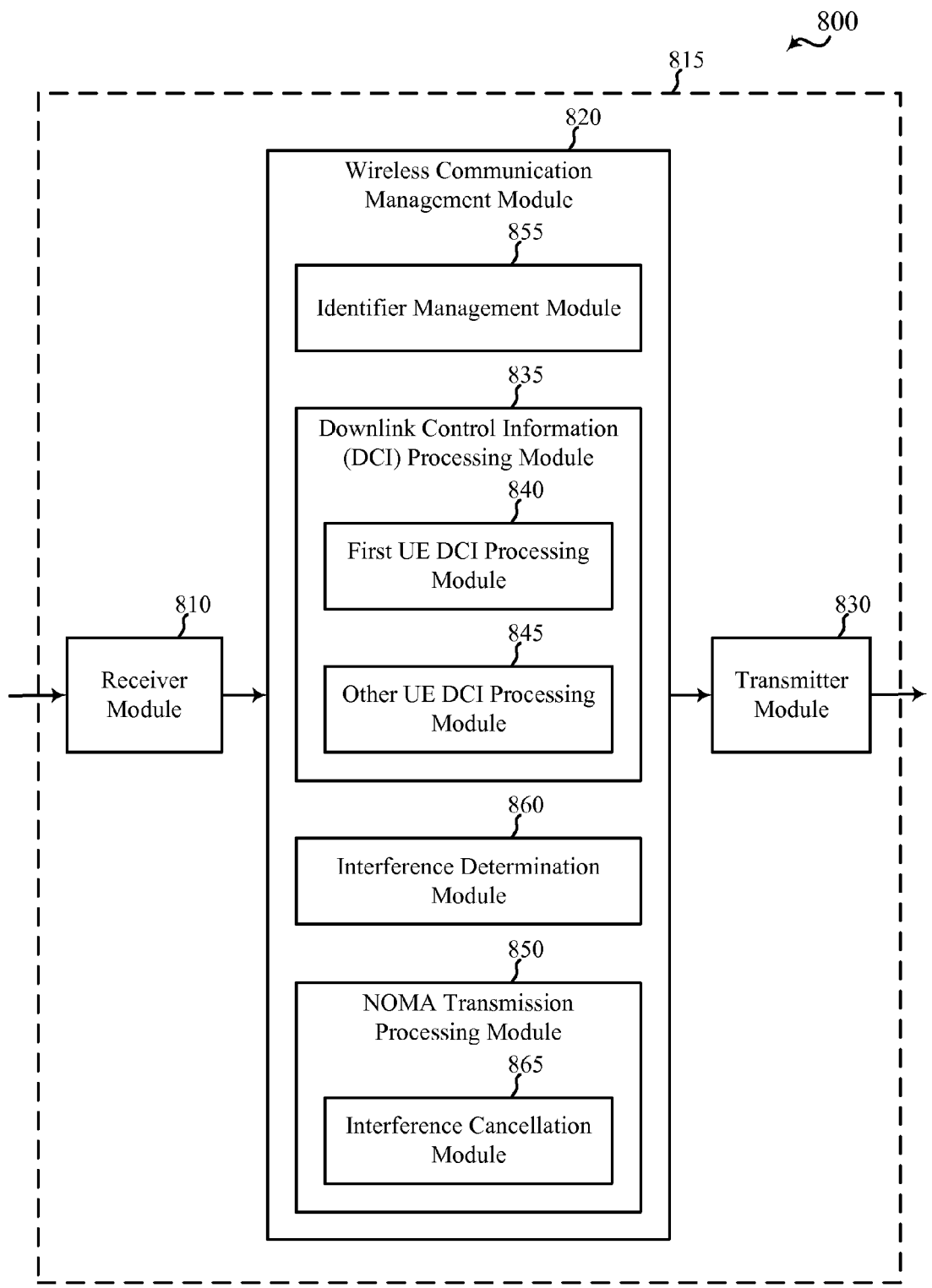
FIG. 8 shows a block diagram of an apparatus for use in wireless communication, in accordance with various aspects of the present disclosure.

FIG. 8 shows a block diagram 800 of an apparatus 815 for use in wireless communication, in accordance with various aspects of the present disclosure. In some examples, the apparatus 815 may be an example of aspects of one or more of the UEs 115, 315, or 315-a described with reference to FIG. 1 or 3, or aspects of the apparatus 715 described with reference to FIG. 7. The apparatus 815 may also be a processor. The apparatus 815 may include a receiver module 810, a wireless communication management module 820, or a transmitter module 830. Each of these components may be in communication with each other.

The components of the apparatus 815 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 810 may include at least one RF receiver, such as at least one RF receiver operable to receive transmissions over at least one radio frequency spectrum band. In some examples, the at least one radio frequency spectrum band may be used for wireless communications, as described, for example, with reference to FIG. 1 or 3. The receiver module 810 may be used to receive various types of data or control signals (i.e., transmissions) over one or more communication links of a wireless communication system, such as one or more communication links of the wireless communication system 100 described with reference to FIG. 1.

In some examples, the transmitter module 830 may include at least one RF transmitter, such as at least one RF transmitter operable to transmit over at least one radio frequency spectrum band. The transmitter module 830 may be used to transmit various types of data or control signals (i.e., transmissions) over one or more communication links of a wireless communication system, such as one or more communication links of the wireless communication system 100 described with reference to FIG. 1.

The wireless communication management module 820 may be used to manage some or all of the wireless communications to or from the apparatus 815. In some examples, the wireless communication management module 820 may include an identifier management module 855, a downlink control information (DCI) processing module 835, an interference determination module 860, or a NOMA transmission processing module 850.

In some examples, the identifier management module 855 may be used to receive a first UE identifier from a base station. In some examples, the identifier management module 855 may be used to transmit the first UE identifier to the base station. The first UE identifier may identify the first UE, and in some examples may include an RNTI associated with the first UE. In some examples, the first UE may include the apparatus 815.

In some examples, the DCI processing module 835 may be used to receive downlink control information from a base station, and may include a first UE DCI processing module 840 or a second UE DCI processing module 845. The first UE DCI processing module 840 may be used to receive downlink control information for a first UE. The first UE may include the apparatus 815. In some examples, the downlink information for the first UE may be received based at least in part on an RNTI associated with the first UE. The downlink control information for the first UE may include an indication of at least a second UE. In some examples, the indication of at least the second UE may include an RNTI associated with the second UE. In some examples, the indication of at least the second UE may include an index associated with a set of other UEs that can be configured to operate in a NOMA group with the first UE. The set of other UEs may include the second UE. In some examples, the first UE DCI processing module 840 may be used to determine an RNTI associated with the second UE based at least in part on the index.

In some examples, the second UE DCI processing module 845 may be used to receive downlink control information for the second UE based at least in part on the indication of at least the second UE. In some examples, the indication of at least the second UE may include an indication of the second UE, and receiving the downlink control information for the second UE may include decoding (e.g., descrambling (e.g., CRC-scrambling)) the downlink control information for the second UE based at least in part on the indication of the second UE.

In some examples, the interference determination module 860 may be used to determine, based at least in part on downlink control information for the first UE and downlink control information for the second UE (and possibly based on downlink control information for other UEs in a NOMA group), whether there is an interfering transmission that overlaps a first downlink transmission for the first UE (e.g., whether there is a transmission that may interfere with receipt of the first downlink transmission at the first UE). In some examples, the interfering transmission may include a second downlink transmission for the second UE. In some examples, the interfering transmission may include a downlink transmission for each of a number of UEs other than the first UE in the NOMA group, or the interfering transmission may include downlink transmissions for all of the UEs other than the first UE in the NOMA group.

In some examples, the NOMA transmission processing module 850 may be used to receive a set of NOMA downlink transmissions at the first UE based at least in part on the downlink control information for the first UE and the downlink control information for the second UE, or the downlink control information for any other UE in a NOMA group, which second UE or other UE may receive an interfering transmission that overlaps with the first downlink transmission for the first UE. In some examples, the NOMA transmission processing module 850 may be used to identify, in the set of NOMA downlink transmissions, the first downlink transmission for the first UE. The first downlink transmission for the first UE may be identified using a first RNTI for the first UE. In some examples, identifying the first downlink transmission for the first UE may include descrambling (e.g., CRC-descrambling) the first downlink transmission for the first UE.

In some examples, the NOMA transmission processing module 850 may include an interference cancellation module 865. In some examples, the interference cancellation module 865 may be used to perform an interference cancellation operation on an interfering transmission identified by the interference determination module 860. The interference cancellation operation may be performed based at least in part on the downlink control information for any UE, in a NOMA group, that receives an interfering transmission that overlaps the first downlink transmission for the first UE. The interference cancellation operation may be performed using the RNTI(s) associated with each UE receiving the interfering transmission(s). In some examples, the interference cancellation operation may include decoding the interfering transmission(s) and then canceling the interfering transmission(s) from the set of NOMA downlink transmissions.

Figure 9:
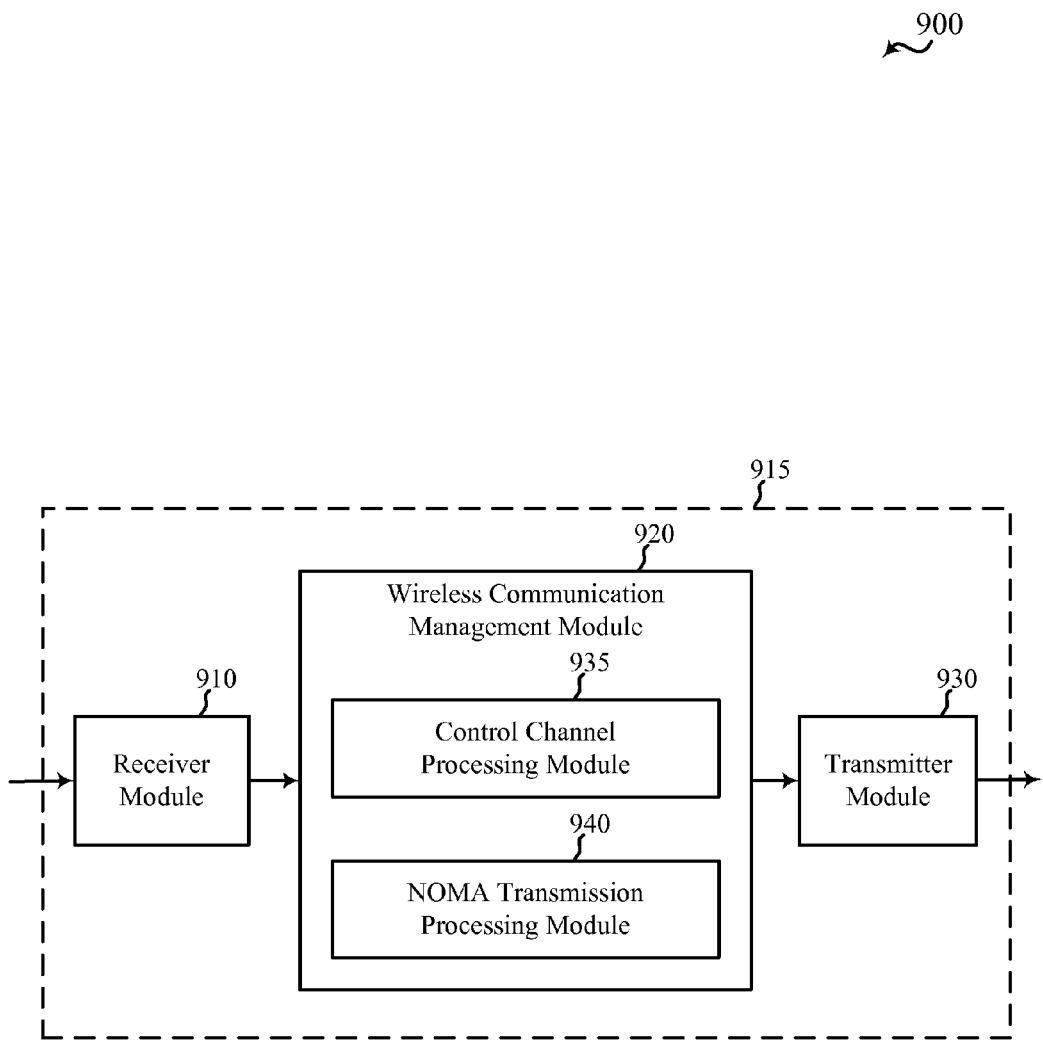
FIG. 9 shows a block diagram of an apparatus for use in wireless communication, in accordance with various aspects of the present disclosure.

FIG. 9 shows a block diagram 900 of an apparatus 915 for use in wireless communication, in accordance with various aspects of the present disclosure. In some examples, the apparatus 915 may be an example of aspects of one or more of the UEs 115, 415, or 415-*a* described with reference to FIG. 1 or 4. The apparatus 915 may also be a processor. The apparatus 915 may include a receiver module 910, a wireless communication management module 920, or a transmitter module 930. Each of these components may be in communication with each other.

The components of the apparatus 915 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 910 may include at least one RF receiver, such as at least one RF receiver operable to receive transmissions over at least one radio frequency spectrum band. In some examples, the at least one radio frequency spectrum band may be used for wireless communications, as described, for example, with reference to FIG. 1 or 4. The receiver module 910 may be used to receive various types of data or control signals (i.e., transmissions) over one or more communication links of a wireless communication system, such as one or more communication links of the wireless communication system 100 described with reference to FIG. 1.

In some examples, the transmitter module 930 may include at least one RF transmitter, such as at least one RF transmitter operable to transmit over at least one radio frequency spectrum band. The transmitter module 930 may be used to transmit various types of data or control signals (i.e., transmissions) over one or more communication links of a wireless communication system, such as one or more communication links of the wireless communication system 100 described with reference to FIG. 1.

The wireless communication management module 920 may be used to manage some or all of the wireless communications to or from the apparatus 915. In some examples, the wireless communication management module 920 may include a control channel processing module 935 or a NOMA transmission processing module 940.

In some examples, the control channel processing module 935 may be used to receive, at a first UE (e.g., a UE including the apparatus 915), at least one control channel element associated with the first UE. The at least one control channel element may include downlink control information for the first UE and at least a second UE.

In some examples, the NOMA transmission processing module 940 may be used to receive a set of NOMA downlink transmissions at the first UE based at least in part on the downlink control information for the first UE and at least the second UE.

Figure 10:
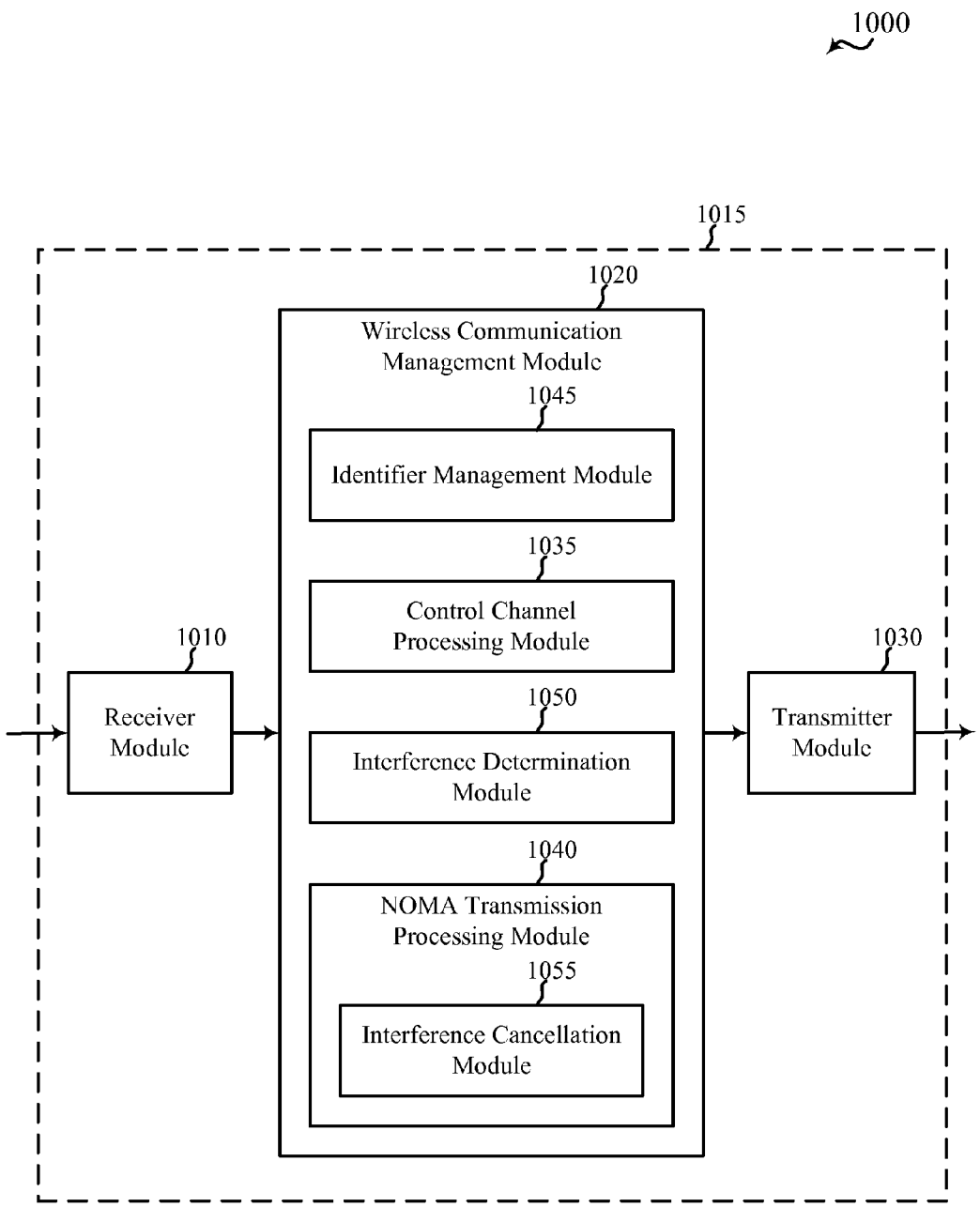
FIG. 10 shows a block diagram of an apparatus for use in wireless communication, in accordance with various aspects of the present disclosure.

FIG. 10 shows a block diagram 1000 of an apparatus 1015 for use in wireless communication, in accordance with various aspects of the present disclosure. In some examples, the apparatus 1015 may be an example of aspects of one or more of the UEs 115, 415, or 415-*a* described with reference to FIG. 1 or 4, or aspects of the apparatus 915 described with reference to FIG. 9. The apparatus 1015 may also be a processor. The apparatus 1015 may include a receiver module 1010, a wireless communication management module 1020, or a transmitter module 1030. Each of these components may be in communication with each other.

The components of the apparatus 1015 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1010 may include at least one RF receiver, such as at least one RF receiver operable to receive transmissions over at least one radio frequency spectrum band. In some examples, the at least one radio frequency spectrum band may be used for wireless communications, as described, for example, with reference to FIG. 1 or 4. The receiver module 1010 may be used to receive various types of data or control signals (i.e., transmissions) over one or more communication links of a wireless communication system, such as one or more communication links of the wireless communication system 100 described with reference to FIG. 1.

In some examples, the transmitter module 1030 may include at least one RF transmitter, such as at least one RF transmitter operable to transmit over at least one radio frequency spectrum band. The transmitter module 1030 may be used to transmit various types of data or control signals (i.e., transmissions) over one or more communication links of a wireless communication system, such as one or more communication links of the wireless communication system 100 described with reference to FIG. 1.

The wireless communication management module 1020 may be used to manage some or all of the wireless communications to or from the apparatus 1015. In some examples, the wireless communication management module 1020 may include an identifier management module 1045, a control channel processing module 1035, an interference determination module 1050, or a NOMA transmission processing module 1040.

In some examples, the identifier management module 1045 may be used to receive a first UE identifier from a base station. In some examples, the identifier management module 1045 may be used to transmit the first UE identifier to the base station. The first UE identifier may identify the first UE, and in some examples may include an RNTI associated with the first UE. In some examples, the first UE may include the apparatus 1015. In some examples, the identifier management module 1045 may also be used to receive or transmit UE identifiers associated with other UEs (e.g., UE identifiers associated with other UEs assigned to a NOMA group with the first UE).

In some examples, the control channel processing module 1035 may be used to receive, at a first UE, at least one control channel element associated with the first UE. The at least one control channel element may include downlink control information for the first UE and at least a second UE. In some examples, the control channel processing module 1035 may receive a single control channel element associated with the first UE. The single control channel element may include the downlink control information for the first UE and at least the second UE. In some examples, the control channel processing module 1035 may receive a first control channel element associated with the first UE and at least a second control channel element associated with the first UE. The first control channel element may include the downlink control information for the first UE, and at least the second control channel element may include the downlink control information for at least the second UE.

In some examples, the interference determination module 1050 may be used to determine, based at least in part on downlink control information for the first UE and downlink control information for the second UE (and possibly based on downlink control information for other UEs in a NOMA group), whether there is an interfering transmission that overlaps a first downlink transmission for the first UE (e.g., whether there is a transmission that may interfere with receipt of the first downlink transmission at the first UE). In some examples, the interfering transmission may include a second downlink transmission for the second UE. In some examples, the interfering transmission may include a downlink transmission for each of a number of UEs other than the first UE in the NOMA group, or the interfering transmission may include downlink transmissions for all of the UEs other than the first UE in the NOMA group.

In some examples, the NOMA transmission processing module 1040 may be used to receive a set of NOMA downlink transmissions at the first UE based at least in part on the downlink control information for the first UE and the downlink control information for the second UE, or the downlink control information for any other UE in a NOMA group, which second UE or other UE may receive an interfering transmission that overlaps with the first downlink transmission for the first UE. In some examples, the NOMA transmission processing module 1040 may be used to identify, in the set of NOMA downlink transmissions, the first downlink transmission for the first UE. The first downlink transmission for the first UE may be identified using the first UE identifier (e.g., the first RNTI) for the first UE. In some examples, identifying the first downlink transmission for the first UE may include descrambling (e.g., CRC-descrambling) the first downlink transmission for the first UE.

In some examples, the NOMA transmission processing module 1040 may include an interference cancellation module 1055. In some examples, the interference cancellation module 1055 may be used to perform an interference cancellation operation on an interfering transmission identified by the interference determination module 1050. The interference cancellation operation may be performed based at least in part on the downlink control information for any UE, in a NOMA group, that receives an interfering transmission that overlaps the first downlink transmission for the first UE. The interference cancellation operation may be performed using the RNTI(s) associated with each UE receiving the interfering transmission(s). In some examples, the interference cancellation operation may include decoding the interfering transmission(s) and then canceling the interfering transmission(s) from the set of NOMA downlink transmissions.

Figure 11:
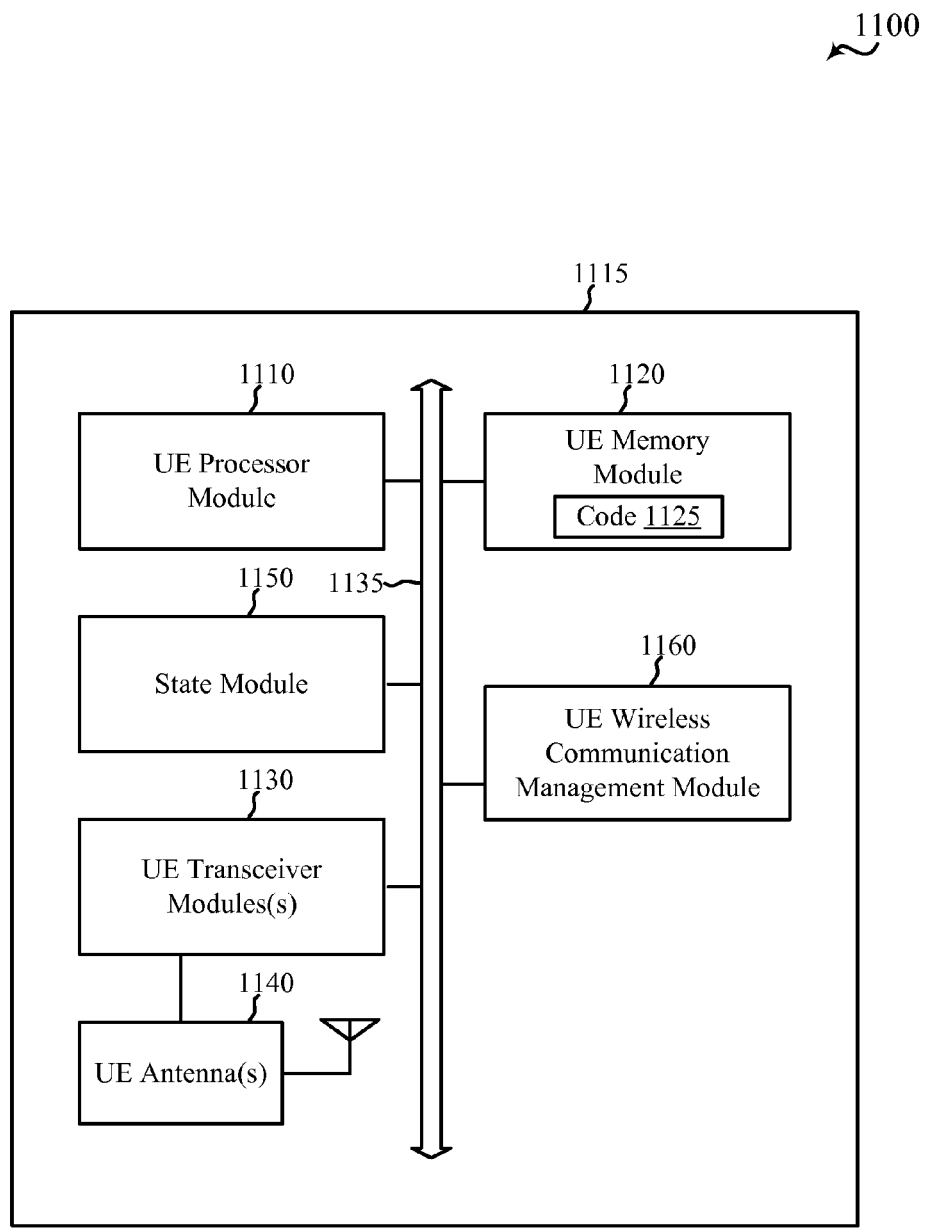
FIG. 11 shows a block diagram of a UE for use in wireless communication, in accordance with various aspects of the present disclosure.

FIG. 11 shows a block diagram 1100 of a UE 1115 for use in wireless communication, in accordance with various aspects of the present disclosure. The UE 1115 may have various configurations and may be included or be part of a personal computer (e.g., a laptop computer, a netbook computer, a tablet computer, etc.), a cellular telephone, a PDA, a digital video recorder (DVR), an internet appliance, a gaming console, an e-reader, etc. The UE 1115 may, in some examples, have an internal power supply (not shown), such as a small battery, to facilitate mobile operation. In some examples, the UE 1115 may be an example of aspects of one or more of the UEs 115, 215, 215-a, 315, or 415 described with reference to FIG. 1, 2, 3, or 4, or aspects of one or more of the apparatuses 515, 615, 715, 815, 915, or 1015 described with reference to FIG. 5, 6, 7, 8, 9, or 10. The UE 1115 may be configured to implement at least some of the UE or apparatus features and functions described with reference to FIG. 1, 2, 3, 4, 5, 6, 7, 8, 9, or 10.

The UE 1115 may include a UE processor module 1110, a UE memory module 1120, at least one UE transceiver module (represented by UE transceiver module(s) 1130), at least one UE antenna (represented by UE antenna(s) 1140), or a UE wireless communication management module 1160. Each of these components may be in communication with each other, directly or indirectly, over one or more buses 1135.

The UE memory module 1120 may include random access memory (RAM) or read-only memory (ROM). The UE memory module 1120 may store computer-readable, computer-executable code 1125 containing instructions that are configured to, when executed, cause the UE processor module 1110 to perform various functions described herein related to wireless communication or communication using NOMA communication techniques. Alternatively, the code 1125 may not be directly executable by the UE processor module 1110 but be configured to cause the UE 1115 (e.g., when compiled and executed) to perform various of the functions described herein.

The UE processor module 1110 may include an intelligent hardware device (e.g., a central processing unit (CPU), a microcontroller, an ASIC, etc.). The UE processor module 1110 may process information received through the UE transceiver module(s) 1130 or information to be sent to the UE transceiver module(s) 1130 for transmission through the UE antenna(s) 1140. The UE processor module 1110 may handle, alone or in connection with the UE wireless communication management module 1160, various aspects of wireless communication for the UE 1115.

The UE transceiver module(s) 1130 may include a modem configured to modulate packets and provide the modulated packets to the UE antenna(s) 1140 for transmission, and to demodulate packets received from the UE antenna(s) 1140. The UE transceiver module(s) 1130 may, in some examples, be implemented as one or more UE transmitter modules and one or more separate UE receiver modules. The UE transceiver module(s) 1130 may support communications in the first radio frequency spectrum band or the second radio frequency spectrum band. The UE transceiver module(s) 1130 may be configured to communicate bi-directionally, via the UE antenna(s) 1140, with one or more of the base stations 105, 205, 305 or 405 described with reference to FIG. 1, 2, 3, or 4. While the UE 1115 may include a single UE antenna, there may be examples in which the UE 1115 may include multiple UE antennas 1140.

The UE state module 1150 may be used, for example, to manage transitions of the UE 1115 between an RRC idle state and an RRC connected state, and may be in communication with other components of the UE 1115, directly or indirectly, over the one or more buses 1135. The UE state module 1150, or portions of it, may include a processor, or some or all of the functions of the UE state module 1150 may be performed by the UE processor module 1110 or in connection with the UE processor module 1110.

The UE wireless communication management module 1160 may be configured to perform or control some or all of the features or functions described with reference to FIG. 1, 2, 3, 4, 5, 6, 7, 8, 9, or 10 related to wireless communication, including some or all of the features or functions related to NOMA communication techniques for a UE. The UE wireless communication management module 1160, or portions of it, may include a processor, or some or all of the functions of the UE wireless communication management module 1160 may be performed by the UE processor module 1110 or in connection with the UE processor module 1110. In some examples, the UE wireless communication management module 1160 may be an example of the wireless communication management module 520, 620, 720, 820, 920, or 1020 described with reference to FIG. 5, 6, 7, 8, 9, or 10.

Figure 12:
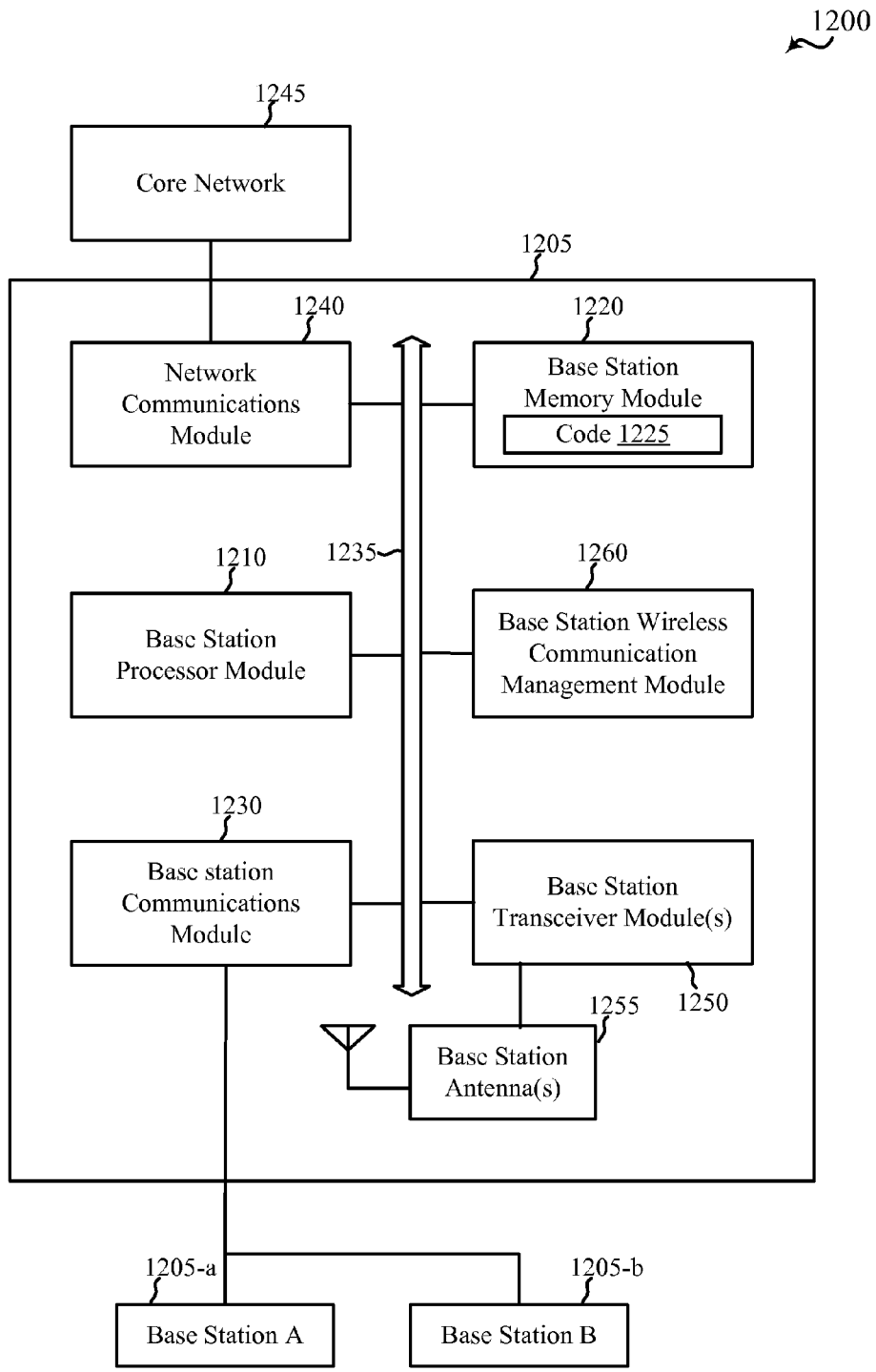
FIG. 12 shows a block diagram of a base station (e.g., a base station forming part or all of an eNB) for use in wireless communication, in accordance with various aspects of the present disclosure.

FIG. 12 shows a block diagram 1200 of a base station 1205 (e.g., a base station forming part or all of an eNB) for use in wireless communication, in accordance with various aspects of the present disclosure. In some examples, the base station 1205 may be an example of aspects of one or more of the base stations 105, 205, 305, or 405 described with reference to FIG. 1, 2, 3, or 4. The base station 1205 may be configured to implement or facilitate at least some of the base station or device features and functions described with reference to FIG. 1, 2, 3, or 4.

The base station 1205 may include a base station processor module 1210, a base station memory module 1220, at least one base station transceiver module (represented by base station transceiver module(s) 1250), at least one base station antenna (represented by base station antenna(s) 1255), or a base station wireless communication management module 1260. The base station 1205 may also include one or more of a base station communications module 1230 or a network communications module 1240. Each of these components may be in communication with each other, directly or indirectly, over one or more buses 1235.

The base station memory module 1220 may include RAM or ROM. The base station memory module 1220 may store computer-readable, computer-executable code 1225 containing instructions that are configured to, when executed, cause the base station processor module 1210 to perform various functions described herein related to wireless communication or communication using NOMA communication techniques. Alternatively, the code 1225 may not be directly executable by the base station processor module 1210 but be configured to cause the base station 1205 (e.g., when compiled and executed) to perform various of the functions described herein.

The base station processor module 1210 may include an intelligent hardware device (e.g., a CPU, a microcontroller, an ASIC, etc.). The base station processor module 1210 may process information received through the base station transceiver module(s) 1250, the base station communications module 1230, or the network communications module 1240. The base station processor module 1210 may also process information to be sent to the transceiver module(s) 1250 for transmission through the antenna(s) 1255, to the base station communications module 1230, for transmission to one or more other base stations 105-*d* and 105-*e*, or to the network communications module 1240 for transmission to a core network 1245, which may be an example of one or more aspects of the core network 130 described with reference to FIG. 1. The base station processor module 1210 may handle, alone or in connection with the base station wireless communication management module 1260, various aspects of wireless communication for the base station 1205.

The base station transceiver module(s) 1250 may include a modem configured to modulate packets and provide the modulated packets to the base station antenna(s) 1255 for transmission, and to demodulate packets received from the base station antenna(s) 1255. The base station transceiver module(s) 1250 may, in some examples, be implemented as one or more base station transmitter modules and one or more separate base station receiver modules. The base station transceiver module(s) 1250 may support communications in the one or more radio frequency spectrum bands. The base station transceiver module(s) 1250 may be configured to communicate bi-directionally, via the antenna(s) 1255, with one or more UEs or apparatuses, such as one or more of the UEs 115, 215, 215-*a*, 315, or 415 described with reference to FIG. 1, 2, 3, or 4, or one or more of the apparatuses 515, 615, 715, 815, 915, or 1015 described with reference to FIG. 5, 6, 7, 8, 9, or 10. The base station 1205 may, for example, include multiple base station antennas 1255 (e.g., an antenna array). The base station 1205 may communicate with the core network 1245 through the network communications module 1240. The base station 1205 may also communicate with other base stations, such as the base stations 1205-*a* and 1205-*b*, using the base station communications module 1230.

The base station wireless communication management module 1260 may be configured to perform or control some or all of the features or functions described with reference to FIG. 1, 2, 3, or 4 related to wireless communication, including some or all of the features or functions related to NOMA communication techniques for a base station. The base station wireless communication management module 1260, or portions of it, may include a processor, or some or all of the functions of the base station wireless communication management module 1260 may be performed by the base station processor module 1210 or in connection with the base station processor module 1210.

Figure 13:
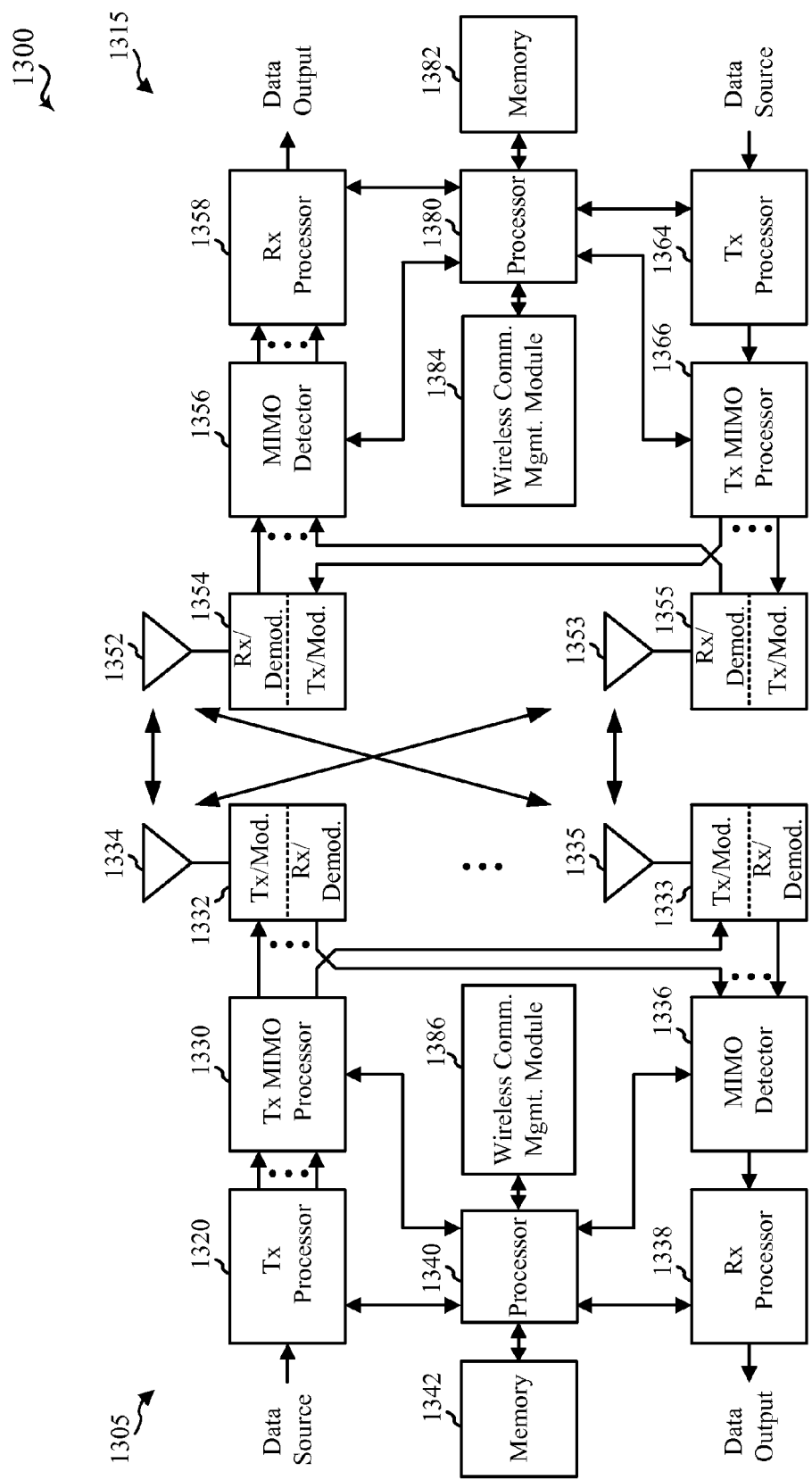
FIG. 13 is a block diagram of a multiple input/multiple output (MIMO) communication system including a base station and a UE, in accordance with various aspects of the present disclosure.

FIG. 13 is a block diagram of a multiple input/multiple output (MIMO) communication system 1300 including a base station 1305 and a UE 1315, in accordance with various aspects of the present disclosure. The MIMO communication system 1300 may illustrate aspects of the wireless communication system 100 described with reference to FIG. 1. In some examples, the base station 1305 may be an example of aspects of one or more of the base stations 105, 205, 305, 405, or 1205 described with reference to FIG. 1, 2, 3, 4, or 12. In some examples, the UE 1315 may be an example of aspects of one or more of the UEs 115, 215, 215-a, 315, 415, or 1115 described with reference to FIG. 1, 2, 3, 4, or 11, or aspects of one or more of the apparatuses 515, 615, 715, 815, 915, or 1015 described with reference to FIG. 5, 6, 7, 8, 9, or 10. The base station 1305 may be equipped with antennas 1334 through 1335, and the UE 1315 may be equipped with antennas 1352 through 1353. In the MIMO communication system 1300, the base station 1305 may be able to send data over multiple communication links at the same time. Each communication link may be called a "layer" and the "rank" of the communication link may indicate the number of layers used for communication. For example, in a 2×2 MIMO communications system where base station 1305 transmits two "layers," the rank of the communication link between the base station 1305 and the UE 1315 is two.

At the base station 1305, a transmit processor 1320 may receive data from a data source. The transmit processor 1320 may process the data. The transmit processor 1320 may also generate control symbols or reference symbols. A transmit (TX) MIMO processor 1330 may perform spatial processing (e.g., precoding) on data symbols, control symbols, or reference symbols, if applicable, and may provide output symbol streams to the transmit modulators 1332 through 1333. Each modulator 1332 through 1333 may process a respective output symbol stream (e.g., for OFDM, etc.) to obtain an output sample stream. Each modulator 1332 through 1333 may further process (e.g., convert to analog, amplify, filter, and up-convert) the output sample stream to obtain a DL signal. In one example, DL signals from modulators 1332 through 1333 may be transmitted via the antennas 1334 through 1335, respectively.

At the UE 1315, the UE antennas 1352 through 1353 may receive the DL signals from the base station 1305 and may provide the received signals to the demodulators 1354 through 1355, respectively. Each demodulator 1354 through 1355 may condition (e.g., filter, amplify, down-convert, and digitize) a respective received signal to obtain input samples. Each demodulator 1354 through 1355 may further process the input samples (e.g., for OFDM, etc.) to obtain received symbols. A MIMO detector 1356 may obtain received symbols from all the demodulators 1354 through 1355, perform MIMO detection on the received symbols, if applicable, and provide detected symbols. A receive processor 1358 may process (e.g., demodulate, de-interleave, and decode) the detected symbols, providing decoded data for the UE 1315 to a data output, and provide decoded control information to a processor 1380, or memory 1382.

The processor 1380 may in some cases execute stored instructions to instantiate a wireless communication management module 1384. The wireless communication management module 1384 may be an example of aspects of the wireless communication management module 520, 620, 720, 820, 920, 1020, or 1160 described with reference to FIG. 5, 6, 7, 8 9, 10, or 11.

On the uplink (UL), at the UE 1315, a transmit processor 1364 may receive and process data from a data source. The transmit processor 1364 may also generate reference symbols for a reference signal. The symbols from the transmit processor 1364 may be pre-coded by a transmit MIMO processor 1366 if applicable, further processed by the modulators 1354 through 1355 (e.g., for SC-FDMA, etc.), and be transmitted to the base station 1305 in accordance with the transmission parameters received from the base station 1305. At the base station 1305, the UL signals from the UE 1315 may be received by the antennas 1334 through 1335, processed by the demodulators 1332 through 1333, detected by a MIMO detector 1336 if applicable, and further processed by a receive processor 1338. The receive processor 1338 may provide decoded data to a data output and to the processor 1340 or memory 1342. The processor 1340 may in some cases execute stored instructions to instantiate a wireless communication management module 1386. The wireless communication management module 1386 may be an example of aspects of the wireless communication management module 1260 described with reference to FIG. 12.

The components of the UE 1315 may, individually or collectively, be implemented with one or more ASICs adapted to perform some or all of the applicable functions in hardware. Each of the noted modules may be a means for performing one or more functions related to operation of the MIMO communication system 1300. Similarly, the components of the base station 1305 may, individually or collectively, be implemented with one or more ASICs adapted to perform some or all of the applicable functions in hardware. Each of the noted components may be a means for performing one or more functions related to operation of the MIMO communication system 1300.

Figure 14:
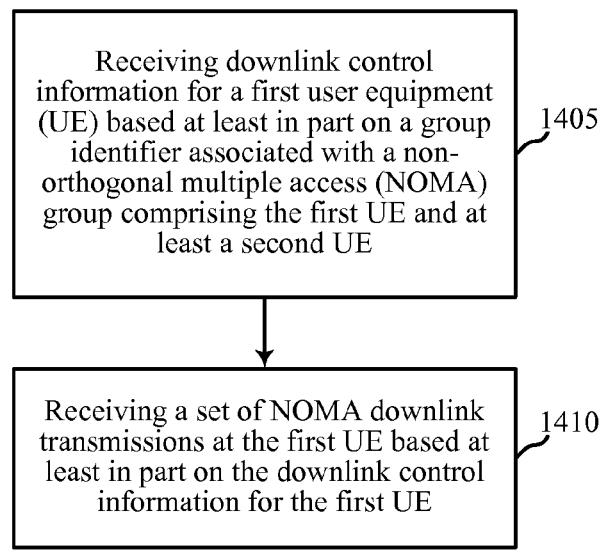
FIG. 14 is a flow chart illustrating an example of a method for wireless communication, in accordance with various aspects of the present disclosure.

FIG. 14 is a flow chart illustrating an example of a method 1400 for wireless communication, in accordance with various aspects of the present disclosure. For clarity, the method 1400 is described below with reference to aspects of one or more of the UEs 115, 215, 215-a, 1115, or 1315 described with reference to FIG. 1, 2, 11, or 13, or aspects of one or more of the apparatuses 515 or 615 described with reference to FIG. 5 or 6. In some examples, a UE or apparatus may execute one or more sets of codes to control the functional elements of the UE or apparatus to perform the functions described below. Additionally or alternatively, the UE or apparatus may perform one or more of the functions described below using special-purpose hardware.

At block 1405, the method 1400 may include receiving downlink control information for a first UE based at least in part on a group identifier associated with a NOMA group including the first UE and at least a second UE. The operation(s) at block 1405 may be performed using the wireless communication management module 520, 620, 1160, or 1384 described with reference to FIG. 5, 6, 11, or 13, or the DCI processing module 535 or 635 described with reference to FIG. 5 or 6.

At block 1410, the method 1400 may include receiving a set of NOMA downlink transmissions at the first UE using the downlink control information for the first UE. The operation(s) at block 1410 may be performed using the wireless communication management module 520, 620, 1160, or 1384 described with reference to FIG. 5, 6, 11, or 13, or the NOMA transmission processing module 540 or 640 described with reference to FIG. 5 or 6.

Thus, the method 1400 may provide for wireless communication. It should be noted that the method 1400 is just one implementation and that the operations of the method 1400 may be rearranged or otherwise modified such that other implementations are possible.

Figure 15:
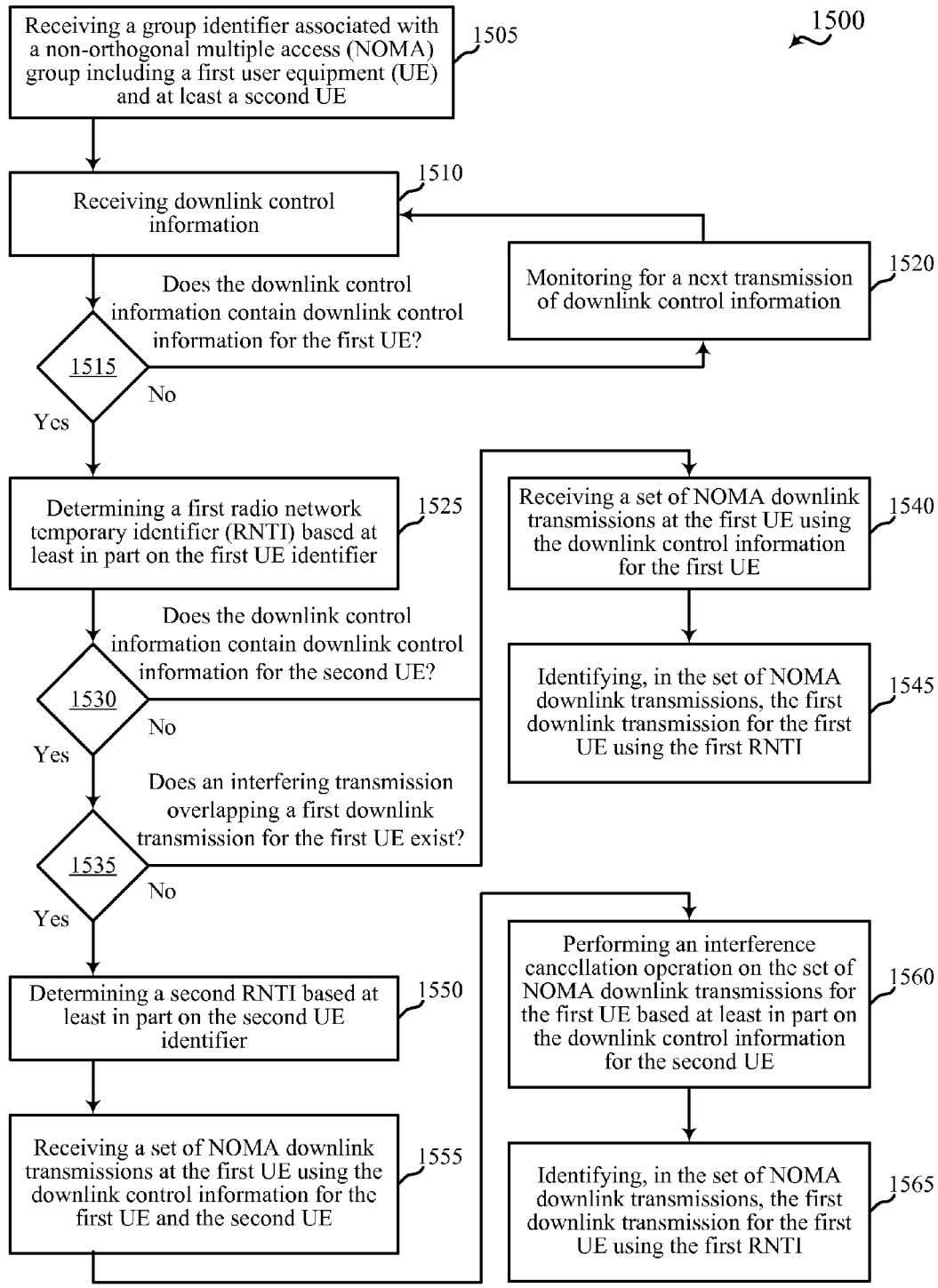
FIG. 15 is a flow chart illustrating an example of a method for wireless communication, in accordance with various aspects of the present disclosure.

FIG. 15 is a flow chart illustrating an example of a method 1500 for wireless communication, in accordance with various aspects of the present disclosure. For clarity, the method 1500 is described below with reference to aspects of one or more of the UEs 115, 215, 215-*a*, 1115, or 1315 described with reference to FIG. 1, 2, 11, or 13, or aspects of one or more of the apparatuses 515 or 615 described with reference to FIG. 5 or 6. In some examples, a UE or apparatus may execute one or more sets of codes to control the functional elements of the UE or apparatus to perform the functions described below. Additionally or alternatively, the UE or apparatus may perform one or more of the functions described below using special-purpose hardware.

At block 1505, the method 1500 may include receiving a group identifier or a first UE identifier from a base station. The group identifier may be associated with a NOMA group including a first UE and at least a second UE. The first UE identifier may identify the first UE. In some examples, the operation(s) at block 1505 may further include receiving a range of UE identifiers associated with the NOMA group. The range of UE identifiers may include at least a second UE identifier. The second UE identifier may identify the second UE. In some examples, the group identifier, the first UE identifier, or the range of UE identifiers may be received from the base station during a random access procedure. In some examples, the group identifier may include a group RNTI. In some examples, the operation(s) at block 1505 may include transmitting the first UE identifier to the base station. The operation(s) at block 1505 may be performed using the wireless communication management module 520, 620, 1160, or 1384 described with reference to FIG. 5, 6, 11, or 13, or the identifier management module 645 described with reference to FIG. 6.

At block 1510, the method 1500 may include receiving downlink control information based at least in part on the group identifier received at block 1505 (e.g., the method 1500 may include descrambling (e.g., CRC-descrambling) downlink control information using the group identifier). In some examples, the downlink control information may include downlink control information for the first UE, downlink control information for the second UE, or downlink control information for other UEs in the NOMA group. In some examples, receiving downlink control information based at least in part on the group identifier may include receiving all downlink control information associated with the NOMA group based at least in part on the group identifier.

In some examples of the method 1500, the downlink control information received for a UE may be received based at least in part on the group identifier. For example, the downlink control information for the first UE may be decoded (e.g., descrambled (e.g., CRC-descrambled)) using the group identifier, and the downlink control information for the second UE may be decoded (e.g., descrambled (e.g., CRC-descrambled)) using the group identifier. In other examples of the method 1500, the downlink control information received for a UE may be received based at least in part on a deterministic function (e.g., an XOR) of the group identifier and a UE identifier. For example, the downlink control information for the first UE may be decoded (e.g., descrambled (e.g., CRC-descrambled)) based at least in part on a deterministic function of the group identifier and the first UE identifier, and the downlink control information for the second UE may be decoded (e.g., descrambled (e.g., CRC-descrambled)) based at least in part on a deterministic function of the group identifier and the second UE identifier.

At block 1515, the method 1500 may include determining whether the downlink control information contains downlink control information for the first UE. The determination may be based at least in part on the first UE identifier assigned to the first UE. In examples in which the downlink control information for a UE is scrambled using the group identifier, the determination may be based at least in part on whether the downlink control information references (e.g., includes) the first UE identifier. In examples in which the downlink control information for the first UE is scrambled using a deterministic function of the group identifier and the first UE identifier, the determination may be based at least in part on an ability to decode (e.g., descramble (e.g., CRC-descramble)) the downlink control information for the first UE. Upon not identifying downlink control information for the first UE, the method 1500 may continue at block 1520. Upon identifying downlink control information for the first UE, the method 1500 may continue at block 1525.

At block 1520, the method 1500 may include monitoring for a next transmission of downlink control information.

The operation(s) at block 1510, 1515, or 1520 may be performed using the wireless communication management module 520, 620, 1160, or 1384 described with reference to FIG. 5, 6, 11, or 13, or the DCI processing module 535 or 635 described with reference to FIG. 5 or 6.

At block 1525, the method 1500 may include determining a first RNTI corresponding to a first downlink transmission for the first UE. The first RNTI may be determined based at least in part on the first UE identifier. In some examples, the first RNTI may be determined based at least in part on a deterministic function (e.g., an XOR) of the first UE identifier and the group identifier. The operation(s) at block 1525 may be performed using the wireless communication management module 520, 620, 1160, or 1384 described with reference to FIG. 5, 6, 11, or 13, or the downlink transmission RNTI determination module 655 described with reference to FIG. 6.

At block 1530, the method 1500 may include determining whether the downlink control information contains downlink control information for the second UE. The determination may be based at least in part on a second UE identifier assigned to the second UE. In examples in which the downlink control information for a UE is scrambled using the group identifier, the determination may be based at least in part on whether the downlink control information references (e.g., includes) the second UE identifier. In examples in which the downlink control information for the second UE is scrambled using a deterministic function of the group identifier and the second UE identifier, the determination may be based at least in part on an ability to decode (e.g., descramble (e.g., CRC-descramble)) the downlink control information for the second UE. Upon not identifying downlink control information for the second UE, the method 1500 may continue at block 1540. Upon identifying downlink control information for the second UE, the method 1500 may continue at block 1545. The operation(s) at block 1530 may be performed using the wireless communication management module 520, 620, 1160, or 1384 described with reference to FIG. 5, 6, 11, or 13, or the DCI processing module 535 or 635 described with reference to FIG. 5 or 6. In some examples, the operation(s) at block 1530 may be performed for at least the second UE (e.g., the operation(s) may be performed for each of a number of UEs other than the first UE in the NOMA group, or for all of the UEs other than the first UE in the NOMA group).

At block 1535, the method 1500 may include determining, based at least in part on the downlink control information for the first UE and the downlink control information for the second UE (and possibly based on downlink control information for other UEs in the NOMA group), whether there is an interfering transmission that overlaps a first downlink transmission for the first UE (e.g., whether there is a transmission that may interfere with receipt of the first downlink transmission at the first UE). In some examples, the interfering transmission may include a second downlink transmission for the second UE. In some examples, the interfering transmission may include a downlink transmission for each of a number of UEs other than the first UE in the NOMA group, or the interfering transmission may include downlink transmissions for all of the UEs other than the first UE in the NOMA group. Upon determining that there is not an interfering transmission, the method 1500 may continue at block 1540. Upon determining that there is an interfering transmission, the method 1500 may continue at block 1550. The operation(s) at block 1535 may be performed using the wireless communication management module 520, 620, 1160, or 1384 described with reference to FIG. 5, 6, 11, or 13, or the interference determination module 650 described with reference to FIG. 6.

At block 1540, the method 1500 may include receiving a set of NOMA downlink transmissions at the first UE based at least in part on the downlink control information for the first UE. At block 1545, the method 1500 may include identifying, in the set of NOMA downlink transmissions, the first downlink transmission for the first UE. The first downlink transmission for the first UE may be identified using the first RNTI. In some examples, identifying the first downlink transmission for the first UE may include descrambling (e.g., CRC-descrambling) the first downlink transmission for the first UE. In some examples, the identifying operation(s) performed at block 1545 may be performed as part of the receiving operation(s) performed at block 1540. The operation(s) at block 1540 or 1545 may be performed using the wireless communication management module 520, 620, 1160, or 1384 described with reference to FIG. 5, 6, 11, or 13, or the NOMA transmission processing module 540 or 640 described with reference to FIG. 5 or 6.

At block 1550, the method 1500 may include determining a second RNTI corresponding to a second downlink transmission for the second UE. The second RNTI may be determined based at least in part on the second UE identifier. In some examples, the second RNTI may be determined based at least in part on a deterministic function (e.g., an XOR) of the second UE identifier and the group identifier. The operation(s) at block 1550 may be performed using the wireless communication management module 520, 620, 1160, or 1384 described with reference to FIG. 5, 6, 11, or 13, or the downlink transmission RNTI determination module 655 described with reference to FIG. 6. In some examples, the operation(s) at block 1550 may be performed for at least the second UE (e.g., the operation(s) may be performed for each of a number of UEs other than the first UE in the NOMA group, or for all of the UEs other than the first UE in the NOMA group, depending, for example, on whether the downlink control information received at block 1510 contains downlink control information for a UE or depending on whether there is an interfering transmission for the UE overlapping the first downlink transmission for the first UE).

At block 1555, the method 1500 may include receiving a set of NOMA downlink transmissions at the first UE based at least in part on the downlink control information for the first UE and the downlink control information for the second UE (and in some examples, downlink control information for each of a number of UEs other than the first UE in the NOMA group, depending on the determination(s) made at block 1530 or 1535). The operation(s) at block 1555 may be performed using the wireless communication management module 520, 620, 1160, or 1384 described with reference to FIG. 5, 6, 11, or 13, or the NOMA transmission processing module 540 or 640 described with reference to FIG. 5 or 6.

At block 1560, the method 1500 may include performing an interference cancellation operation on the interfering transmission(s) identified at block 1535. The interference cancellation operation may be performed based at least in part on the downlink control information for the second UE. The interference cancellation operation may also be performed using the second RNTI. In some examples the interference cancellation operation may be performed based at least in part on the downlink control information for each of a number of UEs other than the first UE in the NOMA group, depending on the determinations(s) made at block 1530 or 1535. The interference cancellation operation may also be performed using RNTIs for each of the number of UEs other than the first UE. In some examples, the interference cancellation operation may include decoding the interfering transmission(s) and then canceling the interfering transmission(s) from the set of NOMA downlink transmissions. The operation(s) at block 1560 may be performed using the wireless communication management module 520, 620, 1160, or 1384 described with reference to FIG. 5, 6, 11, or 13, or the interference cancellation module 660 described with reference to FIG. 6.

At block 1565, the method 1500 may include identifying, in the set of NOMA downlink transmissions, the first downlink transmission for the first UE. The first downlink transmission for the first UE may be identified using the first RNTI. In some examples, identifying the first downlink transmission for the first UE may include descrambling (e.g., CRC-descrambling) the first downlink transmission for the first UE. In some examples, the identifying operation(s) performed at block 1545 may be performed as part of the receiving operation(s) performed at block 1540. The operation(s) at block 1540 or 1545 may be performed using the wireless communication management module 520, 620, 1160, or 1384 described with reference to FIG. 5, 6, 11, or 13, or the NOMA transmission processing module 540 or 640 described with reference to FIG. 5 or 6.

Thus, the method 1500 may provide for wireless communication. It should be noted that the method 1500 is just one implementation and that the operations of the method 1500 may be rearranged or otherwise modified such that other implementations are possible.

Figure 16:
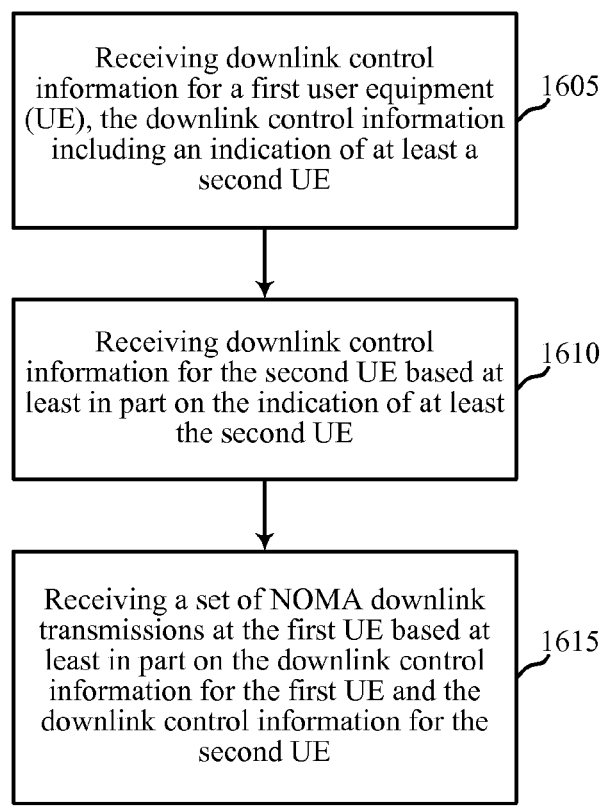
FIG. 16 is a flow chart illustrating an example of a method for wireless communication, in accordance with various aspects of the present disclosure.

FIG. 16 is a flow chart illustrating an example of a method 1600 for wireless communication, in accordance with various aspects of the present disclosure. For clarity, the method 1600 is described below with reference to aspects of one or more of the UEs 115, 315, 315-a, 1115, or 1315 described with reference to FIG. 1, 3, 11, or 13, or aspects of one or more of the apparatuses 715 or 815 described with reference to FIG. 7 or 8. In some examples, a UE or apparatus may execute one or more sets of codes to control the functional elements of the UE or apparatus to perform the functions described below. Additionally or alternatively, the UE or apparatus may perform one or more of the functions described below using special-purpose hardware.

At block 1605, the method 1600 may include receiving downlink control information for a first UE. In some examples, the downlink information for the first UE may be received based at least in part on an RNTI associated with the first UE. The downlink control information for the first UE may include an indication of at least a second UE. In some examples, the indication of at least the second UE may include an RNTI associated with the second UE. In some examples, the indication of at least the second UE may include an index associated with a set of other UEs that can be configured to operate in a NOMA group with the first UE. The set of other UEs may include the second UE. In some examples, the method 1600 may include determining an RNTI associated with the second UE based at least in part on the index. The operation(s) at block 1605 may be performed using the wireless communication management module 720, 820, 1160, or 1384 described with reference to FIG. 7, 8, 11, or 13, or the DCI processing module 735 or 835 or the first UE DCI processing module 740 or 840 described with reference to FIG. 7 or 8.

At block 1610, the method 1600 may include receiving downlink control information for the second UE based at least in part on the indication of at least the second UE. The operation(s) at block 1610 may be performed using the wireless communication management module 720, 820, 1160, or 1384 described with reference to FIG. 7, 8, 11, or 13, or the DCI processing module 735 or 835 or the second UE DCI processing module 745 or 845 described with reference to FIG. 7 or 8.

At block 1615, the method 1600 may include receiving a set of NOMA downlink transmissions at the first UE based at least in part on the downlink control information for the first UE and the downlink control information for the second UE. The operation(s) at block 1615 may be performed using the wireless communication management module 720, 820, 1160, or 1384 described with reference to FIG. 7, 8, 11, or 13, or the NOMA transmission processing module 750 or 850 described with reference to FIG. 7 or 8.

Thus, the method 1600 may provide for wireless communication. It should be noted that the method 1600 is just one implementation and that the operations of the method 1600 may be rearranged or otherwise modified such that other implementations are possible.

Figure 17:
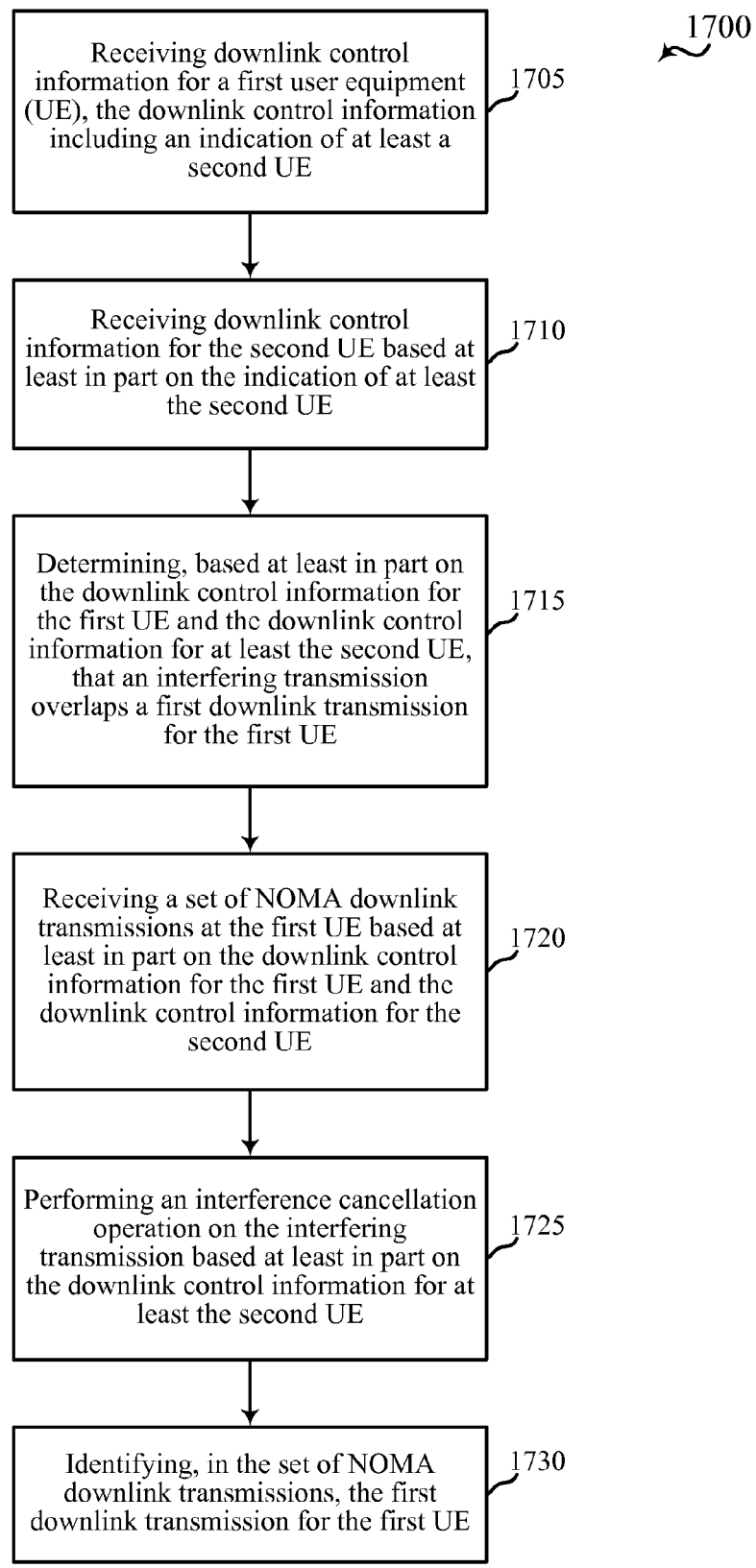
FIG. 17 is a flow chart illustrating an example of a method for wireless communication, in accordance with various aspects of the present disclosure.

FIG. 17 is a flow chart illustrating an example of a method 1700 for wireless communication, in accordance with various aspects of the present disclosure. For clarity, the method 1700 is described below with reference to aspects of one or more of the UEs 115, 315, 315-a, 1115, or 1315 described with reference to FIG. 1, 3, 11, or 13, or aspects of one or more of the apparatuses 715 or 815 described with reference to FIG. 7 or 8. In some examples, a UE or apparatus may execute one or more sets of codes to control the functional elements of the UE or apparatus to perform the functions described below. Additionally or alternatively, the UE or apparatus may perform one or more of the functions described below using special-purpose hardware.

At block 1705, the method 1700 may include receiving downlink control information for a first UE. In some examples, the downlink information for the first UE may be received based at least in part on an RNTI associated with the first UE. The downlink control information for the first UE may include an indication of at least a second UE. In some examples, the indication of at least the second UE may include an RNTI associated with the second UE. In some examples, the indication of at least the second UE may include an index associated with a set of other UEs that can be configured to operate in a NOMA group with the first UE. The set of other UEs may include the second UE. In some examples, the method 1700 may include determining an RNTI associated with the second UE based at least in part on the index. The operation(s) at block 1705 may be performed using the wireless communication management module 720, 820, 1160, or 1384 described with reference to FIG. 7, 8, 11, or 13, or the DCI processing module 735 or 835 or the first UE DCI processing module 740 or 840 described with reference to FIG. 7 or 8.

At block 1710, the method 1700 may include receiving downlink control information for the second UE based at least in part on the indication of at least the second UE. In some examples, the indication of at least the second UE may include an indication of the second UE, and receiving the downlink control information for the second UE may include decoding (e.g., descrambling (e.g., CRC-descrambling)) the downlink control information for the second UE based at least in part on the indication of the second UE. The operation(s) at block 1710 may be performed using the wireless communication management module 720, 820, 1160, or 1384 described with reference to FIG. 7, 8, 11, or 13, or the DCI processing module 735 or 835 or the second UE DCI processing module 745 or 845 described with reference to FIG. 7 or 8.

At block 1715, the method 1700 may include determining, based at least in part on the downlink control information for the first UE and the downlink control information for at least the second UE, that an interfering transmission overlaps a first downlink transmission for the first UE. The operation(s) at block 1715 may be performed using the wireless communication management module 720, 820, 1160, or 1384 described with reference to FIG. 7, 8, 11, or 13, or the interference determination module 860 described with reference to FIG. 8.

At block 1720, the method 1700 may include receiving a set of NOMA downlink transmissions at the first UE based at least in part on the downlink control information for the first UE and the downlink control information for the second UE. The operation(s) at block 1720 may be performed using the wireless communication management module 720, 820, 1160, or 1384 described with reference to FIG. 7, 8, 11, or 13, or the NOMA transmission processing module 750 or 850 described with reference to FIG. 7 or 8.

At block 1725, the method 1700 may include performing an interference cancellation operation on the interfering transmission(s). The interference cancellation operation may be performed based at least in part on the downlink control information for the second UE. The interference cancellation operation may also be performed using an RNTI associated with the second UE. In some examples the interference cancellation operation may be performed based at least in part on the downlink control information for each of a number of UEs other than the first UE in a NOMA group, depending on the determinations(s) made at block 1715. The interference cancellation operation may also be performed using RNTIs for each of the number of UEs other than the first UE. In some examples, the interference cancellation operation may include decoding the interfering transmission(s) and then canceling the interfering transmission(s) from the set of NOMA downlink transmissions received at block 1720. The operation(s) at block 1725 may be performed using the wireless communication management module 720, 820, 1160, or 1384 described with reference to FIG. 7, 8, 11, or 13, or the interference cancellation module 865 described with reference to FIG. 8.

At block 1730, the method 1700 may include identifying, in the set of NOMA downlink transmissions, the first downlink transmission for the first UE. In some examples, the first downlink transmission for the first UE may be identified using a first RNTI for the first UE. In some examples, identifying the first downlink transmission for the first UE may include descrambling (e.g., CRC-descrambling) the first downlink transmission for the first UE. The operation(s) at block 1730 may be performed using the wireless communication management module 720, 820, 1160, or 1384 described with reference to FIG. 7, 8, 11, or 13, or the NOMA transmission processing module 750 or 850 described with reference to FIG. 7 or 8.

Thus, the method 1700 may provide for wireless communication. It should be noted that the method 1700 is just one implementation and that the operations of the method 1700 may be rearranged or otherwise modified such that other implementations are possible.

Figure 18:
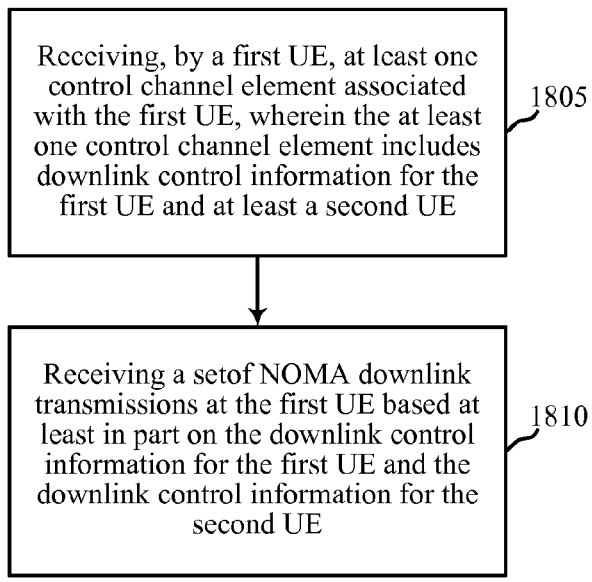
FIG. 18 is a flow chart illustrating an example of a method for wireless communication, in accordance with various aspects of the present disclosure.

FIG. 18 is a flow chart illustrating an example of a method 1800 for wireless communication, in accordance with various aspects of the present disclosure. For clarity, the method 1800 is described below with reference to aspects of one or more of the UEs 115, 415, 415-a, 1115, or 1315 described with reference to FIG. 1, 4, 11, or 13, or aspects of one or more of the apparatuses 915 or 1015 described with reference to FIG. 9 or 10. In some examples, a UE or apparatus may execute one or more sets of codes to control the functional elements of the UE or apparatus to perform the functions described below. Additionally or alternatively, the UE or apparatus may perform one or more of the functions described below using special-purpose hardware.

At block 1805, the method 1800 may include receiving, at a first UE, at least one control channel element associated with the first UE. The at least one control channel element may include downlink control information for the first UE and at least a second UE. The operation(s) at block 1805 may be performed using the wireless communication management module 920, 1020, 1160, or 1384 described with reference to FIG. 9, 10, 11, or 13, or the control channel processing module 935 or 1035 described with reference to FIG. 9 or 10.

At block 1810, the method 1800 may include receiving a set of NOMA downlink transmissions at the first UE based at least in part on the downlink control information for the first UE and at least the second UE. The operation(s) at block 1810 may be performed using the wireless communication management module 920, 1020, 1160, or 1384 described with reference to FIG. 9, 10, 11, or 13, or the NOMA transmission processing module 940 or 1040 described with reference to FIG. 9 or 10.

Thus, the method 1800 may provide for wireless communication. It should be noted that the method 1800 is just one implementation and that the operations of the method 1800 may be rearranged or otherwise modified such that other implementations are possible.

Figure 19:
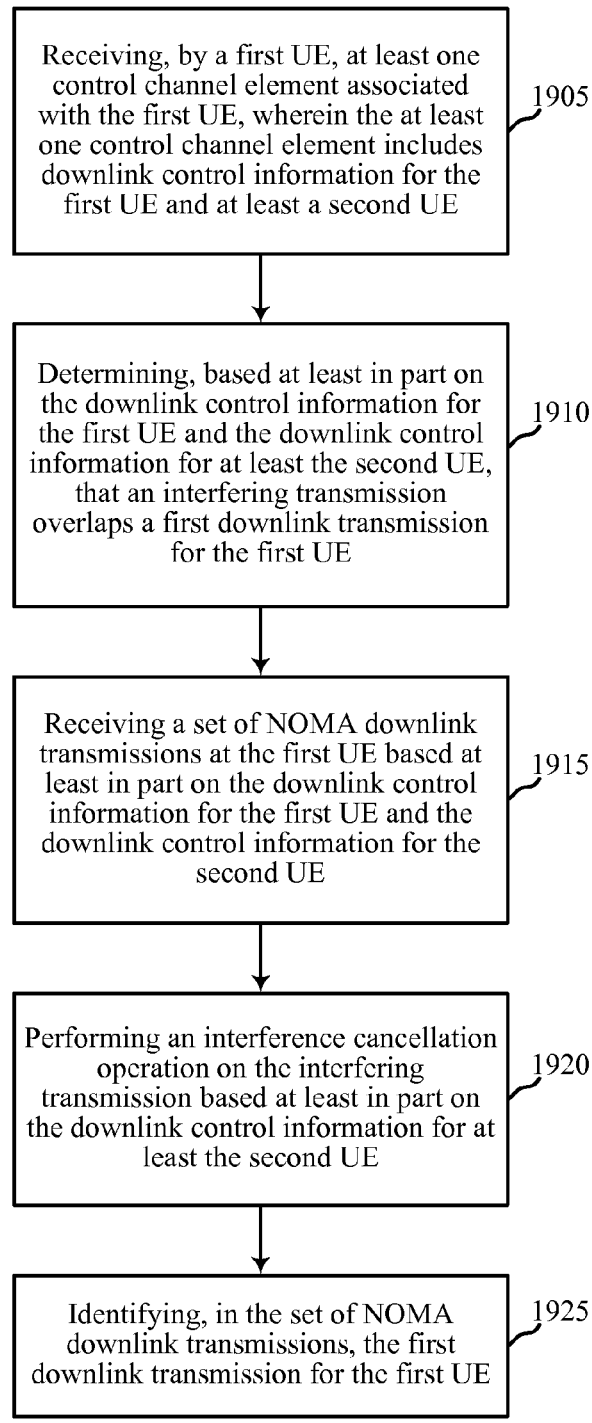
FIG. 19 is a flow chart illustrating an example of a method for wireless communication, in accordance with various aspects of the present disclosure.

FIG. 19 is a flow chart illustrating an example of a method 1900 for wireless communication, in accordance with various aspects of the present disclosure. For clarity, the method 1900 is described below with reference to aspects of one or more of the UEs 115, 415, 415-a, 1115, or 1315 described with reference to FIG. 1, 4, 11, or 13, or aspects of one or more of the apparatuses 915 or 1015 described with reference to FIG. 9 or 10. In some examples, a UE or apparatus may execute one or more sets of codes to control the functional elements of the UE or apparatus to perform the functions described below. Additionally or alternatively, the UE or apparatus may perform one or more of the functions described below using special-purpose hardware.

At block 1905, the method 1900 may include receiving, at a first UE, at least one control channel element associated with the first UE. The at least one control channel element may include downlink control information for the first UE and at least a second UE. In some examples, receiving the at least one control channel element may include receiving a single control channel element associated with the first UE. The single control channel element may include the downlink control information for the first UE and at least the second UE. In some examples, receiving the at least one control channel element may include receiving a first control channel element associated with the first UE and receiving at least a second control channel element associated with the first UE. The first control channel element may include the downlink control information for the first UE, and at least the second control channel element may include the downlink control information for at least the second UE. The operation(s) at block 1905 may be performed using the wireless communication management module 920, 1020, 1160, or 1384 described with reference to FIG. 9, 10, 11, or 13, or the control channel processing module 935 or 1035 described with reference to FIG. 9 or 10.

At block 1910, the method 1900 may include determining, based at least in part on the downlink control information for the first UE and at least the second UE, that an interfering transmission overlaps a first downlink transmission for the first UE. The operation(s) at block 1910 may be performed using the wireless communication management module 920, 1020, 1160, or 1384 described with reference to FIG. 9, 10, 11, or 13, or the interference determination module 1050 described with reference to FIG. 10.

At block 1915, the method 1900 may include receiving a set of NOMA downlink transmissions at the first UE based at least in part on the downlink control information for the first UE and at least the second UE. The operation(s) at block 1915 may be performed using the wireless communication management module 920, 1020, 1160, or 1384 described with reference to FIG. 9, 10, 11, or 13, or the NOMA transmission processing module 940 or 1040 described with reference to FIG. 9 or 10.

At block 1920, the method 1900 may include performing an interference cancellation operation on the interfering transmission(s). The interference cancellation operation may be performed based at least in part on the downlink control information for the second UE. In some examples, the interference cancellation operation may be further based at least in part on a UE identifier associated with the second UE (e.g., an RNTI associated with the second UE). In some examples, the interference cancellation operation may include decoding (e.g., descrambling (e.g., CRC-descrambling)) the interfering transmission using the RNTI associated with the second UE. In some examples the interference cancellation operation may be performed based at least in part on the downlink control information for each of a number of UEs other than the first UE in a NOMA group, depending on the determinations(s) made at block 1910. The interference cancellation operation may also be performed using RNTIs for each of the number of UEs other than the first UE. In some examples, the interference cancellation operation may include decoding the interfering transmission(s) and then canceling the interfering transmission(s) from the set of NOMA downlink transmissions received at block 1915. The operation(s) at block 1920 may be performed using the wireless communication management module 920, 1020, 1160, or 1384 described with reference to FIG. 9, 10, 11, or 13, or the interference cancellation module 1055 described with reference to FIG. 10.

At block 1925, the method 1900 may include identifying, in the set of NOMA downlink transmissions, the first downlink transmission for the first UE. In some examples, the first downlink transmission for the first UE may be identified using a first RNTI for the first UE. In some examples, identifying the first downlink transmission for the first UE may include descrambling (e.g., CRC-descrambling) the first downlink transmission for the first UE. The operation(s) at block 1925 may be performed using the wireless communication management module 920, 1020, 1160, or 1384 described with reference to FIG. 9, 10, 11, or 13, or the NOMA transmission processing module 940 or 1040 described with reference to FIG. 9 or 10.

Thus, the method 1900 may provide for wireless communication. It should be noted that the method 1900 is just one implementation and that the operations of the method 1900 may be rearranged or otherwise modified such that other implementations are possible.

In some examples, aspects of one or more of the methods 1400, 1500, 1600, 1700, 1800, or 1900 described with reference to FIG. 14, 15, 16, 17, 18, or 19 may be combined.

Figure 20:
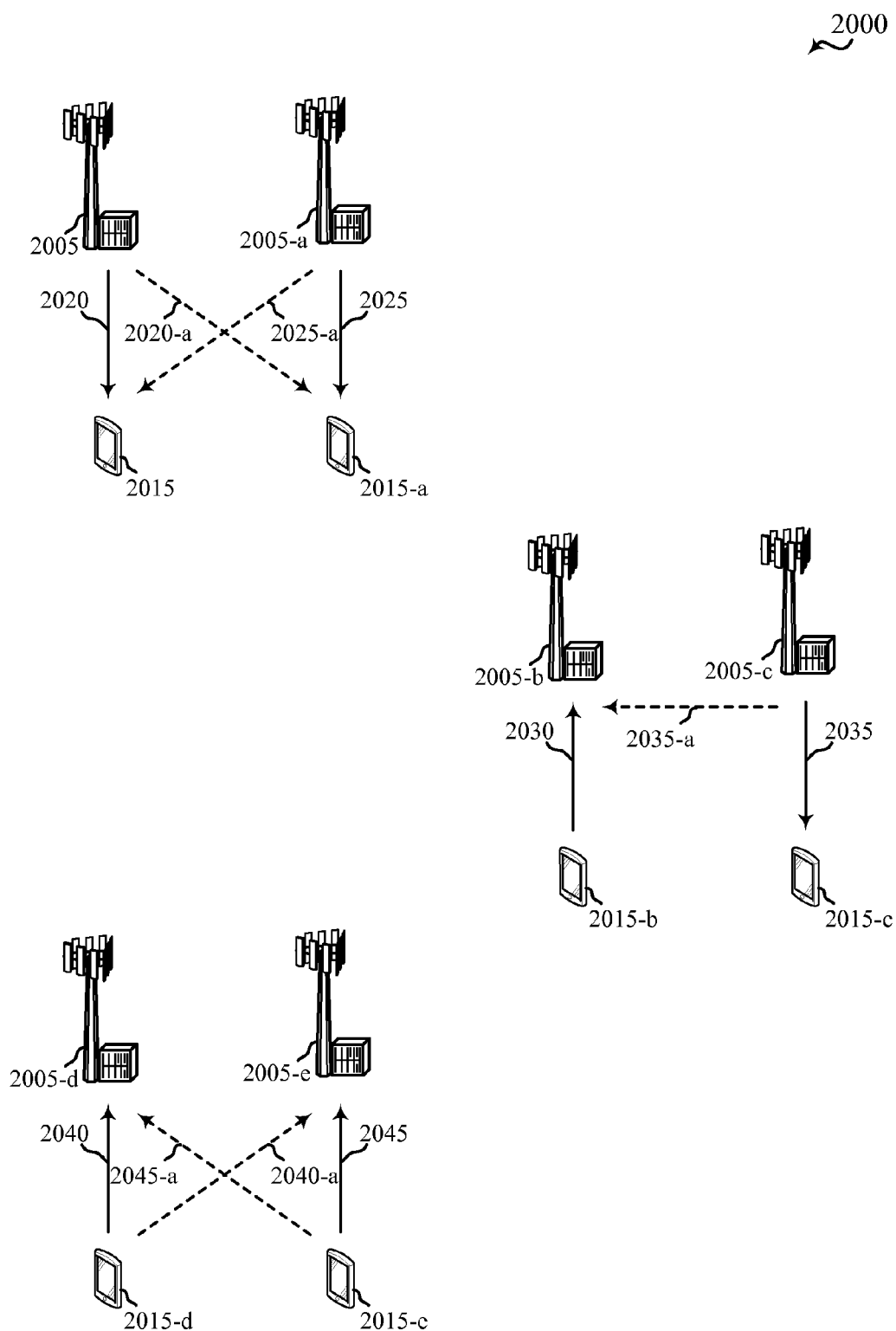
FIG. 20 shows a wireless communication system in which transmissions by various wireless devices may interfere with receptions of transmissions by various other wireless devices, in accordance with various aspects of the present disclosure.

FIG. 20 shows a wireless communication system 2000 in which transmissions by various wireless devices may interfere with receptions of transmissions by various other wireless devices, in accordance with various aspects of the present disclosure. The wireless communication system 2000 may be an example of portions of the wireless communication system 100 described with reference to FIG. 1. Moreover, a first base station 2005, a second base station 2005-*a*, a third base station 2005-*b*, a fourth base station 2005-*c*, a fifth base station 2005-*d*, and a sixth base station 2005-*e* may be examples of aspects of one or more of the base stations 105 described with reference to FIG. 1, while a first UE 2015, a second UE 2015-*a*, a third UE 2015-*b*, a fourth UE 2015-*c*, a fifth UE 2015-*d*, and a sixth UE 2015-*e* may be examples of aspects of one or more of the UEs 115 described with reference to FIG. 1.

In a first interference scenario shown in FIG. 20, the first base station 2005 may transmit a first downlink transmission 2020 to the first UE 2015, and the second base station 2005-*a* may transmit a second downlink transmission 2025 to the second UE 2015-*a*. When the signal strength of the first downlink transmission 2020 is great enough, or when the first base station 2005 and the second UE 2015-*a* are close enough to one another, the second UE 2015-*a* may receive the first downlink transmission 2020 as a first interfering transmission 2020-*a*. Similarly, when the signal strength of the second downlink transmission 2025 is great enough or when the second base station 2005-*a* and the first UE 2015 are close enough to one another, the first UE 2015 may receive the second downlink transmission 2025 as a second interfering transmission 2025-*a*. The first interfering transmission 2020-*a* may interfere with the second UE's reception of the second downlink transmission 2025. The second interfering transmission 2025-*a* may interfere with the first UE's reception of the first downlink transmission 2020.

In a second interference scenario shown in FIG. 20, the third base station 2005-*b* may receive a first uplink transmission 2030 from the third UE 2015-*b*, and the fourth base station 2005-*c* may transmit a third downlink transmission 2035 to the fourth UE 2015-*c*. When the signal strength of the third downlink transmission 2035 is great enough, or when the third base station 2005-*b* and the fourth base station 2005-*c* are close enough to one another, the third base station 2005-*b* may receive the third downlink transmission 2035 as a third interfering transmission 2035-*a*. The third interfering transmission 2035-*a* may interfere with the third base station's reception of the first uplink transmission 2030.

In a third interference scenario shown in FIG. 20, the fifth base station 2005-*d* may receive a second uplink transmission 2040 from the fifth UE 2015-*d*, and the sixth base station 2005-*e* may receive a third uplink transmission 2045 from the sixth UE 2015-*e*. When the signal strength of the second uplink transmission 2040 is great enough, or when the fifth UE 2015-*d* and the sixth base station 2005-*e* are close enough to one another, the sixth base station 2005-*e* may receive the second uplink transmission 2040 as a fourth interfering transmission 2040-*a*. Similarly, when the signal strength of the third uplink transmission 2045 is great enough, or when the sixth UE 2015-*e* and the fifth base station 2005-*d* are close enough to one another, the fifth base station 2005-*d* may receive the third uplink transmission 2045 as a fifth interfering transmission 2045-*a*. The fourth interfering transmission 2040-*a* may interfere with the sixth base station's reception of the third uplink transmission 2045. The fifth interfering transmission 2045-*a* may interfere with the fifth base station's reception of the second uplink transmission 2040.

When one of the interference scenarios shown in FIG. 20 arises, it may be useful to perform an interference cancellation operation, such as a codeword level interference cancellation (CWIC) operation or a symbol-level interference cancellation (SLIC) operation, on the interfering transmission. However, the ability of a device to perform an interference cancellation operation may depend on the device's knowledge of parameters such as a transmission format, a data rate, a rank, a modulation and coding scheme (MCS), or assigned resource blocks for the interfering transmission. The performance of an interference cancellation operation may also depend on a device's knowledge of a radio network temporary identifier (RNTI) associated with the interfering transmission. In some examples, the parameters needed to perform an interference cancellation operation on an interfering transmission may be obtained by way of blind detection of one or more transmissions (e.g., blind detection of one or more transmissions to or from another device). In other examples, the parameters needed to perform an interference cancellation operation may be obtained as described, for example, with reference to FIGS. 24, 25, 26, 27, 30, 31, and 36.

In some examples, an interference scenario such as the interference scenario described with reference to the third base station 2005-*b*, the third UE 2015-*b*, the fourth base station 2005-*c*, and the fourth UE 2015-*c* may arise in an environment where wireless devices are allowed to operate in an enhanced interference mitigation and traffic adaptation (eIMTA) environment.

FIG. 21 shows a table 2100 of various time domain duplexing (TDD) uplink-downlink (UL-DL) configurations (e.g., configurations 0, 1, 2, 3, 4, 5, and 6) used for a frame of communications in an LTE/LTE-A system, in accordance with various aspects of the present disclosure. Downlink subframes are indicated in the figure by a "D," uplink subframes are indicated by a "U," and special subframes are indicated by an "S." The UL-DL configurations may be classified, in one respect, based on their downlink-to-uplink switch-point periodicity. More specifically, configurations 0, 1, 2, and 6 are characterized by a downlink-to-uplink switch-point periodicity of 5 milliseconds (ms), whereas configurations 3, 4, and 5 are characterized by a downlink-to-uplink switch-point periodicity of 10 ms.

When an operator employs eIMTA, different cells of the operator may employ different ones of the UL-DL configurations during a same frame of communications. Assuming the cells operate synchronously, all of the cells may communicate the same type of subframe (e.g., a D subframe, a U subframe, or an S subframe) during subframe numbers 0, 1, 2, and 5. However, different cells employing different UL-DL configurations may communicate different types of subframes during subframe numbers 3, 4, 6, 7, 8, and 9. When different cells communicate different types of subframes during a same subframe (e.g., when one cell is operating in a downlink subframe configuration during a subframe while another cell is operating in an uplink subframe configuration during the subframe), the likelihood of an inter-cell interference scenario arising, such as the interference scenario described with reference to the third base station 2005-b, the third UE 2015-b, the fourth base station 2005-c, and the fourth UE 2015-c of FIG. 22, may increase.

In some examples, a base station and UE may communicate over an unlicensed radio frequency spectrum band. Because the unlicensed radio frequency spectrum band may be shared by apparatuses operating under different protocols (e.g., different RATs, such as a cellular RAT and a Wi-Fi RAT), transmitting devices may contend for access to the unlicensed radio frequency spectrum band. In some examples, one or more of the interference scenarios described with reference to FIG. 20 may arise when a base station and a UE are communicating over an unlicensed radio frequency spectrum band or a licensed radio frequency spectrum band (e.g., a radio frequency spectrum band for which apparatuses do not contend for access because the radio frequency spectrum band is licensed to particular users for particular uses, such as a licensed radio frequency spectrum band usable for LTE/LTE-A communications).

Figure 22:
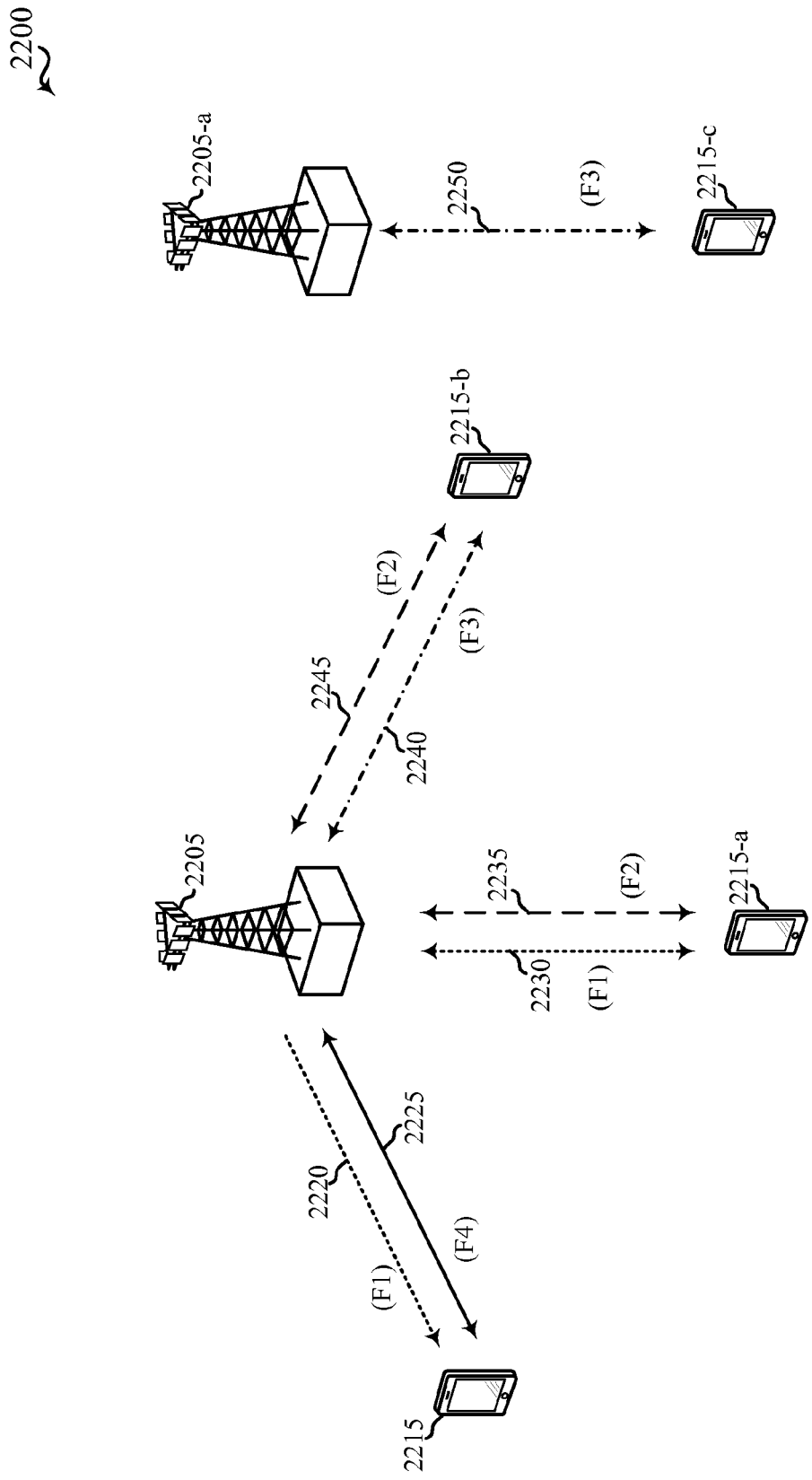
FIG. 22 shows a wireless communication system in which LTE/LTE-A may be deployed under different scenarios using an unlicensed radio frequency spectrum band, in accordance with various aspects of the present disclosure.

FIG. 22 shows a wireless communication system 2200 in which LTE/LTE-A may be deployed under different scenarios using an unlicensed radio frequency spectrum band, in accordance with various aspects of the present disclosure. More specifically, FIG. 22 illustrates examples of a supplemental downlink mode, a carrier aggregation mode, and a standalone mode in which LTE/LTE-A is deployed using an unlicensed radio frequency spectrum band. The wireless communication system 2200 may be an example of portions of the wireless communication system 100 or 2000 described with reference to FIG. 1 or 20. Moreover, a first base station 2205 and a second base station 2205-a may be examples of aspects of one or more of the base stations 105, 2005, 2005-a, 2005-b, 2005-c, 2005-d, or 2005-e described with reference to FIG. 1 or 20, while a first UE 2215, a second UE 2215-a, a third UE 2215-b, and a fourth UE 2215-c may be examples of aspects of one or more of the UEs 115, 2015, 2015-a, 2015-b, 2015-c, 2015-d, or 2015-e described with reference to FIG. 1 or 20.

In the example of a supplemental downlink mode in the wireless communication system 2200, the first base station 2205 may transmit OFDMA waveforms to the first UE 2215 using a downlink channel 2220. The downlink channel 2220 may be associated with a frequency F1 in an unlicensed radio frequency spectrum band. The first base station 2205 may transmit OFDMA waveforms to the first UE 2215 using a first bidirectional link 2225 and may receive SC-FDMA waveforms from the first UE 2215 using the first bidirectional link 2225. The first bidirectional link 2225 may be associated with a frequency F4 in a licensed radio frequency spectrum band. The downlink channel 2220 in the unlicensed radio frequency spectrum band and the first bidirectional link 2225 in the licensed radio frequency spectrum band may operate concurrently. The downlink channel 2220 may provide a downlink capacity offload for the first base station 2205. In some examples, the downlink channel 2220 may be used for unicast services (e.g., addressed to one UE) or for multicast services (e.g., addressed to several UEs). This scenario may occur with any service provider (e.g., a mobile network operator (MNO)) that uses a licensed radio frequency spectrum band and needs to relieve some of the traffic or signaling congestion.

In one example of a carrier aggregation mode in the wireless communication system 2200, the first base station 2205 may transmit OFDMA waveforms to the second UE 2215-a using a second bidirectional link 2230 and may receive OFDMA waveforms, SC-FDMA waveforms, or resource block interleaved FDMA waveforms from the second UE 2215-a using the second bidirectional link 2230. The second bidirectional link 2230 may be associated with the frequency F1 in the unlicensed radio frequency spectrum band. The first base station 2205 may also transmit OFDMA waveforms to the second UE 2215-a using a third bidirectional link 2235 and may receive SC-FDMA waveforms from the second UE 2215-a using the third bidirectional link 2235. The third bidirectional link 2235 may be associated with a frequency F2 in a licensed radio frequency spectrum band. The second bidirectional link 2230 may provide a downlink and uplink capacity offload for the first base station 2205. Like the supplemental downlink described above, this scenario may occur with any service provider (e.g., MNO) that uses a licensed radio frequency spectrum band and needs to relieve some of the traffic or signaling congestion.

In another example of a carrier aggregation mode in the wireless communication system 2200, the first base station 2205 may transmit OFDMA waveforms to the third UE 2215-b using a fourth bidirectional link 2240 and may receive OFDMA waveforms, SC-FDMA waveforms, or resource block interleaved waveforms from the third UE 2215-b using the fourth bidirectional link 2240. The fourth bidirectional link 2240 may be associated with a frequency F3 in the unlicensed radio frequency spectrum band. The first base station 2205 may also transmit OFDMA waveforms to the third UE 2215-b using a fifth bidirectional link 2245 and may receive SC-FDMA waveforms from the third UE 2215-b using the fifth bidirectional link 2245. The fifth bidirectional link 2245 may be associated with the frequency F2 in the licensed radio frequency spectrum band. The fourth bidirectional link 2240 may provide a downlink and uplink capacity offload for the first base station 2205. This example and those provided above are presented for illustrative purposes and there may be other similar modes of operation or deployment scenarios that combine LTE/LTE-A in a licensed radio frequency spectrum band and use an unlicensed radio frequency spectrum band for capacity offload.

As described above, one type of service provider that may benefit from the capacity offload offered by using LTE/LTE-A in an unlicensed radio frequency spectrum band is a traditional MNO having access rights to an LTE/LTE-A licensed radio frequency spectrum band. For these service providers, an operational example may include a bootstrapped mode (e.g., supplemental downlink, carrier aggregation) that uses the LTE/LTE-A primary component carrier (PCC) on the licensed radio frequency spectrum band and at least one secondary component carrier (SCC) on the unlicensed radio frequency spectrum band.

In the carrier aggregation mode, data and control may, for example, be communicated in the licensed radio frequency spectrum band (e.g., via first bidirectional link 2225, third bidirectional link 2235, and fifth bidirectional link 2245) while data may, for example, be communicated in the unlicensed radio frequency spectrum band (e.g., via second bidirectional link 2230 and fourth bidirectional link 2240). The carrier aggregation mechanisms supported when using an unlicensed radio frequency spectrum band may fall under a hybrid frequency division duplexing-time division duplexing (FDD-TDD) carrier aggregation or a TDD-TDD carrier aggregation with different symmetry across component carriers.

In one example of a standalone mode in the wireless communication system 2200, the second base station 2205-a may transmit OFDMA waveforms to the fourth UE 2215-c using a bidirectional link 2250 and may receive OFDMA waveforms, SC-FDMA waveforms, or resource block interleaved FDMA waveforms from the fourth UE 2215-c using the bidirectional link 2250. The bidirectional link 2250 may be associated with the frequency F3 in the unlicensed radio frequency spectrum band. The standalone mode may be used in non-traditional wireless access scenarios, such as in-stadium access (e.g., unicast, multicast). An example of a type of service provider for this mode of operation may be a stadium owner, cable company, event host, hotel, enterprise, or large corporation that does not have access to a licensed radio frequency spectrum band.

In some examples, a transmitting device such as one of the base stations 105, 2005, 2005-a, 2005-b, 2005-c, 2005-e, 2005-e, 2205, or 2205-a described with reference to FIG. 1, 20, or 22, or one of the UEs 115, 2015, 2015-a, 2015-b, 2015-c, 2015-d, 2015-e, 2215, 2215-a, 2215-b, or 2215-c described with reference to FIG. 1, 20, or 22, may use a gating interval to gain access to a channel of an unlicensed radio frequency spectrum band (e.g., to a physical channel of the unlicensed radio frequency spectrum band). In some examples, the gating interval may be periodic. For example, the periodic gating interval may be synchronized with at least one boundary of an LTE/LTE-A radio interval. The gating interval may define the application of a contention-based protocol, such as an LBT protocol based on the LBT protocol specified in European Telecommunications Standards Institute (ETSI) (EN 301 893). When using a gating interval that defines the application of an LBT protocol, the gating interval may indicate when a transmitting device needs to perform a contention procedure (e.g., an LBT procedure) such as a clear channel assessment (CCA) procedure. The outcome of the CCA procedure may indicate to the transmitting apparatus whether a channel of an unlicensed radio frequency spectrum band is available or in use for the gating interval (also referred to as an LBT radio frame). When a CCA procedure indicates that the channel is available for a corresponding LBT radio frame (e.g., "clear" for use), the transmitting apparatus may reserve or use the channel of the unlicensed radio frequency spectrum band during part or all of the LBT radio frame. When the CCA procedure indicates that the channel is not available (e.g., that the channel is in use or reserved by another transmitting apparatus), the transmitting apparatus may be prevented from using the channel during the LBT radio frame.

In some examples, the performance of an interference cancellation operation in a wireless communication system such as the wireless communication system 100, 2000, or 2200 described with reference to FIG. 1, 20, or 22, or the performance of an interference cancellation operation in an eIMTA environment such as the eIMTA environment described with reference to FIG. 21, may be facilitated by the establishment of one or more RNTI groups. In some examples, each of a number of base stations may define one or more RNTI groups and assign each RNTI group a group identifier (e.g., a group RNTI). Each RNTI group may include a set of UEs served by the base station. In some examples, the UEs in an RNTI group may utilize a new transmission mode (TM; e.g., TM13). In some examples, each group RNTI may be a 16-bit value. In some examples, a base station that has defined an RNTI group may assign each of the UEs within the RNTI group a UE identifier (e.g., a unique identifier within the RNTI group). In some examples, each UE identifier may be an 8-bit value. The establishment and use of RNTI groups is described, for example, with reference to FIGS. 23-36.

Figure 23:
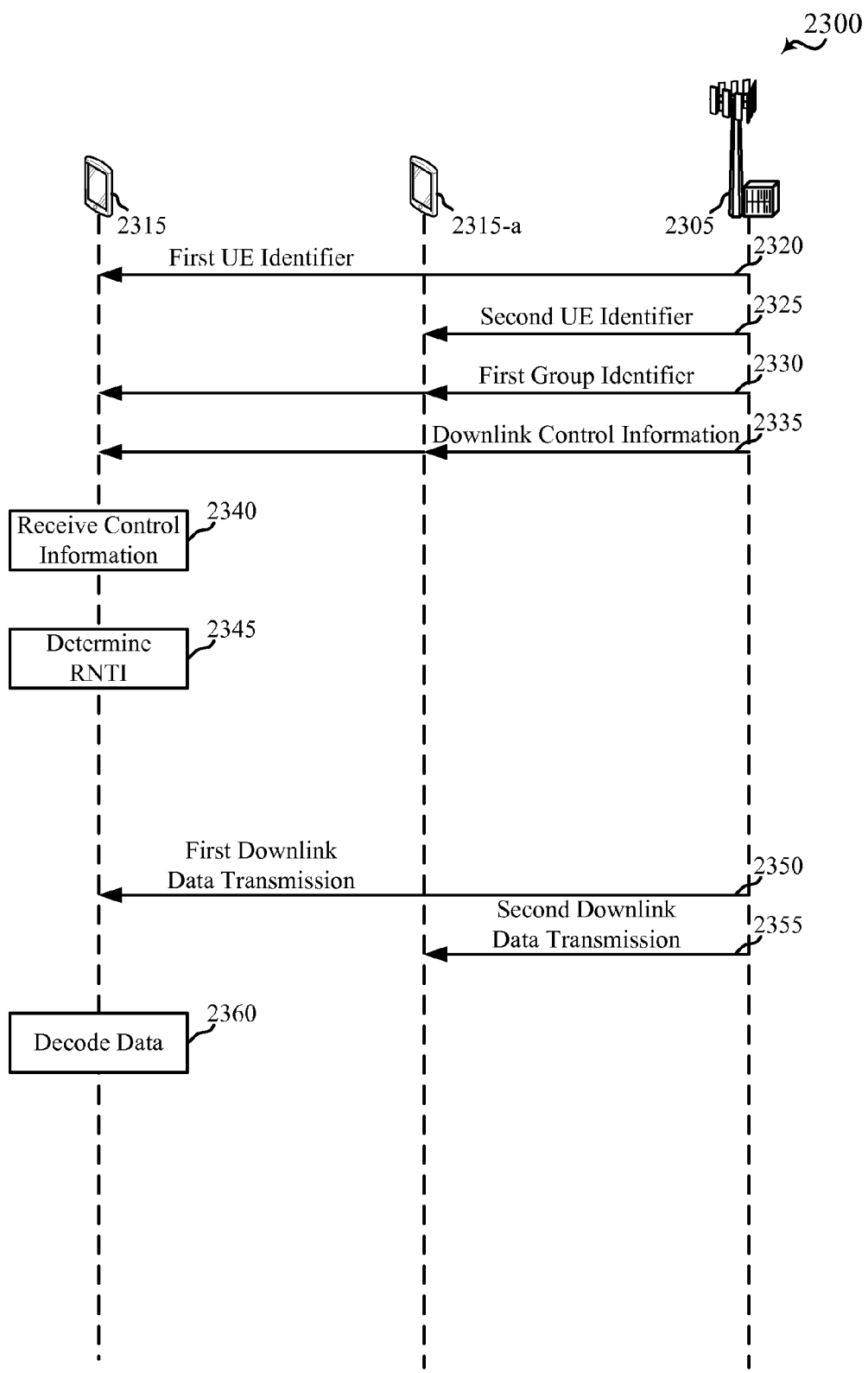
FIG. 23 shows a message flow between a first UE, a second UE, and a base station, in accordance with various aspects of the present disclosure.

FIG. 23 shows a message flow 2300 between a first UE 2315, a second UE 2315-a, and a base station 2305, in accordance with various aspects of the present disclosure. In some examples, the first UE 2315 or the second UE 2315-a may be an example of aspects of one or more of the UEs 115, 2015, 2015-a, 2015-b, 2015-c, 2015-d, 2015-e, 2215, 2215-a, 2215-b, or 2215-c described with reference to FIG. 1, 20, or 22. In some examples, the base station 2305 may be an example of aspects of one or more of the base stations 105, 2005, 2005-a, 2005-b, 2005-c, 2005-d, 2005-e, 2205, or 2205-a described with reference to FIG. 1, 2, or 4. In some examples, each of the first UE 2315 and the second UE 2315-a, and in some examples other UEs (not shown), may be members of an RNTI group. Messages may be transmitted between the first UE 2315, the second UE 2315-a, or the base station 2305 over at least one radio frequency spectrum band (e.g., a licensed radio frequency spectrum band or an unlicensed radio frequency spectrum band).

As shown in FIG. 23, the base station 2305 may transmit a respective UE identifier to each of the UEs in the RNTI group. For example, the base station 2305 may transmit a first UE identifier 2320 to the first UE 2315 and a second UE identifier 2325 to the second UE 2315-a. The first UE identifier 2320 may identify the first UE 2315, and the second UE identifier 2325 may identify the second UE 2315-a. In some examples, the base station 2305 may also transmit a range of UE identifiers to each of the UEs in the RNTI group. The range of UE identifiers may include at least the first UE identifier 2320 and the second UE identifier 2325. In other examples, each of the UEs in the RNTI group, including the first UE 2315 and the second UE 2315-a, may transmit its UE identifier to the base station 2305.

The base station 2305 may also transmit a first group identifier 2330 to each of the UEs in the RNTI group (e.g., to the first UE 2315 and the second UE 2315-a). In some examples, the first group identifier 2330 may include a first group RNTI. In some examples, the first group identifier 2330 may be transmitted to the first UE 2315 and the second UE 2315-a during a random access procedure.

The base station 2305 may further transmit downlink control information 2335 (e.g., one or more physical downlink control channels (PDCCHs) or enhanced PDCCHs (ePDCCHs) containing downlink control information) to one or more of the UEs in the first RNTI group (e.g., to the first UE 2315 or the second UE 2315-a). In some examples, the downlink control information 2335 may be transmitted for a subframe of wireless communications between the base station 2305 and one or more of the UEs in the RNTI group. In some examples, the downlink control information 2335 may be transmitted at the beginning of a subframe. In some examples, the downlink control information 2335 may include downlink control information for each UE, in the first RNTI group, with which the base station 2305 intends to communicate during a subframe. In some examples, the downlink control information 2335 for each UE in the first RNTI group may be encoded (e.g., scrambled (e.g., cyclic redundancy check (CRC)-scrambled)) using the first group identifier 2330. In some examples, the downlink control information 2335 for each UE in the first RNTI group may be encoded (e.g., scrambled (e.g., CRC-scrambled)) using a deterministic function (e.g., an XOR) of the first group identifier 2330 and the UE identifier for the UE. For example, downlink control information for the first UE 2315 may be encoded (e.g., scrambled (e.g., CRC-scrambled)) using a deterministic function (e.g., an XOR) of the first group identifier 2330 and the first UE identifier 2320.

At block 2340, the first UE 2315 may receive the downlink control information 2335 and determine whether the downlink control information 2335 corresponds to the first UE 2315. In some examples, the downlink control information 2335 may be received in one or more PDCCHs or ePDCCHs. In some examples, the downlink control information 2335 may be received for one or more UEs in the first RNTI group using the first group identifier 2330. For example, downlink control information for the first UE 2315 may be decoded (e.g., descrambled (e.g., CRC-descrambled)) using the first group identifier 2330. In some examples, the downlink control information 2335 may be received for one or more UEs in the first RNTI group using a deterministic function (e.g., an XOR) of the first group identifier 2330 and a UE identifier assigned to the UE. For example, downlink control information for the first UE 2315 may be decoded (e.g., descrambled (e.g., CRC-descrambled)) based at least in part on a deterministic function of the first group identifier 2330 and the first UE identifier 2320.

In examples in which the downlink control information for a UE is scrambled using the first group identifier 2330, the downlink control information for the first UE 2315 may reference (e.g., include) the first UE identifier 2320. Inclusion of the first UE identifier 2320, in the downlink control information for the first UE 2315, may enable the first UE 2315 to distinguish the downlink control information for the first UE 2315 from downlink control information for at least one other UE in the first RNTI group, and thereby identify the downlink control information for the first UE 2315 based at least in part on the first UE identifier 2320. For example, the first UE 2315 may sometimes receive downlink control information for the second UE 2315-*a*, which downlink control information for the second UE 2315-*a* may also be decoded using the first group identifier 2330. However, because the downlink control information for the second UE 2315-*a* does not reference (e.g., include) the first UE identifier 2320, the first UE 2315 may determine that the downlink control information for the second UE 2315-*a* is not intended for the first UE 2315. In examples in which the downlink control information for a UE is scrambled using a deterministic function (e.g., an XOR) of the first group identifier 2330 and a UE identifier, the downlink control information for the first UE 2315 may not include the first UE identifier 2320, and the first UE 2315 may identify the downlink control information for the first UE 2315 based at least in part on an ability to decode (e.g., descramble (e.g., CRC-descramble)) the downlink control information for the first UE 2315.

When the first UE 2315 determines that the downlink control information 2335 does not include downlink control information for the first UE 2315, the first UE 2315 may not perform the operation(s) at blocks 2345 or 2355 (e.g., for a current subframe of wireless communications between the base station 2305 and one or more of the UEs in the RNTI group). When the first UE 2315 determines that the downlink control information 2335 does include downlink control information for the first UE 2315, the first UE 2315 may process the downlink control information for the first UE 2315 to determine, for example, a transmission format, a data rate, a rank, an MCS, assigned resource blocks, or hybrid automatic repeat request (HARD) information for a downlink data transmission (e.g., a physical downlink shared channel (PDSCH)) directed to the first UE 2315.

At block 2345, the first UE 2315 may determine a first RNTI based at least in part on the first UE identifier 2320. In some examples, the first RNTI may be based at least in part on a deterministic function (e.g., an XOR) of the first UE identifier 2320 and the first group identifier 2330.

At some point in time following transmission of the downlink control information 2335 (and in some examples, immediately following), the base station 2305 may transmit a first downlink data transmission 2350 (e.g., a first PDSCH) to the first UE 2315 or transmit a second downlink data transmission 2355 (e.g., a second PDSCH) to the second UE 2315-*a*, as indicated in the downlink control information 2335. In some examples, the first downlink data transmission 2350 and the second downlink data transmission 2355 may be received by each of the UEs in the RNTI group. In some examples, the first downlink data transmission 2350 may be scrambled (e.g., CRC-scrambled) using the first RNTI, and the second downlink data transmission 2355 may be scrambled (e.g., CRC-scrambled) using a second RNTI. In some examples, the second RNTI may be based at least in part on the second UE identifier 2325, and in some examples, the second RNTI may be based at least in part on a deterministic function (e.g., an exclusive-OR (XOR)) of the second UE identifier 2325 and the first group identifier 2330.

At block 2350, the first UE 2315 may identify or decode the first downlink data transmission 2350. In some examples, the first downlink data transmission 2350 may be identified or decoded (e.g., descrambled) using the first RNTI.

Figure 24:
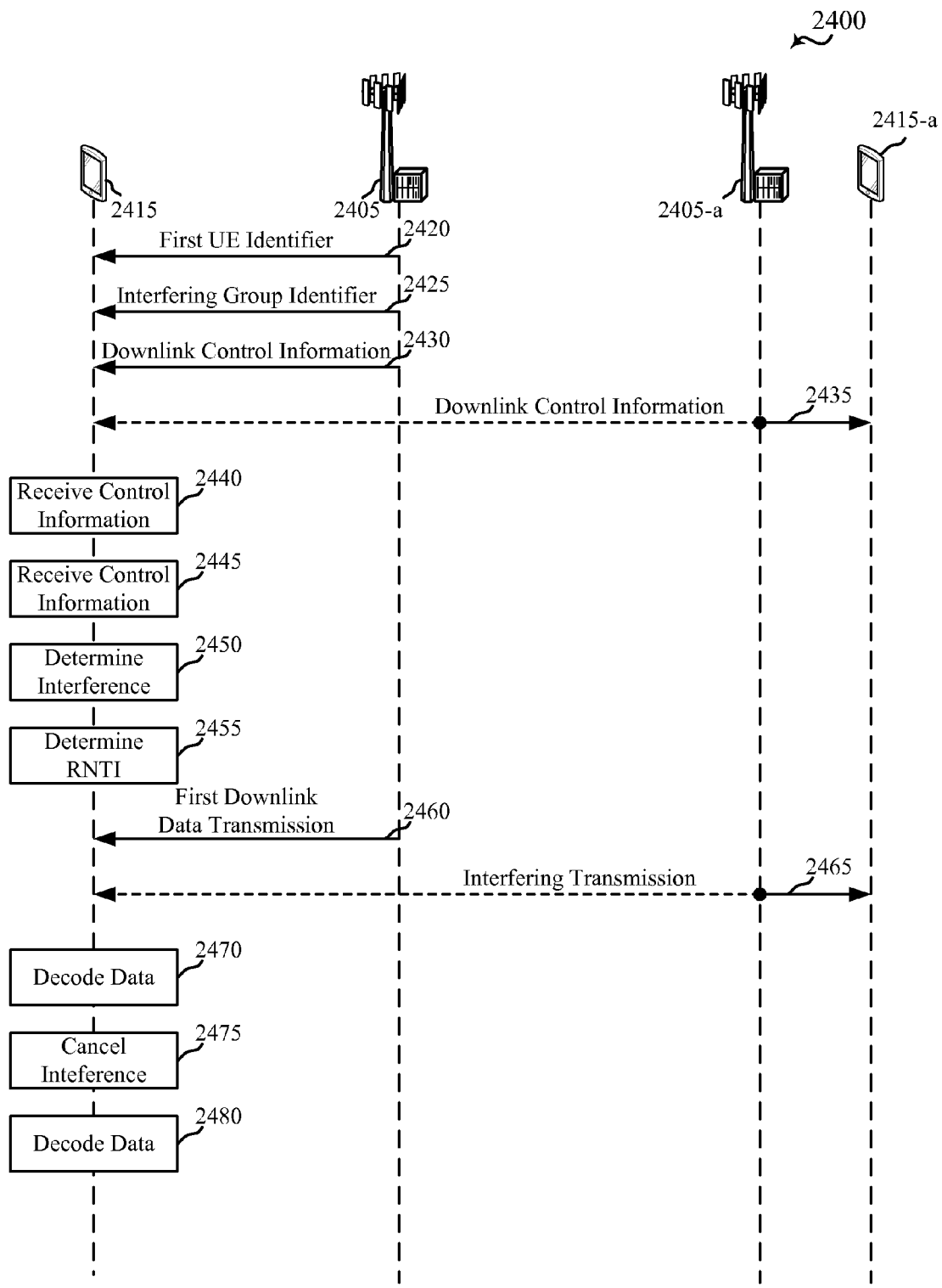
FIG. 24 shows a message flow between a first UE, a second UE, a first base station, and a second base station, in accordance with various aspects of the present disclosure.

FIG. 24 shows a message flow 2400 between a first UE 2415, a second UE 2415-*a*, a first base station 2405, and a second base station 2405-*a*, in accordance with various aspects of the present disclosure. In some examples, the first UE 2415 or the second UE 2415-*a* may be an example of aspects of one or more of the UEs 115, 2015, 2015-*a*, 2015-*b*, 2015-*c*, 2015-*d*, 2015-*e*, 2215, 2215-*a*, 2215-*b*, 2215-*c*, 2315, or 2315-*a* described with reference to FIG. 1, 2, 4, or 5. In some examples, the first base station 2405 or the second base station 2405-*a* may be an example of aspects of one or more of the base stations 105, 2005, 2005-*a*, 2005-*b*, 2005-*c*, 2005-*d*, 2005-*e*, 2205, 2205-*a*, or 2305 described with reference to FIG. 1, 2, 4, or 5. Messages may be transmitted between the first UE 2415, the second UE 2415-*a*, the first base station 2405, the or the second base station 2405-*a* over at least one radio frequency spectrum band (e.g., a licensed radio frequency spectrum band or an unlicensed radio frequency spectrum band).

In some examples, the first base station 2405 may transmit a UE identifier to one or more of the UEs for which it operates as a serving base station. This may include transmitting a first UE identifier 2420 to the first UE 2415. The first UE identifier 2420 may identify the first UE 2415. In other examples, each of the UEs served by the first base station 2405, including the first UE 2415, may transmit its UE identifier to the first base station 2405. When the first UE 2415 is a member of an RNTI group managed by the first base station 2405, the first base station 2405 may also transmit a first group identifier (e.g., a first group RNTI) to the first UE 2415. However, the first UE 2415 need not be part of an RNTI group.

The first base station 2405 may also transmit an interfering group identifier 2425 to one or more of the UEs for which it operates as a serving base station, including, for example, the first UE 2415. Also or alternatively, a UE (e.g., the first UE 2415) may decode a system information block (SIB) received from the second base station 2405-a, and extract the interfering group identifier 2425 from the SIB received from the second base station 2405-a. In some examples, the interfering group identifier 2425 may include an interfering group RNTI. The interfering group identifier may be associated with an interfering group of devices, such as a group of devices included in an RNTI group managed by the second base station 2405-a. In some examples, the interfering group of devices may include the second UE 2415-a. The second base station 2405-a may also be considered an interfering device, though not a member of the RNTI group including the interfering group of devices. One or more of the wireless devices in the interfering group of devices may receive an interfering transmission from the second base station 2405-a, which interfering transmission interferes with the reception of transmissions at the first UE 2415. For example, the second UE 2415-a may receive a transmission (e.g., the interfering transmission 2465) from the second base station 2405-a, which transmission from the second base station 2405-a interferes with the reception of a transmission (e.g., the first downlink data transmission 2460) from the first base station 2405 at the first UE 2415.

In some examples, the first base station 2405 may also transmit, to one or more of the UEs for which it operates as a serving base station (e.g., the first UE 2415), a range of UE identifiers for the UEs included in the interfering group of devices. Also or alternatively, a UE (e.g., the first UE 2415) may decode information transmitted to or from the second base station 2405-a or to or from a UE within the interfering group of devices (e.g., the second UE 2415-a), and extract the range of UE identifiers from the decoded information.

The first base station 2405 may transmit downlink control information 2430 (e.g., one or more PDCCHs or ePDCCHs containing downlink control information) to one or more of the UEs for which it operates as a serving base station, including, for example, the first UE 2415. In some examples, the downlink control information 2430 may be transmitted for a subframe of wireless communications between the first base station 2405 and one or more of the UEs for which the first base station 2405 operates as a serving base station. In some examples, the downlink control information 2430 for the first UE 2415 may be encoded (e.g., scrambled (e.g., CRC-scrambled)) using the first UE identifier 2420, or if the first UE 2415 is a member of a first RNTI group managed by the first base station 2405, the downlink control information 2430 may be encoded (e.g., scrambled (e.g., CRC-scrambled)) using a first group identifier of the first RNTI group, or encoded (e.g., scrambled (e.g., CRC-scrambled)) using a deterministic function (e.g., an XOR) of the first group identifier and the first UE identifier 2420.

The second base station 2405-a may transmit downlink control information 2435 (e.g., one or more PDCCHs or ePDCCHs containing downlink control information) to one or more of the UEs in the interfering group of devices (e.g., to the second UE 2415-a). In some examples, the downlink control information 2435 may include downlink control information for each UE, in the interfering group of devices, with which the second base station 2405-a intends to communicate during a subframe. In some examples, the downlink control information 2435 may be encoded (e.g., scrambled (e.g., CRC-scrambled)) using the interfering group identifier 2425. In some examples, the downlink control information 2435 for each UE in the interfering group of devices may be encoded (e.g., scrambled (e.g., CRC-scrambled)) using a deterministic function (e.g., an XOR) of the interfering group identifier 2425 and a UE identifier for the UE. For example, downlink control information for the second UE 2415-a may be encoded (e.g., scrambled (e.g., CRC-scrambled)) using a deterministic function (e.g., an XOR) of the interfering group identifier 2425 and a second UE identifier assigned to the second UE 2415-a to identify the second UE 2415-a within the interfering group of devices.

At block 2440, the first UE 2415 may receive the downlink control information 2435. In some examples, the downlink control information 2435 may be received in one or more PDCCHs or ePDCCHs. In some examples, the downlink control information 2435 may be received for one or more UEs in the interfering group of devices using the interfering group identifier 2425. For example, downlink control information for the second UE 2415-a may be decoded (e.g., descrambled (e.g., CRC-descrambled)) using the interfering group identifier 2425. In some examples, the downlink control information 2435 may be received for one or more UEs in the interfering group of devices by attempting to receive downlink control information for each of the UEs represented in the range of UE identifiers received for the interfering group of devices. For example, the downlink control information 2435 may be received for a UE in the interfering group of devices using a deterministic function (e.g., an XOR) of the interfering group identifier 2425 and a UE identifier for the UE. For example, downlink control information for the second UE 2415-a may be decoded (e.g., descrambled (e.g., CRC-descrambled)) based at least in part on a deterministic function of the interfering group identifier 2425 and a second UE identifier assigned to the second UE 2415-a to identify the second UE 2415-a within the interfering group of devices.

In examples in which the downlink control information for a UE is scrambled using the interfering group identifier 2425, the downlink control information for the UE may reference (e.g., include) a UE identifier for the UE. Inclusion of the UE identifier, in the downlink control information for the UE, may enable the first UE 2415 to identify the UE to which the downlink control information corresponds. In examples in which the downlink control information for a UE is scrambled using a deterministic function (e.g., an XOR) of the interfering group identifier 2425 and a UE identifier, the downlink control information for the UE may not include a UE identifier, and the first UE 2415 may identify the UE to which the downlink control information corresponds based at least in part on an ability to decode (e.g., descramble (e.g., CRC-descramble)) the downlink control information for the UE using the interfering group identifier 2425 and the UE identifier for the UE.

At block 2445, the first UE 2415 may receive the downlink control information 2430 and determine whether the downlink control information 2430 corresponds to the first UE 2415. In some examples, the downlink control information 2435 may be received in one or more PDCCHs or ePDCCHs. In some examples, the operation(s) at block 2445 may include decoding (e.g., descrambling (e.g., CRC-descrambling)) the downlink control information 2430 for the first UE 2415 using the first UE identifier 2420. In some examples, the operation(s) at block 2445 may include decoding (e.g., descrambling (e.g., CRC-descrambling)) the downlink control information 2430 for the first UE 2415 using a deterministic function (e.g., an XOR) of a first RNTI group identifier and the first UE identifier 2420. When the first UE 2415 determines that the downlink control information 2430 does not include downlink control information for the first UE 2415, the first UE 2415 may not perform the operation(s) at blocks 2450, 2455, 2470, 2475, or 2480 (e.g., for a current subframe of wireless communications between the first base station 2405 and one or more UEs including the first UE 2415). When the first UE 2415 determines that the downlink control information 2430 does include downlink control information for the first UE 2415, the first UE 2415 may process the downlink control information 2430 to determine, for example, a transmission format, a data rate, a rank, an MCS, assigned resource blocks, or HARQ information for a first downlink data transmission 2460 (e.g., a first PDSCH) to be transmitted from the first base station 2405 to the first UE 2415.

At block 2450, the first UE 2415 may identify, based at least in part on the downlink control information 2435, an interfering transmission 2465. In some examples, the interfering transmission 2465 may include a second downlink data transmission (e.g., a second PDSCH transmission) transmitted from the second base station 2405-a to the second UE 2415-a. The interfering transmission 2465 may be considered interfering in the context of the first UE 2415, because it has the potential to interfere with the first UE's receipt of the first downlink data transmission 2460. In some examples, the first UE 2415 may further identify the interfering transmission 2465 based at least in part on the downlink control information 2430 (e.g., by identifying an overlap of resources assigned to the first downlink data transmission 2460 and the interfering transmission 2465). The first UE 2415 may process the downlink control information 2435 to determine, for example, a transmission format, a data rate, a rank, an MCS, assigned resource blocks, or HARQ information for the interfering transmission 2465.

At block 2455, the first UE 2415 may determine an RNTI for the interfering transmission 2465. The RNTI may be based at least in part on a second UE identifier included in the downlink control information 2435. The second UE identifier may be an identifier of the second UE 2415-a. In some examples, the RNTI for the interfering transmission 2465 may be based at least in part on a deterministic function (e.g., an XOR) of the second UE identifier and the interfering group identifier 2425.

At some point in time following transmission of the downlink control information 2435 and the downlink control information 2430 (and in some examples, immediately following), the first base station 2405 may transmit the first downlink data transmission 2460 (e.g., a first PDSCH) to the first UE 2415, as indicated in the downlink control information 2430. In some examples, the first downlink data transmission 2460 may be scrambled (e.g., CRC-scrambled) using the first UE identifier 2420, or if the first UE 2415 is a member of a first RNTI group managed by the first base station 2405, the first downlink data transmission 2460 may be scrambled (e.g., CRC-scrambled) using an RNTI based at least in part on a deterministic function (e.g., an XOR) of the first UE identifier 2420 and a first group identifier of the first RNTI group.

Overlapping with the first downlink data transmission 2460, the second base station 2405-a may transmit the interfering transmission 2465 (e.g., a second downlink data transmission (e.g., a second PDSCH) transmitted to the second UE 2415-a), as indicated in the downlink control information 2435. In some examples, the interfering transmission 2465 may be scrambled using the determined RNTI for the interfering transmission 2465.

At block 2470, the first UE 2415 may identify or decode the interfering transmission 2465. In some examples, the interfering transmission 2465 may be identified or decoded (e.g., descrambled) using the determined RNTI for the interfering transmission 2465.

At block 2475, the first UE 2415 may perform an interference cancellation operation (e.g., a CWIC operation or a SLIC operation) on the interfering transmission 2465. In some examples, the interference cancellation operation may be performed on a per-resource block basis.

At block 2480, the first UE 2415 may identify or decode the first downlink data transmission 2460 (e.g., in the absence of the canceled interfering transmission 2465). In some examples, the first downlink data transmission 2460 may be identified or decoded (e.g., descrambled) using the first UE identifier 2420.

In some examples of the message flow 2400, a plurality of interfering transmissions may be identified and canceled by performing an interference cancellation operation (or by performing a plurality of interference cancellation operations).

Figure 25:
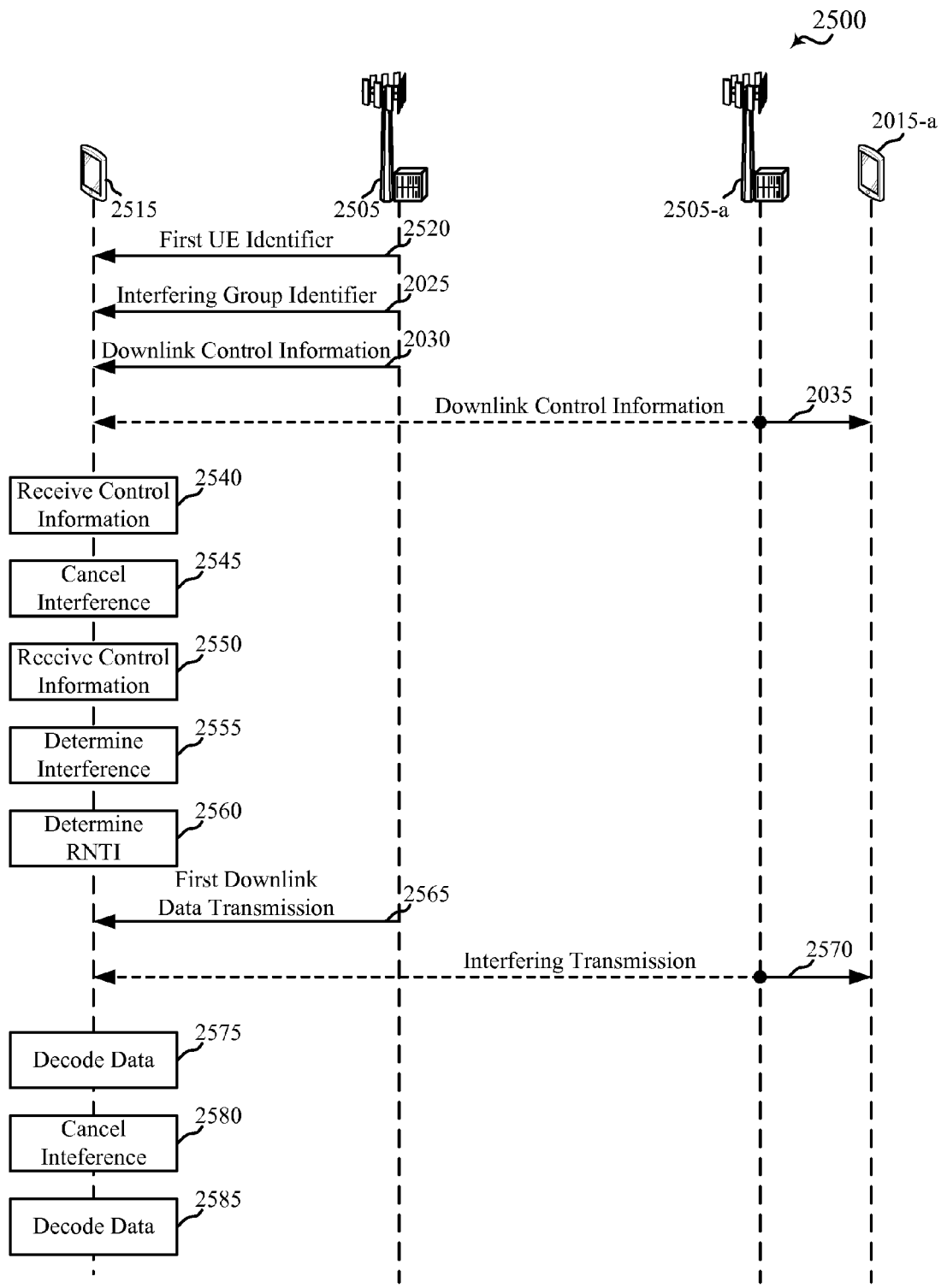
FIG. 25 shows a message flow between a first UE, a second UE, a first base station, and a second base station, in accordance with various aspects of the present disclosure.

FIG. 25 shows a message flow 2500 between a first UE 2515, a second UE 2515-a, a first base station 2505, and a second base station 2505-a, in accordance with various aspects of the present disclosure. In some examples, the first UE 2515 or the second UE 2515-a may be an example of aspects of one or more of the UEs 115, 2015, 2015-a, 2015-b, 2015-c, 2015-d, 2015-e, 2215, 2215-a, 2215-b, 2215-c, 2315, 2315-a, 2415, or 2415-a described with reference to FIG. 1, 20, 22, 23, or 24. In some examples, the first base station 2505 or the second base station 2505-a may be an example of aspects of one or more of the base stations 105, 2005, 2005-a, 2005-b, 2005-c, 2005-d, 2005-e, 2205, 2205-a, 2305, 2405, or 2405-a described with reference to FIG. 1, 20, 22, 23, or 24. Messages may be transmitted between the first UE 2515, the second UE 2515-a, the first base station 2505, the or the second base station 2505-a over at least one radio frequency spectrum band (e.g., a licensed radio frequency spectrum band or an unlicensed radio frequency spectrum band).

In some examples of the message flow 2500, the described transmissions between the first base station 2505 and the first UE 2515, and between the second base station 2505-a and the second UE 2515-a, may occur over an unlicensed radio frequency spectrum band as described with reference to FIG. 22. Before each of the first base station 2505 and the second base station 2505-a makes its respective transmissions over the unlicensed radio frequency spectrum band, each of the first base station 2505 and the second base station 2505-a may perform a respective LBT procedure to contend for access to the unlicensed radio frequency spectrum band.

In some examples, the first base station 2505 may transmit a UE identifier to one or more of the UEs for which it operates as a serving base station. This may include transmitting a first UE identifier 2520 to the first UE 2515. The first UE identifier 2520 may identify the first UE 2515. In other examples, each of the UEs served by the first base station 2505, including the first UE 2515, may transmit its UE identifier to the first base station 2505. When the first UE 2515 is a member of an RNTI group managed by the first base station 2505, the first base station 2505 may also transmit a first group identifier (e.g., a first group RNTI) to the first UE 2515. However, the first UE 2515 need not be part of an RNTI group.

The first base station 2505 may also transmit an interfering group identifier 2525 to one or more of the UEs for which it operates as a serving base station, including, for example, the first UE 2515. Also or alternatively, a UE (e.g., the first UE 2515) may decode a SIB received from the second base station 2505-*a*, and extract the interfering group identifier 2525 from the SIB received from the second base station 2505-*a*. In some examples, the interfering group identifier 2525 may include an interfering group RNTI. The interfering group identifier may be associated with an interfering group of devices, such as a group of devices included in an RNTI group managed by the second base station 2505-*a*. In some examples, the interfering group of devices may include the second UE 2515-*a*. The second base station 2505-*a* may also be considered an interfering device, though not a member of the RNTI group including the interfering group of devices. One or more of the wireless devices in the interfering group of devices may receive an interfering transmission from the second base station 2505-*a*, which interfering transmission interferes with the reception of transmissions at the first UE 2515. For example, the second UE 2515-*a* may receive a transmission (e.g., the downlink control information 2535 or the interfering transmission 2570) from the second base station 2505-*a*, which transmission from the second base station 2505-*a* interferes with the reception of a transmission (e.g., the downlink control information 2530 or the first downlink data transmission 2565) from the first base station 2505 at the first UE 2515.

In some examples, the first base station 2505 may also transmit, to one or more of the UEs for which it operates as a serving base station (e.g., the first UE 2515), a range of UE identifiers for the UEs included in the interfering group of devices. Also or alternatively, a UE (e.g., the first UE 2515) may decode information transmitted to or from the second base station 2505-*a* or to or from a UE within the interfering group of devices (e.g., the second UE 2515-*a*), and extract the range of UE identifiers from the decoded information.

The first base station 2505 may transmit downlink control information 2530 (e.g., one or more PDCCHs or ePDCCHs containing downlink control information) to one or more of the UEs for which it operates as a serving base station, including, for example, the first UE 2515. In some examples, the downlink control information 2530 may be transmitted for a subframe of wireless communications between the first base station 2505 and one or more of the UEs for which the first base station 2505 operates as a serving base station. In some examples, the downlink control information 2530 for the first UE 2515 may be encoded (e.g., scrambled (e.g., CRC-scrambled)) using the first UE identifier 2520, or if the first UE 2515 is a member of a first RNTI group managed by the first base station 2505, the downlink control information 2530 may be encoded (e.g., scrambled (e.g., CRC-scrambled)) using a first group identifier of the first RNTI group, or encoded (e.g., scrambled (e.g., CRC-scrambled)) using a deterministic function (e.g., an XOR) of the first group identifier and the first UE identifier 2520).

The second base station 2505-*a* may transmit downlink control information 2535 (e.g., one or more PDCCHs or ePDCCHs containing downlink control information) to one or more of the UEs in the interfering group of devices (e.g., to the second UE 2515-*a*). In some examples, the downlink control information 2535 may include downlink control information for each UE, in the interfering group of devices, with which the second base station 2505-*a* intends to communicate during a subframe. In some examples, the downlink control information 2535 may be encoded (e.g., scrambled (e.g., CRC-scrambled)) using the interfering group identifier 2525. In some examples, the downlink control information 2535 for each UE in the interfering group of devices may be encoded (e.g., scrambled (e.g., CRC-scrambled)) using a deterministic function (e.g., an XOR) of the interfering group identifier 2525 and a UE identifier for the UE. For example, downlink control information for the second UE 2515-*a* may be encoded (e.g., scrambled (e.g., CRC-scrambled)) using a deterministic function (e.g., an XOR) of the interfering group identifier 2525 and a second UE identifier assigned to the second UE 2515-*a* to identify the second UE 2515-*a* within the interfering group of devices.

At block 2540, the first UE 2515 may receive the downlink control information 2535. In some examples, the downlink control information 2535 may be received in one or more PDCCHs or ePDCCHs. In some examples, the downlink control information 2535 may be received for one or more UEs in the interfering group of devices using the interfering group identifier 2525. For example, downlink control information for the second UE 2515-*a* may be decoded (e.g., descrambled (e.g., CRC-descrambled)) using the interfering group identifier 2525. In some examples, the downlink control information 2535 may be received for one or more UEs in the interfering group of devices by attempting to receive downlink control information for each of the UEs represented in the range of UE identifiers received for the interfering group of devices. For example, the downlink control information 2535 may be received for a UE in the interfering group of devices using a deterministic function (e.g., an XOR) of the interfering group identifier 2525 and a UE identifier for the UE. For example, downlink control information for the second UE 2515-*a* may be decoded (e.g., descrambled (e.g., CRC-descrambled)) based at least in part on a deterministic function of the interfering group identifier 2525 and a second UE identifier assigned to the second UE 2515-*a* to identify the second UE 2515-*a* within the interfering group of devices.

In examples in which the downlink control information for a UE is scrambled using the interfering group identifier 2525, the downlink control information for the UE may reference (e.g., include) a UE identifier for the UE. Inclusion of the UE identifier, in the downlink control information for the UE, may enable the first UE 2515 to identify the UE to which the downlink control information corresponds. In examples in which the downlink control information for a UE is scrambled using a deterministic function (e.g., an XOR) of the interfering group identifier 2525 and a UE identifier, the downlink control information for the UE may not include a UE identifier, and the first UE 2515 may identify the UE to which the downlink control information corresponds based at least in part on an ability to decode (e.g., descramble (e.g., CRC-descramble)) the downlink control information for the UE using the interfering group identifier 2525 and the UE identifier for the UE.

At block 2545, and when the first UE 2515 is unable to decode the downlink control information 2530 at block 2550, the first UE 2515 may perform an interference cancellation operation (e.g., a CWIC operation or a SLIC operation) on the possibly interfering downlink transmission(s) (e.g., PDCCHs, ePDCCHs, or PDSCHs) of the second base station 2505-*a* that are discoverable as a result of decoding the downlink control information 2535. In some examples, the interference cancellation operation may be performed on a per-resource block basis.

At block 2550, the first UE 2515 may receive the downlink control information 2530 (possibly in the absence of canceled interference) and determine whether the downlink control information 2530 corresponds to the first UE 2515. In some examples, the downlink control information 2535 may be received in one or more PDCCHs or ePDCCHs. In some examples, the operation(s) at block 2550 may include decoding (e.g., descrambling (e.g., CRC-descrambling)) the downlink control information 2530 for the first UE 2515 using the first UE identifier 2520. In some examples, the operation(s) at block 2550 may include decoding (e.g., descrambling (e.g., CRC-descrambling)) the downlink control information 2530 for the first UE 2415 using a deterministic function (e.g., an XOR) of a first RNTI group identifier and the first UE identifier 2520. When the first UE 2515 determines that the downlink control information 2530 does not include downlink control information for the first UE 2515, the first UE 2515 may not perform the operation(s) at blocks 2555, 2560, 2575, 2580, or 2585 (e.g., for a current subframe of wireless communications between the first base station 2505 and one or more UEs including the first UE 2515). When the first UE 2515 determines that the downlink control information 2530 does include downlink control information for the first UE 2515, the first UE 2515 may process the downlink control information 2530 to determine, for example, a transmission format, a data rate, a rank, an MCS, assigned resource blocks, or HARQ information for a first downlink data transmission 2565 (e.g., a first PDSCH) to be transmitted from the first base station 2505 to the first UE 2515.

At block 2555, the first UE 2515 may identify, based at least in part on the downlink control information 2535, an interfering transmission 2570. In some examples, the interfering transmission 2570 may include a second downlink data transmission (e.g., a second PDSCH transmission) transmitted from the second base station 2505-*a* to the second UE 2515-*a*. The interfering transmission 2570 may be considered interfering in the context of the first UE 2515, because it has the potential to interfere with the first UE's receipt of the first downlink data transmission 2565. In some examples, the first UE 2515 may further identify the interfering transmission 2570 based at least in part on the downlink control information 2530 (e.g., by identifying an overlap of resources assigned to the first downlink data transmission 2565 and the interfering transmission 2570). The first UE 2515 may process the downlink control information 2535 to determine, for example, a transmission format, a data rate, a rank, an MCS, assigned resource blocks, or HARQ information for the interfering transmission 2570.

At block 2560, the first UE 2515 may determine an RNTI for the interfering transmission 2570. The RNTI may be based at least in part on a second UE identifier included in the downlink control information 2535. The second UE identifier may be an identifier of the second UE 2515-*a*. In some examples, the RNTI for the interfering transmission 2570 may be based at least in part on a deterministic function (e.g., an XOR) of the second UE identifier and the interfering group identifier 2525.

At some point in time following transmission of the downlink control information 2535 and the downlink control information 2530 (and in some examples, immediately following), the first base station 2505 may transmit the first downlink data transmission 2565 (e.g., a first PDSCH) to the first UE 2515, as indicated in the downlink control information 2530. In some examples, the first downlink data transmission 2565 may be scrambled (e.g., CRC-scrambled) using the first UE identifier 2520, or if the first UE 2515 is a member of a first RNTI group managed by the first base station 2505, the first downlink data transmission 2565 may be scrambled (e.g., CRC-scrambled) using an RNTI based at least in part on a deterministic function (e.g., an XOR) of the first UE identifier 2520 and a first group identifier of the first RNTI group.

Overlapping with the first downlink data transmission 2565, the second base station 2505-*a* may transmit the interfering transmission 2570 (e.g., a second downlink data transmission (e.g., a second PDSCH) transmitted to the second UE 2515-*a*), as indicated in the downlink control information 2535. In some examples, the interfering transmission 2570 may be scrambled using the determined RNTI for the interfering transmission 2570.

At block 2575, the first UE 2515 may identify or decode the interfering transmission 2570. In some examples, the interfering transmission 2570 may be identified or decoded (e.g., descrambled) using the determined RNTI for the interfering transmission 2570.

At block 2580, the first UE 2515 may perform an interference cancellation operation (e.g., a CWIC operation or a SLIC operation) on the interfering transmission 2570. In some examples, the interference cancellation operation may be performed on a per-resource block basis.

At block 2585, the first UE 2515 may identify or decode the first downlink data transmission 2565 (e.g., in the absence of the canceled interfering transmission 2570). In some examples, the first downlink data transmission 2565 may be identified or decoded (e.g., descrambled) using the first UE identifier 2520.

In some examples of the message flow 2500, a plurality of interfering transmissions may be identified and canceled by performing an interference cancellation operation (or by performing a plurality of interference cancellation operations).

Figure 26:
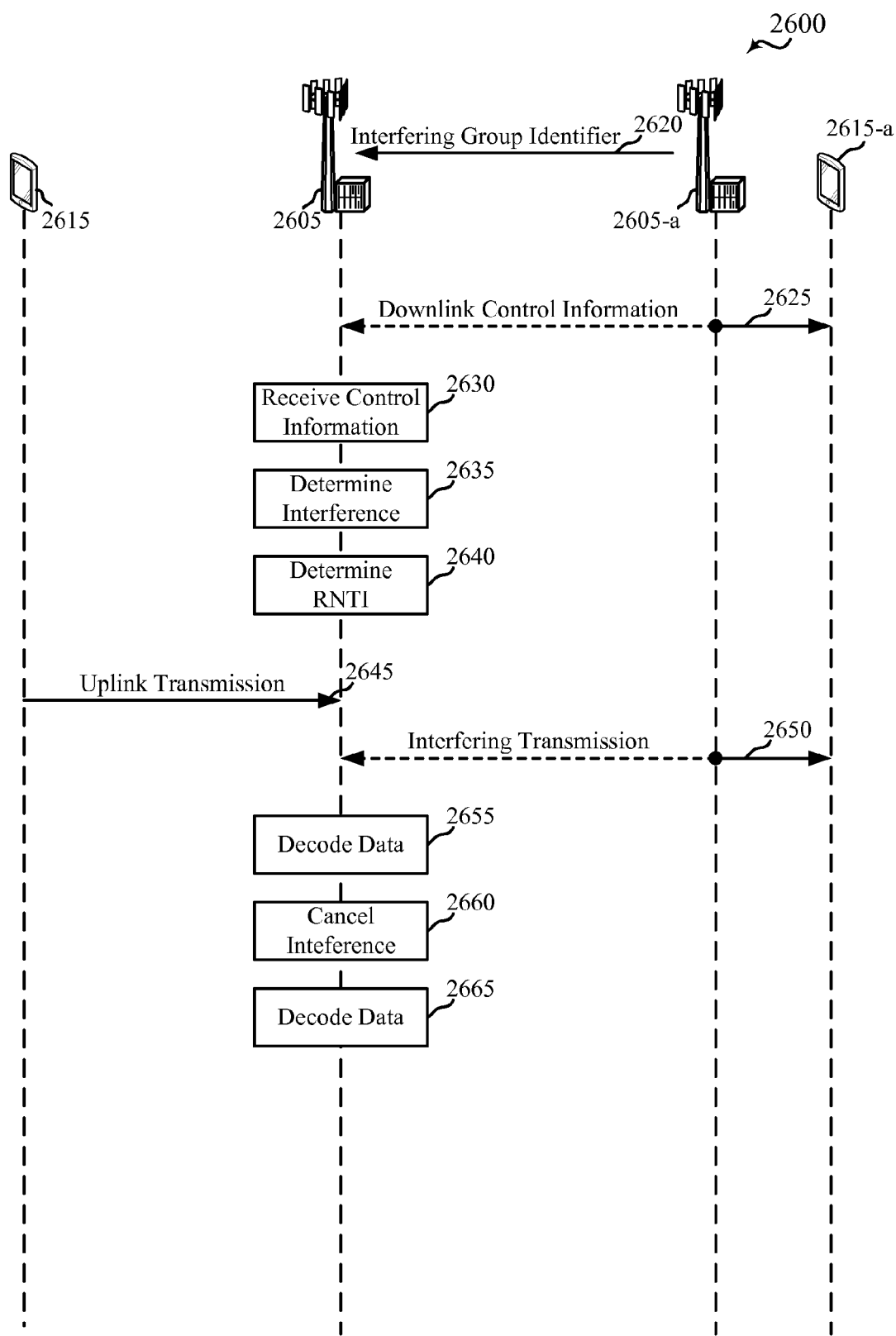
FIG. 26 shows a message flow between a first UE, a second UE, a first base station, and a second base station, in accordance with various aspects of the present disclosure.

FIG. 26 shows a message flow 2600 between a first UE 2615, a second UE 2615-*a*, a first base station 2605, and a second base station 2605-*a*, in accordance with various aspects of the present disclosure. In some examples, the first UE 2615 or the second UE 2615-*a* may be an example of aspects of one or more of the UEs 115, 2015, 2015-*a*, 2015-*b*, 2015-*c*, 2015-*d*, 2015-*e*, 2215, 2215-*a*, 2215-*b*, 2215-*c*, 2315, 2315-*a*, 2415, 2415-*a*, 2515, or 2515-*a* described with reference to FIG. 1, 2, 4, 5, 6, or 7. In some examples, the first base station 2605 or the second base station 2605-*a* may be an example of aspects of one or more of the base stations 105, 2005, 2005-*a*, 2005-*b*, 2005-*c*, 2005-*d*, 2005-*e*, 2205, 2205-*a*, 2305, 2405, 2405-*a*, 2505, or 2505-*a* described with reference to FIG. 1, 20, 22, 23, 24, or 25. In some examples, the first base station 2605 may operate as a serving base station for the first UE 2615, and the second base station 2605-*a* may operate as a serving base station for the second UE 2615-*a*. Messages may be transmitted between the first UE 2615, the second UE 2615-*a*, the first base station 2605, the or the second base station 2605-*a* over at least one radio frequency spectrum band (e.g., a licensed radio frequency spectrum band or an unlicensed radio frequency spectrum band).

In some examples of the message flow 2600, the described transmissions between the first base station 2605 and the first UE 2615, and between the second base station 2605-*a* and the second UE 2615-*a*, may occur in an eIMTA environment (e.g., where the first base station 2605 and first UE 2615 are operating in an uplink subframe configuration while the second base station 2605-*a* and the second UE 2615-*a* are operating in a downlink subframe configuration), as described with reference to FIG. 21.

In some examples of the message flow 2600, the described transmissions between the first base station 2605 and the first UE 2615, and between the second base station 2605-*a* and the second UE 2615-*a*, may occur over an unlicensed radio frequency spectrum band, as described with reference to FIG. 22. Before each of the first base station 2605 and the second base station 2605-*a* makes its respective transmissions over the unlicensed radio frequency spectrum band, each of the first base station 2605 and the second base station 2605-*a* may perform a respective LBT procedure to contend for access to the unlicensed radio frequency spectrum band.

As shown in FIG. 26, the second base station 2605-*a* may transmit an interfering group identifier 2620 to the first base station 2605 or the first base station 2605 may otherwise acquire (e.g., request) the interfering group identifier 2620. In some examples, the interfering group identifier 2620 may be transmitted from the second base station 2605-*a* to the first base station 2605 over a backhaul link 134 (see, e.g., FIG. 1). Also or alternatively, the first base station 2605 may decode a SIB received from the second base station 2605-*a*, and extract the interfering group identifier 2620 from the SIB received from the second base station 2605-*a*. In some examples, the interfering group identifier 2620 may include an interfering group RNTI. The interfering group identifier may be associated with an interfering group of devices, such as a group of devices included in an RNTI group managed by the second base station 2605-*a*. In some examples, the interfering group of devices may include the second UE 2615-*a*. The second base station 2605-*a* may also be considered an interfering device, though not a member of the RNTI group including the interfering group of devices. One or more of the wireless devices in the interfering group of devices may receive an interfering transmission from the second base station 2605-*a*, which interfering transmission interferes with the reception of transmissions by the first base station 2605. For example, the second UE 2615-*a* may receive a transmission (e.g., the interfering transmission 2650) from the second base station 2605-*a*, which transmission from the second base station 2605-*a* interferes with the reception of a transmission (e.g., the uplink transmission 2645) from the first UE 2615 by the first base station 2605.

In some examples, the second base station 2605-*a* may also transmit to the first base station 2605 a range of UE identifiers included in the interfering group of devices, or the first base station 2605 may otherwise acquire (e.g., request) the range of UE identifiers.

The second base station 2605-*a* may transmit downlink control information 2625 (e.g., one or more PDCCHs or ePDCCHs containing downlink control information) to one or more of the UEs in the interfering group of devices (e.g., to the second UE 2615-*a*). In some examples, the downlink control information 2625 may include downlink control information for each UE, in the interfering group of devices, with which the second base station 2605-*a* intends to communicate during a subframe. In some examples, the downlink control information 2625 may be encoded (e.g., scrambled (e.g., CRC-scrambled)) using the interfering group identifier 2620. In some examples, the downlink control information 2625 for each UE in the interfering group of devices may be encoded (e.g., scrambled (e.g., CRC-scrambled)) using a deterministic function (e.g., an XOR) of the interfering group identifier 2620 and a UE identifier for the UE. For example, downlink control information for the second UE 2615-*a* may be encoded (e.g., scrambled (e.g., CRC-scrambled)) using a deterministic function (e.g., an XOR) of the interfering group identifier 2620 and a second UE identifier assigned to the second UE 2615-*a* to identify the second UE 2615-*a* within the interfering group of devices.

When the first base station 2605 is operating in an uplink subframe configuration when the downlink control information 2625 is transmitted, and at block 2630, the first base station 2605 may receive the downlink control information 2625. In some examples, the downlink control information 2625 may be received in one or more PDCCHs or ePDCCHs. In some examples, the downlink control information 2625 may be received for one or more UEs in the interfering group of devices using the interfering group identifier 2620. For example, downlink control information for the second UE 2615-*a* may be decoded (e.g., descrambled (e.g., CRC-descrambled)) using the interfering group identifier 2620. In some examples, the downlink control information 2625 may be received for one or more UEs in the interfering group of devices by attempting to receive downlink control information for each of the UEs represented in the range of UE identifiers received for the interfering group of devices. For example, the downlink control information 2625 may be received for a UE in the interfering group of devices using a deterministic function (e.g., an XOR) of the interfering group identifier 2620 and a UE identifier for the UE. For example, downlink control information for the second UE 2615-*a* may be decoded (e.g., descrambled (e.g., CRC-descrambled)) based at least in part on a deterministic function of the interfering group identifier 2620 and a second UE identifier assigned to the second UE 2615-*a* to identify the second UE 2615-*a* within the interfering group of devices.

In examples in which the downlink control information for a UE is scrambled using the interfering group identifier 2620, the downlink control information for the UE may reference (e.g., include) a UE identifier for the UE. Inclusion of the UE identifier, in the downlink control information for the UE, may enable the first base station 2605 to identify the UE to which the downlink control information corresponds. In examples in which the downlink control information for a UE is scrambled using a deterministic function (e.g., an XOR) of the interfering group identifier 2620 and a UE identifier, the downlink control information for the UE may not include a UE identifier, and the first base station 2605 may identify the UE to which the downlink control information corresponds based at least in part on an ability to decode (e.g., descramble (e.g., CRC-descramble)) the downlink control information for the UE using the interfering group identifier 2620 and the UE identifier for the UE.

At block 2635, the first base station 2605 may identify, based at least in part on the downlink control information 2625, an interfering transmission 2650. In some examples, the interfering transmission 2650 may include a downlink data transmission (e.g., a PDSCH) transmitted from the second base station 2605-*a* to the second UE 2615-*a*. The interfering transmission 2650 may be considered interfering, in the context of the first base station 2605, because it has the potential to interfere with the first base station's receipt of the uplink transmission 2645. In some examples, the first base station 2605 may further identify the interfering transmission 2650 based at least in part on information that the first base station 2605 knows about the uplink transmission 2645 (e.g., by identifying an overlap of resources assigned to the uplink transmission 2645 and the interfering transmission 2650). The first base station 2605 may process the downlink control information 2625 to determine, for example, a transmission format, a data rate, a rank, an MCS, assigned resource blocks, or HARQ information for the interfering transmission 2650.

At block 2640, the first base station 2605 may determine an RNTI for the interfering transmission 2650. The RNTI may be based at least in part on a second UE identifier included in the downlink control information 2625. The second UE identifier may be an identifier of the second UE 2615-*a*. In some examples, the RNTI for the interfering transmission 2650 may be based at least in part on a deterministic function (e.g., an XOR) of the second UE identifier and the interfering group identifier 2620.

At some point in time following transmission of the downlink control information 2625 (and in some examples, immediately following), the first base station 2605 may receive the uplink transmission 2645 (e.g., a physical uplink control channel (PUCCH) or a physical uplink shared channel (PUSCH)) from the first UE 2615.

Overlapping with the uplink transmission 2645, the second base station 2605-*a* may transmit the interfering transmission 2650 (e.g., a downlink data transmission (e.g., a PDSCH) transmitted to the second UE 2615-*a*), as indicated in the downlink control information 2625. In some examples, the interfering transmission 2650 may be scrambled using the determined RNTI for the interfering transmission 2650.

At block 2655, the first base station 2605 may identify or decode the interfering transmission 2650. In some examples, the interfering transmission 2650 may be identified or decoded (e.g., descrambled) using the determined RNTI for the interfering transmission 2650.

At block 2660, the first base station 2605 may perform an interference cancellation operation (e.g., a CWIC operation or a SLIC operation) on the interfering transmission 2650. In some examples, the interference cancellation operation may be performed on a per-resource block basis.

At block 2665, the first base station 2605 may identify or decode the uplink transmission 2645 (e.g., in the absence of the canceled interfering transmission 2650).

In some examples of the message flow 2600, a plurality of interfering transmissions may be identified and canceled by performing an interference cancellation operation (or by performing a plurality of interference cancellation operations).

Figure 27:
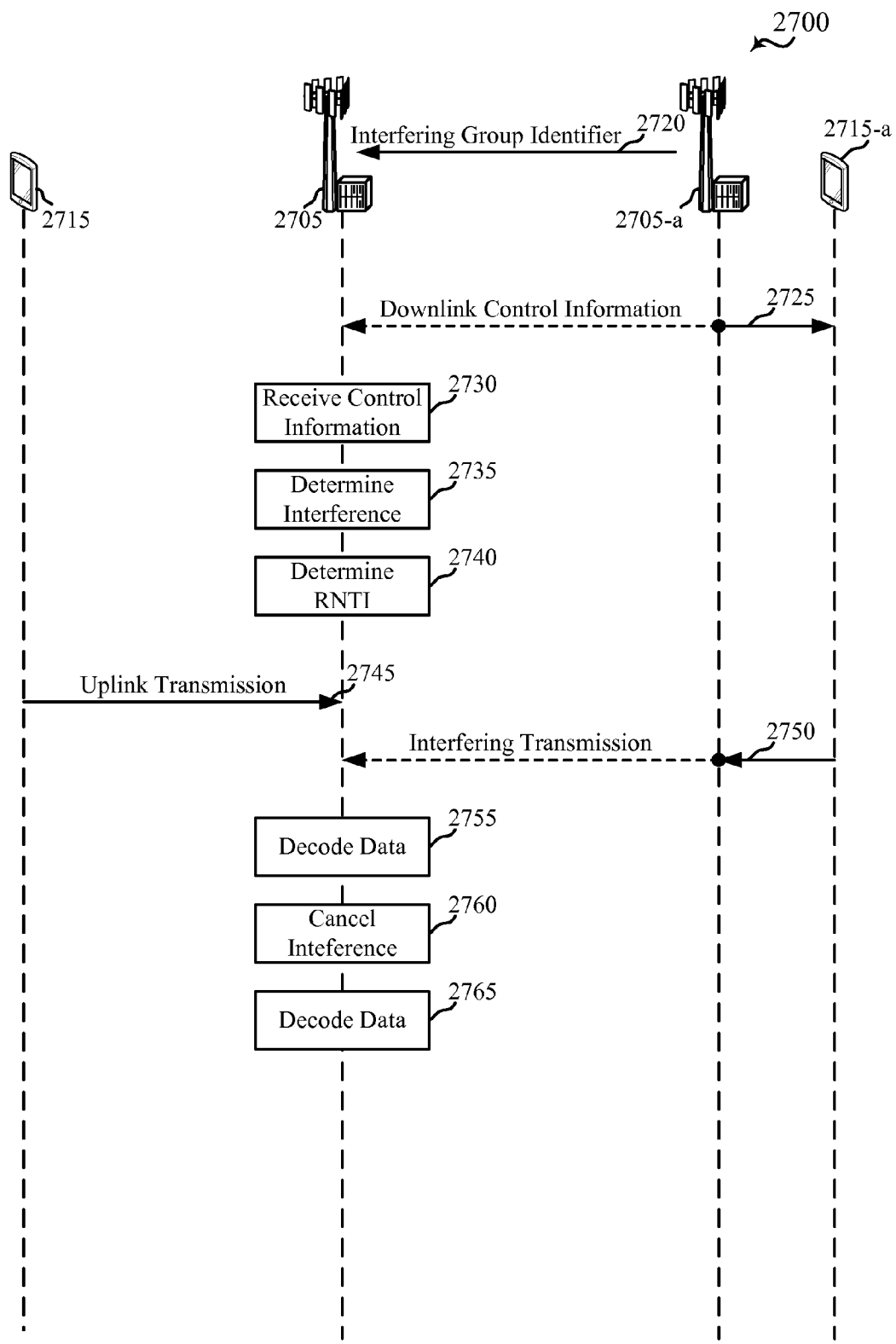
FIG. 27 shows a message flow between a first UE, a second UE, a first base station, and a second base station, in accordance with various aspects of the present disclosure.

FIG. 27 shows a message flow 2700 between a first UE 2715, a second UE 2715-*a*, a first base station 2705, and a second base station 2705-*a*, in accordance with various aspects of the present disclosure. In some examples, the first UE 2715 or the second UE 2715-*a* may be an example of aspects of one or more of the UEs 115, 2015, 2015-*a*, 2015-*b*, 2015-*c*, 2015-*d*, 2015-*e*, 2215, 2215-*a*, 2215-*b*, 2215-*c*, 2315, 2315-*a*, 2415, 2415-*a*, 2515, 2515-*a*, 2615, or 2615-*a* described with reference to FIG. 1, 20, 22, 23, 24, 25, or 26. In some examples, the first base station 2705 or the second base station 2705-*a* may be an example of aspects of one or more of the base stations 105, 2005, 2005-*a*, 2005-*b*, 2005-*c*, 2005-*d*, 2005-*e*, 2205, 2205-*a*, 2305, 2405, 2405-*a*, 2505, 2505-*a*, 2605, or 2605-*a* described with reference to FIG. 1, 2, 4, 5, 6, 7, or 8. In some examples, the first base station 2705 may operate as a serving base station for the first UE 2715, and the second base station 2705-*a* may operate as a serving base station for the second UE 2715-*a*. Messages may be transmitted between the first UE 2715, the second UE 2715-*a*, the first base station 2705, or the second base station 2705-*a* over at least one radio frequency spectrum band (e.g., a licensed radio frequency spectrum band or an unlicensed radio frequency spectrum band).

As shown in FIG. 27, the second base station 2705-*a* may transmit an interfering group identifier 2720 to the first base station 2705 or the first base station 2705 may otherwise acquire (e.g., request) the interfering group identifier 2720. In some examples, the interfering group identifier 2720 may be transmitted from the second base station 2705-*a* to the first base station 2705 over a backhaul link 134 (see, e.g., FIG. 1). Also or alternatively, the first base station 2705 may decode a SIB received from the second base station 2705-*a*, and extract the interfering group identifier 2720 from the SIB received from the second base station 2705-*a*. In some examples, the interfering group identifier 2720 may include an interfering group RNTI. The interfering group identifier may be associated with an interfering group of devices, such as a group of devices included in an RNTI group managed by the second base station 2705-*a*. In some examples, the interfering group of devices may include the second UE 2715-*a*. The second base station 2705-*a* may also be considered an interfering device, though not a member of the RNTI group including the interfering group of devices. One or more of the wireless devices in the interfering group of devices may receive an interfering transmission from the second base station 2705-*a*, which interfering transmission interferes with the reception of transmissions by the first base station 2705. For example, the second UE 2715-*a* may receive a transmission (e.g., the interfering transmission 2750) from the second base station 2705-*a*, which transmission from the second base station 2705-*a* interferes with the reception of a transmission (e.g., the uplink transmission 2745) from the first UE 2715 by the first base station 2705.

In some examples, the second base station 2705-*a* may also transmit to the first base station 2705 a range of UE identifiers included in the interfering group of devices, or the first base station 2705 may otherwise acquire (e.g., request) the range of UE identifiers.

The second base station 2705-*a* may transmit downlink control information 2725 (e.g., one or more PDCCHs or ePDCCHs containing downlink control information) to one or more of the UEs in the interfering group of devices (e.g., to the second UE 2715-*a*). In some examples, the downlink control information 2725 may include downlink control information for each UE, in the interfering group of devices, with which the second base station 2705-*a* intends to communicate during a subframe. In some examples, the downlink control information 2725 may be encoded (e.g., scrambled (e.g., CRC-scrambled)) using the interfering group identifier 2720. In some examples, the downlink control information 2725 for each UE in the interfering group of devices may be encoded (e.g., scrambled (e.g., CRC-scrambled)) using a deterministic function (e.g., an XOR) of the interfering group identifier 2720 and a UE identifier for the UE. For example, downlink control information for the second UE 2715-*a* may be encoded (e.g., scrambled (e.g., CRC-scrambled)) using a deterministic function (e.g., an XOR) of the interfering group identifier 2720 and a second UE identifier assigned to the second UE 2715-*a* to identify the second UE 2715-*a* within the interfering group of devices.

When the first base station 2705 is operating in an uplink subframe configuration when the downlink control information 2725 is transmitted, and at block 2730, the first base station 2705 may receive the downlink control information 2725. In some examples, the downlink control information 2725 may be received in one or more PDCCHs or ePDCCHs. In some examples, the downlink control information 2725 may be received for one or more UEs in the interfering group of devices using the interfering group identifier 2720.

For example, downlink control information for the second UE 2715-*a* may be decoded (e.g., descrambled (e.g., CRC-descrambled)) using the interfering group identifier 2720. In some examples, the downlink control information 2725 may be received for one or more UEs in the interfering group of devices by attempting to receive downlink control information for each of the UEs represented in the range of UE identifiers received for the interfering group of devices. For example, the downlink control information 2725 may be received for a UE in the interfering group of devices using a deterministic function (e.g., an XOR) of the interfering group identifier 2720 and a UE identifier for the UE. For example, downlink control information for the second UE 2715-*a* may be decoded (e.g., descrambled (e.g., CRC-descrambled)) based at least in part on a deterministic function of the interfering group identifier 2720 and a second UE identifier assigned to the second UE 2715-*a* to identify the second UE 2715-*a* within the interfering group of devices.

In examples in which the downlink control information for a UE is scrambled using the interfering group identifier 2720, the downlink control information for the UE may reference (e.g., include) a UE identifier for the UE. Inclusion of the UE identifier, in the downlink control information for the UE, may enable the first base station 2705 to identify the UE to which the downlink control information corresponds. In examples in which the downlink control information for a UE is scrambled using a deterministic function (e.g., an XOR) of the interfering group identifier 2720 and a UE identifier, the downlink control information for the UE may not include a UE identifier, and the first base station 2705 may identify the UE to which the downlink control information corresponds based at least in part on an ability to decode (e.g., descramble (e.g., CRC-descramble)) the downlink control information for the UE using the interfering group identifier 2720 and the UE identifier for the UE.

At block 2735, the first base station 2705 may identify, based at least in part on the information pertaining to at least one uplink assignment, an interfering transmission 2750. In some examples, the interfering transmission 2750 may include an uplink transmission (e.g., a PUCCH or a PUSCH) transmitted from the second UE 2715-*a* to the second base station 2705-*a*. The interfering transmission 2750 may be considered interfering, in the context of the first base station 2705, because it has the potential to interfere with the first base station's receipt of the uplink transmission 2745. In some examples, the first base station 2705 may further identify the interfering transmission 2750 based at least in part on information that the first base station 2705 knows about the uplink transmission 2745 (e.g., by identifying an overlap of resources assigned to the uplink transmission 2745 and the interfering transmission 2750). The first base station 2705 may process the downlink control information 2725 to determine, for example, a transmission format, a data rate, a rank, an MCS, assigned resource blocks, or HARQ information for the interfering transmission 2750.

At block 2740, the first base station 2705 may determine an RNTI for the interfering transmission 2750. The RNTI may be based at least in part on a second UE identifier included in the downlink control information 2725. The second UE identifier may be an identifier of the second UE 2715-*a*. In some examples, the RNTI for the interfering transmission 2750 may be based at least in part on a deterministic function (e.g., an XOR) of the second UE identifier and the interfering group identifier 2720.

At some point in time following transmission of the downlink control information 2725 (and in some examples, immediately following), the first base station 2705 may receive the uplink transmission 2745 (e.g., a PUCCH or a PUSCH) from the first UE 2715.

Overlapping with the uplink transmission 2745, the second base station 2705-*a* may transmit the interfering transmission 2750 (e.g., an uplink transmission (e.g., a PUSCH or PDSCH) transmitted to the second UE 2715-*a*), as indicated in the downlink control information 2725. In some examples, the interfering transmission 2750 may be scrambled using the determined RNTI for the interfering transmission 2750.

At block 2755, the first base station 2705 may identify or decode the interfering transmission 2750. In some examples, the interfering transmission 2750 may be identified or decoded (e.g., descrambled) using the determined RNTI for the interfering transmission 2750.

At block 2760, the first base station 2705 may perform an interference cancellation operation (e.g., a CWIC operation or a SLIC operation) on the interfering transmission 2750. In some examples, the interference cancellation operation may be performed on a per-resource block basis.

At block 2765, the first base station 2705 may identify or decode the uplink transmission 2745 (e.g., in the absence of the canceled interfering transmission 2750).

In some examples of the message flow 2700, a plurality of interfering transmissions may be identified and canceled by performing an interference cancellation operation (or by performing a plurality of interference cancellation operations).

In some examples, a wireless communication system such as the wireless communication system 100, 2000, or 2200 described with reference to FIG. 20, 22, or 24 may include UEs capable of operating in an RNTI group (e.g., UEs capable of identifying that the UE has been assigned to an RNTI group) or decoding information pertaining to an interfering transmission's relation to a device included in an interfering group of devices (e.g., an interfering RNTI group). The wireless communication system may also include UEs that are not capable of operating in, or understanding information pertaining to, an RNTI group. When a base station communicates with both RNTI group-capable UEs and legacy UEs (e.g., UEs that are not capable of operating in or understanding RNTI groups), the RNTI group-capable UEs may be able to cancel interference from transmissions to or from UEs included in an RNTI group, but may not be able to cancel (or efficiently cancel) interference from transmissions to or from legacy UEs not included in an RNTI group. A base station or group of base stations may separate the scheduling of transmissions to or from RNTI group-capable UEs and legacy UEs in a time domain multiplexed (TDM) or frequency domain multiplexed (FDM) manner. Also or alternatively, a base station may duplicate a PDCCH or ePDCCH for a legacy UE in a PDCCH or ePDCCH for an RNTI group-capable UE. Also or alternatively, a flag may be included in the PDCCH or ePDCCH for an RNTI group-capable UE, which flag may indicate whether a legacy UE is scheduled during a subframe to which the PDCCH or ePDCCH applies. The flag may indicate that a UE may need to use blind detection to detect an interfering transmission to or from a legacy UE.

In some examples, the number of PDCCHs or ePDCCHs that a UE may potentially decode may be high, and the processing burden that this places on the UE may likewise be high. To reduce the processing burden placed on the UE, a search space for identifying control information may be defined. In some examples, the search space may be defined by a hash, which hash is based on at least a UE identifier assigned to the UE. The hash may be used to check a set of control channel elements for a match, such that the UE decodes (or attempts to decode) a limited number of PDCCHs or ePDCCHs.

Figure 28:
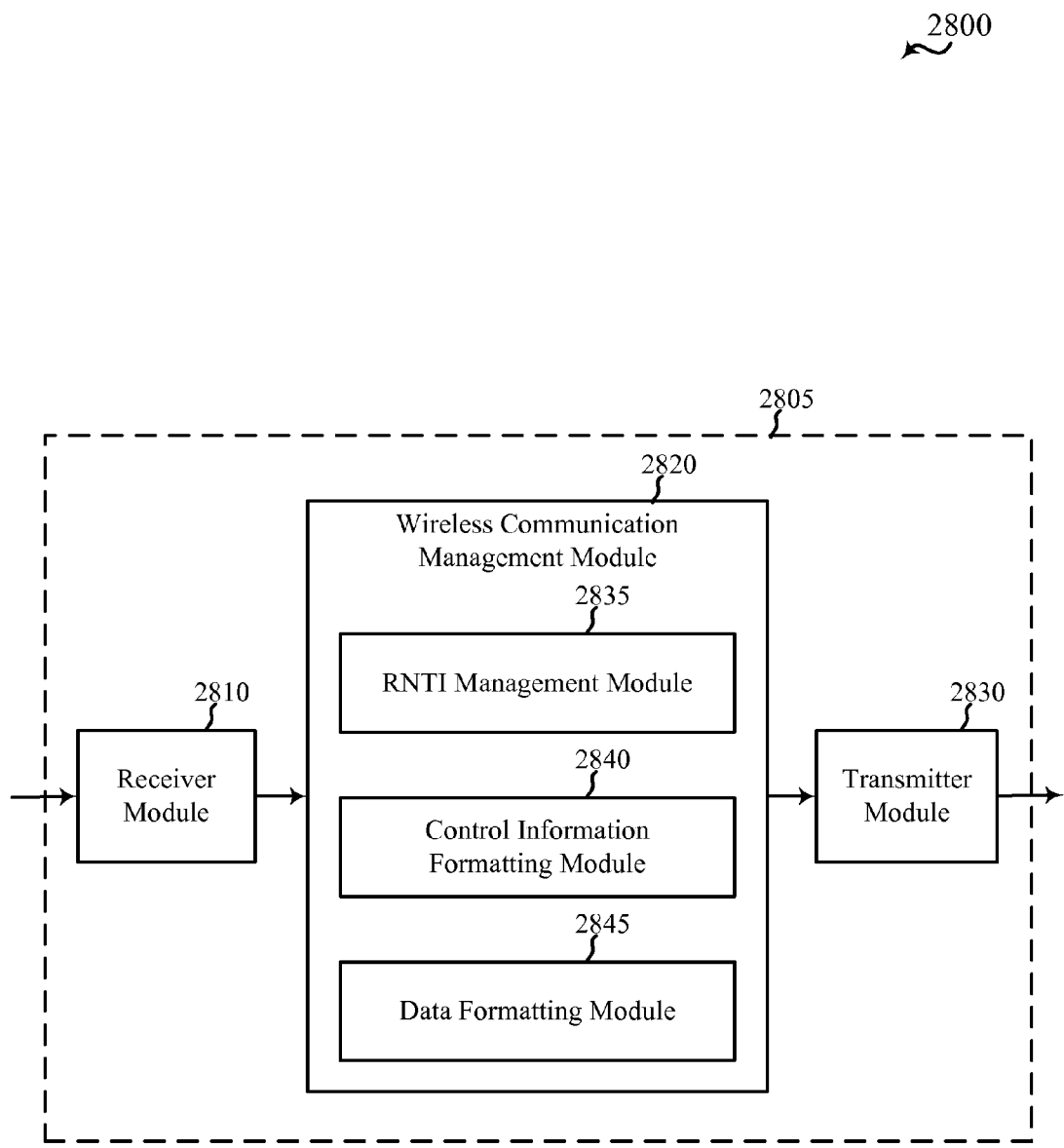
FIG. 28 shows a block diagram of a wireless apparatus for use in wireless communication, in accordance with various aspects of the present disclosure.

FIG. 28 shows a block diagram 2800 of a wireless apparatus 2805 for use in wireless communication, in accordance with various aspects of the present disclosure. In some examples, the wireless apparatus 2805 may be an example of aspects of one or more of the base stations 105, 2005, 2005-a, 2005-b, 2005-c, 2005-d, 2005-e, 2205, 2205-a, 2305, 2405, 2405-a, 2505, 2505-a, 2605, 2605-a, 2705, or 2705-a described with reference to FIG. 1, 20, 22, 23, 24, 25, 26, or 27. The wireless apparatus 2805 may also be a processor. The wireless apparatus 2805 may include a receiver module 2810, a wireless communication management module 2820, or a transmitter module 2830. Each of these components may be in communication with each other.

The components of the wireless apparatus 2805 may, individually or collectively, be implemented using one or more Application-Specific Integrated Circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 2810 may include at least one radio frequency (RF) receiver, such as at least one RF receiver operable to receive transmissions over at least one radio frequency spectrum band. In some examples, the at least one radio frequency spectrum band may be used for wireless communications, as described, for example, with reference to FIG. 1 or 22. The receiver module 2810 may be used to receive various types of data or control signals (i.e., transmissions) over one or more communication links of a wireless communication system, such as one or more communication links of the wireless communication system 100, 2000, or 2200 described with reference to FIG. 1, 20, or 22.

In some examples, the transmitter module 2830 may include at least one RF transmitter, such as at least one RF transmitter operable to transmit over at least one radio frequency spectrum band. The transmitter module 2830 may be used to transmit various types of data or control signals (i.e., transmissions) over one or more communication links of a wireless communication system, such as one or more communication links of the wireless communication system 100, 2000, or 2200 described with reference to FIG. 1, 20, or 22.

The wireless communication management module 2820 may be used to manage some or all of the wireless communications to or from the wireless apparatus 2805. In some examples, the wireless communication management module 2820 may include an RNTI management module 2835, a control information formatting module 2840, or a data formatting module 2845.

In some examples, the RNTI management module 2835 may be used to define one or more RNTI groups and assign each RNTI group a group identifier (e.g., a group RNTI). Each RNTI group may include a set of UEs served by the wireless apparatus 2805. In some examples, the UEs in an RNTI group may utilize a new transmission mode (TM; e.g., TM13). In some examples, each group RNTI may be a 16-bit value.

In some examples, the RNTI management module 2835 may also be used to assign each of the UEs within an RNTI group a UE identifier (e.g., a unique identifier within the RNTI group). In some examples, each UE identifier may be an 8-bit value.

In some examples, the RNTI management module 2835 may be used to transmit, to a UE served by the wireless apparatus 2805, one or more of a UE identifier assigned to the UE, a group identifier of an RNTI group to which the UE is assigned, a range of UE identifiers for an RNTI group to which the UE is assigned, an interfering group identifier (e.g., an identifier of an interfering group of devices), or a range of UE identifiers for the interfering group of devices.

In some examples, the control information formatting module 2840 may be used to format, on a subframe basis, a PDCCH or ePDCCH for each UE that the wireless apparatus 2805 intends to communicate with during a subframe. Before transmission, each PDCCH or ePDCCH for a UE in a same RNTI group may be encoded (e.g., scrambled (e.g., CRC-scrambled)) with the group identifier for the RNTI group. Within each PDCCH or ePDCCH for a UE in an RNTI group, the control information formatting module 2840 may format downlink control information (e.g., a field of the downlink control information) to reference the UE identifier assigned to the UE to which the PDCCH or ePDCCH corresponds. Alternatively, each PDCCH or ePDCCH for a UE in a same RNTI group may be encoded (e.g., scrambled (e.g., CRC-scrambled)) using an RNTI based at least in part on a deterministic function (e.g., an XOR) of 1) the UE identifier to which the downlink control information corresponds, and 2) the group identifier for the RNTI group.

In some examples, the data formatting module 2845 may be used to format, on a subframe basis, a PDSCH corresponding to a PDCCH or ePDCCH. Each PDSCH corresponding to an RNTI group may be encoded (e.g., scrambled (e.g., CRC-scrambled)) using an RNTI based at least in part on a deterministic function (e.g., an XOR) of 1) the UE identifier for the UE to which the PDSCH is directed, and 2) the group identifier for the RNTI group.

In some examples, the wireless apparatus 2805 may perform the operation(s) performed by one or more of the base stations 2305, 2405, 2505, 2605, or 2705 described with reference to FIG. 23, 24, 25, 26, or 27.

Figure 29:
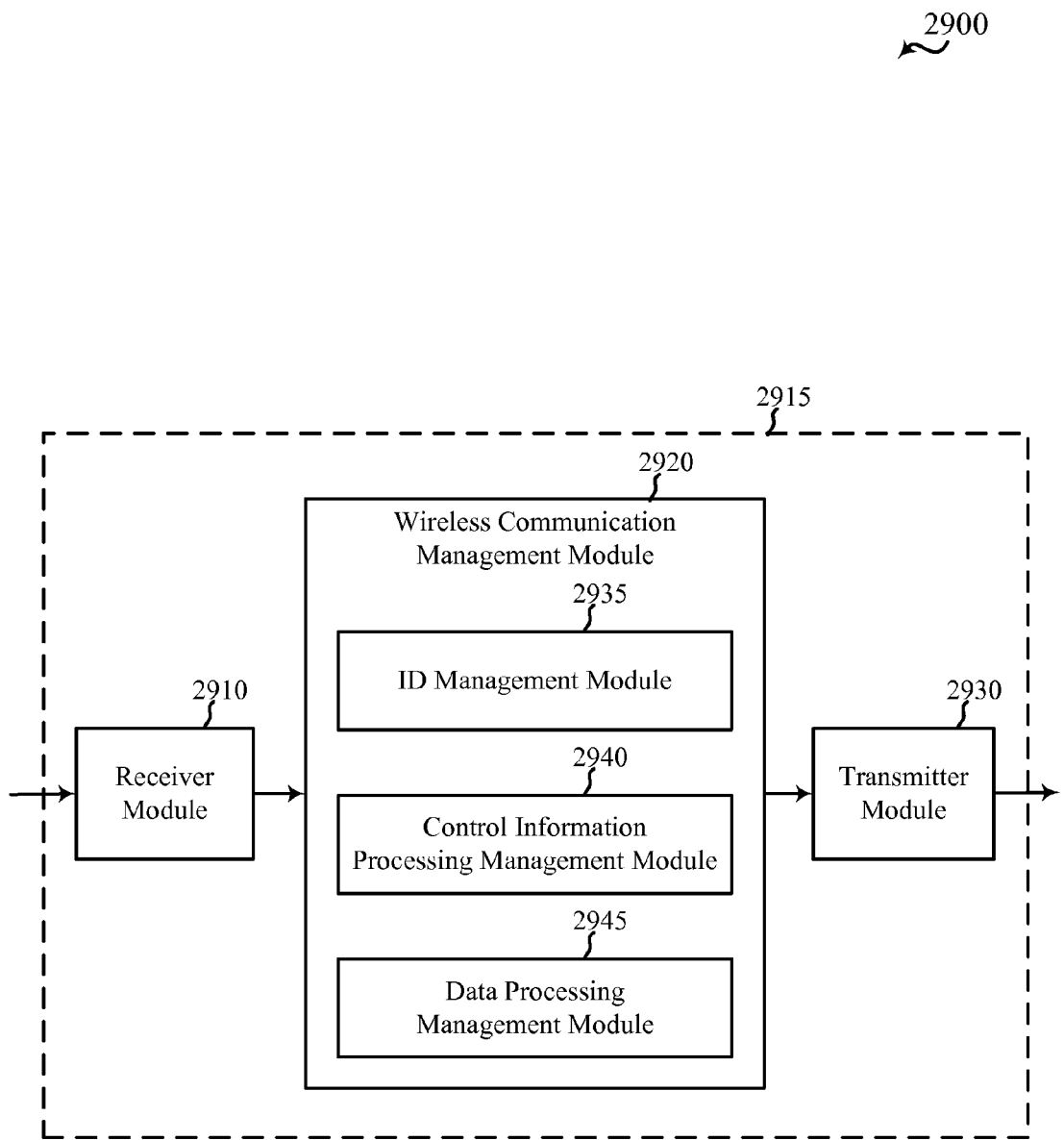
FIG. 29 shows a block diagram of a wireless apparatus for use in wireless communication, in accordance with various aspects of the present disclosure.

FIG. 29 shows a block diagram 2900 of a wireless apparatus 2915 for use in wireless communication, in accordance with various aspects of the present disclosure. In some examples, the wireless apparatus 2915 may be an example of aspects of one or more of the UEs 115, 2015, 2015-a, 2015-b, 2015-c, 2015-d, 2015-e, 2215, 2215-a, 2215-b, 2215-c, 2315, 2315-a, 2415, 2415-a, 2515, 2515-a, 2615, 2615-a, 2715, or 2715-a described with reference to FIG. 1, 20, 22, 23, 24, 25, 26, or 27. The wireless apparatus 2915 may also be a processor. The wireless apparatus 2915 may include a receiver module 2910, a wireless communication management module 2920, or a transmitter module 2930. Each of these components may be in communication with each other.

The components of the wireless apparatus 2915 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/

Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 2910 may include at least one RF receiver, such as at least one RF receiver operable to receive transmissions over at least one radio frequency spectrum band. In some examples, the at least one radio frequency spectrum band may be used for wireless communications, as described, for example, with reference to FIG. 1 or 4. The receiver module 2910 may be used to receive various types of data or control signals (i.e., transmissions) over one or more communication links of a wireless communication system, such as one or more communication links of the wireless communication system 100, 2000, or 2200 described with reference to FIG. 1, 20, or 22.

In some examples, the transmitter module 2930 may include at least one RF transmitter, such as at least one RF transmitter operable to transmit over at least one radio frequency spectrum band. The transmitter module 2930 may be used to transmit various types of data or control signals (i.e., transmissions) over one or more communication links of a wireless communication system, such as one or more communication links of the wireless communication system 100, 2000, or 2200 described with reference to FIG. 1, 20, or 22.

The wireless communication management module 2920 may be used to manage some or all of the wireless communications to or from the wireless apparatus 2915. In some examples, the wireless communication management module 2920 may include an identifier (ID) management module 2935, a control information processing management module 2940, or a data processing management module 2945.

In some examples, the ID management module 2935 may be used to manage a group identifier, a UE identifier, or a range of UE identifiers received from a base station. The group identifier may be associated with a group of devices (e.g., an RNTI group) including the wireless apparatus 2915 and at least one other wireless device (e.g., at least one other UE). The UE identifier may be assigned to the wireless apparatus 2915 and may identify the first wireless apparatus 2915 within the first group of devices. The range of UE identifiers may correspond to the UEs included in the group of devices (e.g., the RNTI group). In some examples, the group identifier, the UE identifier, or the range of UE identifiers may be received by the wireless apparatus 2915 during a random access procedure. In some examples, the UE identifier may be static or semi-static and may be transmitted from the wireless apparatus 2915 to the base station.

In some examples, the control information processing management module 2940 may be used to manage the receipt, decoding, or other processing of downlink control information for the first wireless apparatus 2915. In some examples, the downlink control information may be included in a PDCCH or ePDCCH for the wireless apparatus 2915. In some examples, the control information processing management module 2940 may manage receipt of the downlink control information for the wireless apparatus 2915 using the group identifier managed by the ID management module 2935. For example, the control information processing management module 2940 may manage a decoding (e.g., a descrambling (e.g., a CRC-descrambling)) of the downlink control information for the wireless apparatus 2915 using the group identifier. In some examples, the control information processing management module 2940 may manage receipt of the downlink control information for the wireless apparatus 2915 using a deterministic function (e.g., an XOR) of the group identifier managed by the ID management module 2935 and the UE identifier assigned to the wireless apparatus 2915. For example, the control information processing management module 2940 may manage a decoding (e.g., a descrambling (e.g., a CRC-descrambling)) of the downlink control information for the wireless apparatus 2915 using a deterministic function of the group identifier and the UE identifier.

In some examples, the downlink control information for the wireless apparatus 2915 may reference (e.g., include) the UE identifier assigned to the wireless apparatus 2915. Inclusion of the UE identifier assigned to the wireless apparatus 2915, in the downlink control information for the wireless apparatus 2915, may enable the control information processing management module 2940 to distinguish the downlink control information for the wireless apparatus 2915 from downlink control information for at least one other wireless device in a same group of devices (e.g., a same RNTI group), and thereby identify the downlink control information for the wireless apparatus 2915 based at least in part on the UE identifier assigned to the wireless apparatus 2915. For example, the wireless apparatus 2915 may sometimes receive downlink control information for at least one other wireless device in the group of devices, which downlink control information for the at least one other device may also be decoded using a group identifier of an RNTI group to which the wireless apparatus 2915 belongs. However, because the downlink control information for the at least one other wireless device does not include the UE identifier assigned to the wireless apparatus 2915, the control information processing management module 2940 may determine that the downlink control information for the at least one other wireless device is not intended for the first wireless apparatus 2915.

In some examples, the downlink control information for the wireless apparatus 2915 may not reference the UE identifier assigned to the wireless apparatus 2915 (e.g., when the downlink control information for the wireless apparatus 2915 is encoded (e.g., scrambled (e.g., CRC-scrambled)) using a deterministic function of the group identifier managed by the RNTI management module 2835 and the UE identifier assigned to the wireless apparatus 2915. In these examples, the downlink control information for the wireless apparatus 2915 may be distinguished from other downlink control information by the ability to decode the downlink control information based at least in part on the deterministic function.

In some examples, the data processing management module 2945 may be used to receive a transmission (e.g., a downlink data transmission, such as a PDSCH) from a base station using the downlink control information for the wireless apparatus 2915.

In some examples, the wireless apparatus 2915 may perform the operation(s) at one or more of the blocks 2340, 2345, or 2350 described with reference to FIG. 23.

Figure 30:
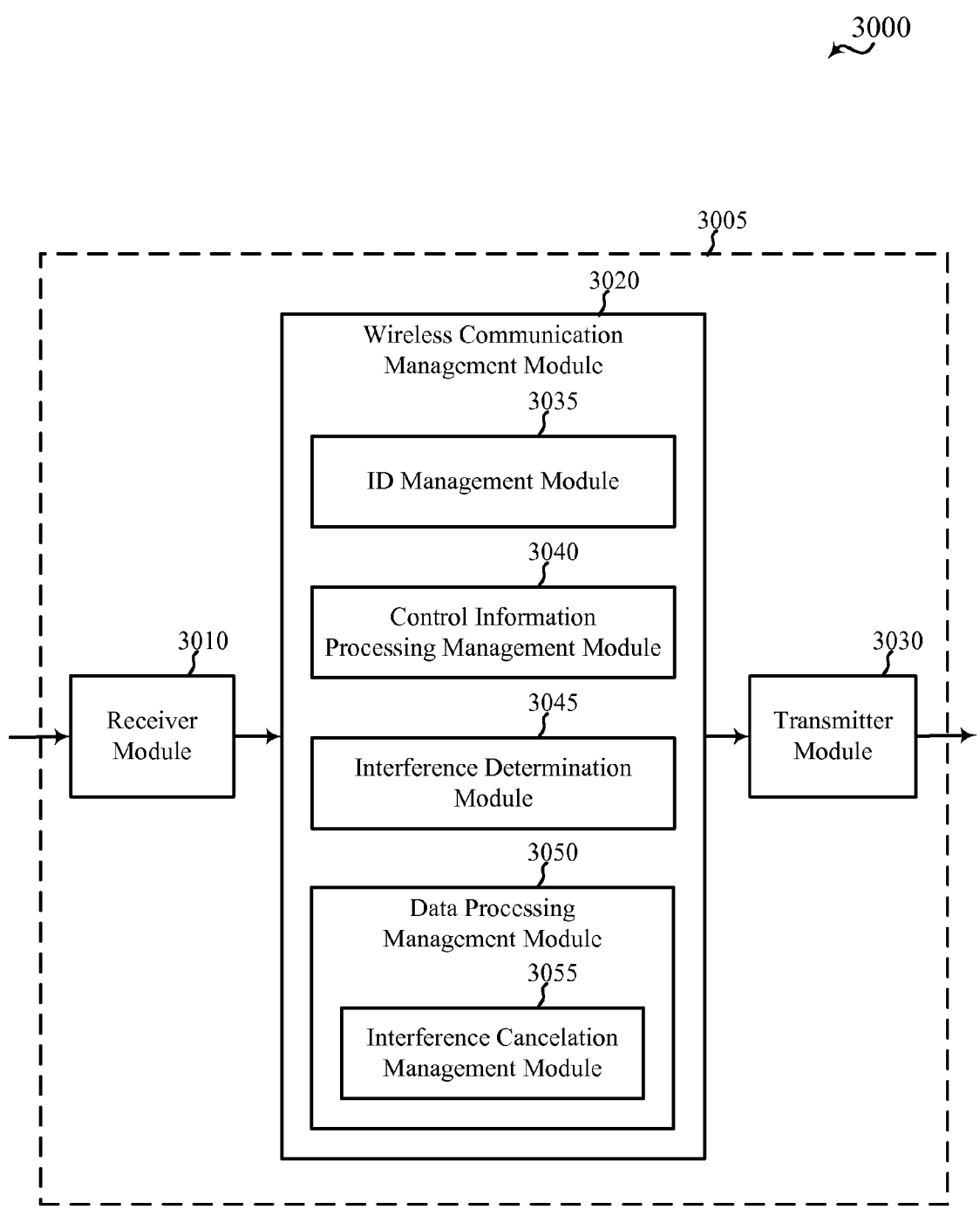
FIG. 30 shows a block diagram of a wireless apparatus for use in wireless communication, in accordance with various aspects of the present disclosure.

FIG. 30 shows a block diagram 3000 of a wireless apparatus 3005 for use in wireless communication, in accordance with various aspects of the present disclosure. In some examples, the wireless apparatus 3005 may be an example of aspects of one or more of the UEs 115, 2015, 2015-a, 2015-b, 2015-c, 2015-d, 2015-e, 2215, 2215-a, 2215-b, 2215-c, 2315, 2315-a, 2415, 2415-a, 2515, 2515-a, 2615, 2615-a, 2715, or 2715-a described with reference to FIG. 1, 20, 22, 23, 24, 25, 26, or 27, aspects of one or more of the base stations 105, 2005, 2005-*a*, 2005-*b*, 2005-*c*, 2005-*d*, 2005-*e*, 2205, 2205-*a*, 2305, 2405, 2405-*a*, 2505, 2505-*a*, 2605, 2605-*a*, 2705, or 2705 described with reference to FIG. 1, 20, 22, 23, 24, 25, 26, or 27, or aspects of one or more of the wireless apparatuses 2805 or 2915 described with reference to FIG. 28 or 29. The wireless apparatus 3005 may also be a processor. The wireless apparatus 3005 may include a receiver module 3010, a wireless communication management module 3020, or a transmitter module 3030. Each of these components may be in communication with each other.

The components of the wireless apparatus 3005 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 3010 may include at least one RF receiver, such as at least one RF receiver operable to receive transmissions over at least one radio frequency spectrum band. In some examples, the at least one radio frequency spectrum band may be used for wireless communications, as described, for example, with reference to FIG. 1 or 22. The receiver module 3010 may be used to receive various types of data or control signals (i.e., transmissions) over one or more communication links of a wireless communication system, such as one or more communication links of the wireless communication system 100, 2000, or 2200 described with reference to FIG. 1, 20, or 22.

In some examples, the transmitter module 3030 may include at least one RF transmitter, such as at least one RF transmitter operable to transmit over at least one radio frequency spectrum band. The transmitter module 3030 may be used to transmit various types of data or control signals (i.e., transmissions) over one or more communication links of a wireless communication system, such as one or more communication links of the wireless communication system 100, 2000, or 2200 described with reference to FIG. 1, 20, or 22.

The wireless communication management module 3020 may be used to manage some or all of the wireless communications to or from the wireless apparatus 3005. In some examples, the wireless communication management module 3020 may include an identifier (ID) management module 3035, a control information processing management module 3040, an interference determination module 3045, or a data processing management module 3050. Operation of the various modules of the wireless communication management module 3020 are described below first in the context of the wireless apparatus 3005 being included in a UE, and second in the context of the wireless apparatus 3005 being included in a base station.

Turning now to examples in which the wireless communication management module 3020 may be included in a UE, and in some examples, the ID management module 3035 may be used to manage an interfering group identifier or a UE identifier received from one or more base stations. In some examples, the interfering group identifier may be associated with an interfering group of devices (e.g., an interfering group of UEs), such as a group of devices included in an RNTI group managed by a base station other than a base station that operates as a serving base station for the wireless apparatus 3005. In some examples, the wireless apparatus 3005 may receive the interfering group identifier from a serving base station. In some examples, the wireless apparatus 3005 may decode a SIB received from a base station other than a serving base station, and extract the interfering group identifier from the SIB received from the base station other than a serving base station. In some examples, one or more of the wireless devices in the interfering group of devices may receive an interfering transmission from a base station other than a serving base station for the wireless apparatus 3005, and the interfering transmission may interfere with the reception of transmissions at the wireless apparatus 3005.

In some examples, the UE identifier may be assigned to the wireless apparatus 3005 by a serving base station for the wireless apparatus 3005. In some examples, the interfering group identifier or the UE identifier may be received by the wireless apparatus 3005 during a random access procedure. In some examples, the UE identifier may be static or semi-static and may be transmitted from the wireless apparatus 3005 to the base station.

In some examples, the control information processing management module 3040 may be used to manage the receipt, decoding, or other processing of downlink control information for the first wireless apparatus 3005, in addition to the receipt, decoding, or other processing of downlink control information for one or more of the devices in the interfering group of devices. In some examples, the downlink control information may be included in a PDCCH or ePDCCH for the wireless apparatus 3005, or in a PDCCH or ePDCCH for one or more of the devices in the interfering group of devices. In some examples, the control information processing management module 3040 may manage the receipt of downlink control information for the wireless apparatus 3005 using the UE identifier managed by the ID management module 3035. For example, the control information processing management module 3040 may manage a decoding (e.g., a descrambling (e.g., a CRC-descrambling)) of the downlink control information for the wireless apparatus 3005 using the UE identifier. In examples in which the wireless apparatus 3005 is part of an RNTI group managed by a serving base station for the wireless apparatus 3005, the control information processing management module 3040 may manage receipt of the downlink control information for the wireless apparatus 3005 as described with reference to FIG. 29.

In some examples, the control information processing management module 3040 may manage the receipt of downlink control information for a device in the interfering group of devices using the interfering group identifier managed by the ID management module 3035. For example, the control information processing management module 3040 may manage a decoding (e.g., a descrambling (e.g., a CRC-descrambling)) of the downlink control information for a device in the interfering group of devices using the interfering group identifier. In some examples, the control information processing management module 3040 may determine the wireless devices to which the downlink control information corresponds. In some examples, the downlink control information may be determined to correspond to a wireless device when it references (e.g., includes) a UE identifier of the wireless device.

In some examples, the control information processing management module 3040 may be used to perform the operations described with reference to block 2440 or 2445 of FIG. 24 or block 2540 or 2550 of FIG. 25.

In some examples, the interference determination module 3045 may be used to identify an interfering transmission based at least in part on the received downlink control information for a device in the interfering group of devices. In some examples, the interference determination module 3045 may be used to perform the operations described with reference to block 2450 or 2455 of FIG. 24 or block 2555 or 2560 of FIG. 25.

In some examples, the data processing management module 3050 may be used to receive a transmission (e.g., a downlink data transmission, such as a PDSCH) from a base station using the downlink control information for the wireless apparatus 3005. In some examples, the data processing management module 3050 may include an interference cancellation management module 3055. In some examples, the interference cancellation management module 3055 may be used to perform an interference cancellation operation on an interfering transmission identified by the interference determination module 3045. In some examples, the data processing management module 3050 may be used to perform the operations described with reference to block 2470 or 2480 of FIG. 24 or block 2575 or 2585 of FIG. 25. In some examples, the interference cancellation management module 3055 may be used to perform the operation(s) described with reference to block 2475 of FIG. 24 or block 2580 of FIG. 25.

Turning now to examples in which the wireless communication management module 3020 may be included in a base station, and in some examples, the ID management module 3035 may be used to manage an interfering group identifier or UE identifiers of UEs served by the wireless apparatus 3005. In some examples, the interfering group identifier may be associated with an interfering group of devices (e.g., an interfering group of UEs), such as a group of devices included in an RNTI group managed by a base station other than the wireless apparatus 3005. In some examples, the wireless apparatus 3005 may receive the interfering group identifier from another base station. In some examples, the wireless apparatus 3005 may decode a SIB received from another base station, and extract the interfering group identifier from the SIB received from the other base station. In some examples, one or more of the wireless devices in the interfering group of devices may receive an interfering transmission from a base station other than the wireless apparatus 3005, and the interfering transmission may interfere with the reception of transmissions at the wireless apparatus 3005.

In some examples, the control information processing management module 3040 may manage the receipt of downlink control information for a device in the interfering group of devices using the interfering group identifier managed by the ID management module 3035. For example, the control information processing management module 3040 may manage a decoding (e.g., a descrambling (e.g., a CRC-descrambling)) of the downlink control information for a device in the interfering group of devices using the interfering group identifier. In some examples, the control information processing management module 3040 may determine the wireless devices to which the downlink control information corresponds. In some examples, the downlink control information may be determined to correspond to a wireless device when it references (e.g., includes) a UE identifier of the wireless device.

In some examples, the control information processing management module 3040 may be used to perform the operations described with reference to block 2630 of FIG. 26 or block 2730 of FIG. 27.

In some examples, the interference determination module 3045 may be used to identify an interfering transmission based at least in part on the received downlink control information for a device in the interfering group of devices. In some examples, the interference determination module 3045 may be used to perform the operations described with reference to block 2635 or 2640 of FIG. 26 or block 2735 or 2740 of FIG. 27.

In some examples, the data processing management module 3050 may be used to receive a transmission (e.g., an uplink transmission, such as a PUCCH or a PUSCH) from a UE for which the wireless apparatus 3005 operates as a serving base station. In some examples, the interference cancellation management module 3055 may be used to perform an interference cancellation operation on an interfering transmission identified by the interference determination module 3045. In some examples, the data processing management module 3050 may be used to perform the operations described with reference to block 2655 or 2665 of FIG. 26 or block 2755 or 2765 of FIG. 27. In some examples, the interference cancellation management module 3055 may be used to perform the operation(s) described with reference to block 2660 of FIG. 26 or block 2760 of FIG. 27.

In examples in which the wireless apparatus 3005 is included in a UE, the wireless apparatus 3005 may perform the operation(s) performed by one or more of the UEs 2315, 2415, or 2515 described with reference to FIG. 23, 24, or 25. In examples in which the wireless apparatus 3005 is included in a base station, the wireless apparatus 3005 may perform the operation(s) performed by one or more of the base stations 2305, 2605 or 2705 described with reference to FIG. 23, 26, or 27.

Figure 31:
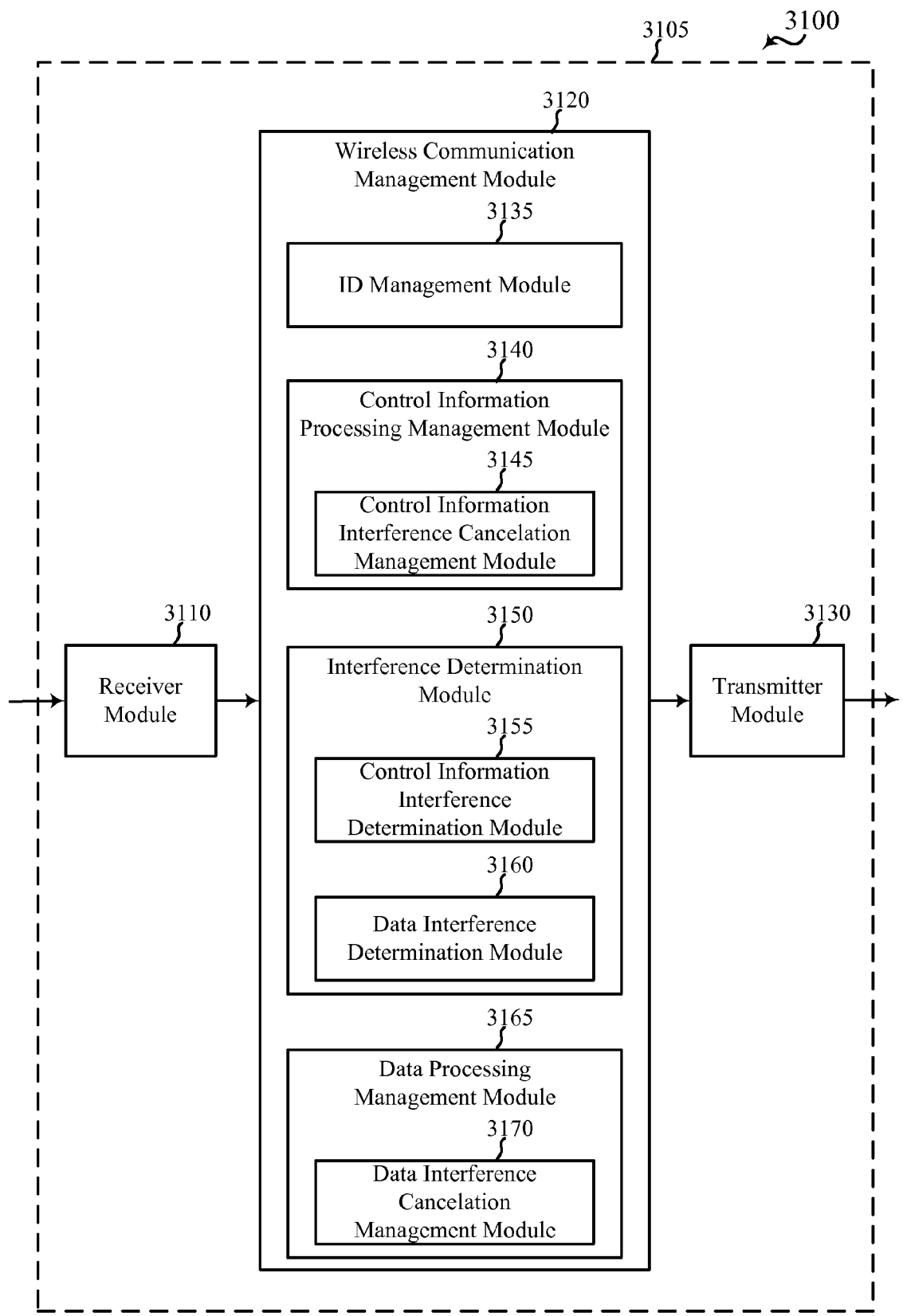
FIG. 31 shows a block diagram of a wireless apparatus for use in wireless communication, in accordance with various aspects of the present disclosure.

FIG. 31 shows a block diagram 3100 of a wireless apparatus 3115 for use in wireless communication, in accordance with various aspects of the present disclosure. In some examples, the wireless apparatus 3115 may be an example of aspects of one or more of the UEs 115, 2015, 2015-*a*, 2015-*b*, 2015-*c*, 2015-*d*, 2015-*e*, 2215, 2215-*a*, 2215-*b*, 2215-*c*, 2315, 2315-*a*, 2415, 2415-*a*, 2515, 2515-*a*, 2615, 2615-*a*, 2715, or 2715-*a* described with reference to FIG. 1, 20, 2, 23, 24, 25, 26, or 27, or aspects of one or more of the wireless apparatuses 2915 or 12015 described with reference to FIG. 29 or 30. The wireless apparatus 3115 may also be a processor. The wireless apparatus 3115 may include a receiver module 3110, a wireless communication management module 3120, or a transmitter module 3130. Each of these components may be in communication with each other.

The components of the wireless apparatus 3115 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 3110 may include at least one RF receiver, such as at least one RF receiver operable to receive transmissions over at least one radio frequency spectrum band. In some examples, the at least one radio frequency spectrum band may be used for wireless communications, as described, for example, with reference to FIG. 1 or 22. The receiver module 3110 may be used to receive various types of data or control signals (i.e., transmissions) over one or more communication links of a wireless communication system, such as one or more communication links of the wireless communication system 100, 2000, or 2200 described with reference to FIG. 1, 20, or 22.

In some examples, the transmitter module 3130 may include at least one RF transmitter, such as at least one RF transmitter operable to transmit over at least one radio frequency spectrum band. The transmitter module 3130 may be used to transmit various types of data or control signals (i.e., transmissions) over one or more communication links of a wireless communication system, such as one or more communication links of the wireless communication system 100, 2000, or 2200 described with reference to FIG. 1, 20, or 22.

The wireless communication management module 3120 may be used to manage some or all of the wireless communications to or from the wireless apparatus 3115. In some examples, the wireless communication management module 3120 may include an identifier (ID) management module 3135, a control information processing management module 3140, an interference determination module 3150, or a data processing management module 3165.

In some examples, the ID management module 3135 may be used to manage an interfering group identifier or a UE identifier received from one or more base stations. In some examples, the interfering group identifier may be associated with an interfering group of devices (e.g., an interfering group of UEs), such as a group of devices included in an RNTI group managed by a base station other than a base station that operates as a serving base station for the wireless apparatus 3115. In some examples, the wireless apparatus 3115 may receive the interfering group identifier from a serving base station. In some examples, the wireless apparatus 3115 may decode a SIB received from a base station other than a serving base station, and extract the interfering group identifier from the SIB received from the base station other than a serving base station. In some examples, one or more of the wireless devices in the interfering group of devices may receive an interfering transmission from a base station other than a serving base station for the wireless apparatus 3115, and the interfering transmission may interfere with the reception of transmissions at the wireless apparatus 3115.

In some examples, the UE identifier may be assigned to the wireless apparatus 3115 by a serving base station for the wireless apparatus 3115. In some examples, the interfering group identifier or the UE identifier may be received by the wireless apparatus 3115 during a random access procedure. In some examples, the UE identifier may be static or semi-static and may be transmitted from the wireless apparatus 3115 to the base station.

In some examples, the control information processing management module 3140 may be used to manage the receipt, decoding, or other processing of downlink control information for the first wireless apparatus 3115, in addition to the receipt, decoding, or other processing of downlink control information for one or more of the devices in the interfering group of devices. In some examples, the downlink control information may be included in a PDCCH or ePDCCH for the wireless apparatus 3115, or in a PDCCH or ePDCCH for one or more of the devices in the interfering group of devices. In some examples, the control information processing management module 3140 may manage the receipt of downlink control information for the wireless apparatus 3115 using the UE identifier managed by the ID management module 3135. For example, the control information processing management module 3140 may manage a decoding (e.g., a descrambling (e.g., a CRC-descrambling)) of the downlink control information for the wireless apparatus 3115 using the UE identifier. In examples in which the wireless apparatus 3115 is part of an RNTI group managed by a serving base station for the wireless apparatus 3115, the control information processing management module 3140 may manage receipt of the downlink control information for the wireless apparatus 3115 as described with reference to FIG. 29.

In some examples, the control information processing management module 3140 may manage the receipt of downlink control information for a device in the interfering group of devices using the interfering group identifier managed by the ID management module 3135. For example, the control information processing management module 3140 may manage a decoding (e.g., a descrambling (e.g., a CRC-descrambling)) of the downlink control information for a device in the interfering group of devices using the interfering group identifier. In some examples, the control information processing management module 3140 may determine the wireless devices to which the downlink control information corresponds. In some examples, the downlink control information may be determined to correspond to a wireless device when it references (e.g., includes) a UE identifier of the wireless device.

In some examples, the control information processing management module 3140 may include a control information interference cancellation management module 3145. In some examples, the control information interference cancellation management module 3145 may be used to cancel interference attributable to downlink control information for a device in the interfering group of devices (e.g., when the downlink control information for the device in the interfering group of devices interferes with the wireless apparatus' receipt of downlink control information for the wireless apparatus 3115).

In some examples, the control information processing management module 3140 may be used to perform the operations described with reference to block 2440 or 2445 of FIG. 24 or block 2540 or 2550 of FIG. 25. In some examples, the control information interference cancellation management module 3145 may be used to perform the operation(s) described with reference to block 2545 of FIG. 25.

In some examples, the interference determination module 3150 may be used to identify an interfering transmission based at least in part on the received downlink control information for a device in the interfering group of devices. In some examples, the interference determination module 3150 may include a control information interference determination module 3155 or a data interference determination module 3160. In some examples, the control information interference determination module 3155 may make the interference determination described with reference to block 2545 of FIG. 25. In some examples, the data interference determination module 3160 may be used to perform the operations described with reference to block 2450 or 2455 of FIG. 24 or block 2555 or 2560 of FIG. 25.

In some examples, the data processing management module 3165 may be used to receive a transmission (e.g., a downlink data transmission, such as a PDSCH) from a base station using the downlink control information for the wireless apparatus 3115. In some examples, the data processing management module 3165 may include a data interference cancellation management module 3170. In some examples, the data interference cancellation management module 3170 may be used to perform an interference cancellation operation on an interfering transmission identified by the data interference determination module 3160. In some examples, the data processing management module 3165 may be used to perform the operations described with reference to block 2470 or 2480 of FIG. 24 or block 2575 or 2585 of FIG. 25. In some examples, the data interference cancellation management module 3170 may be used to perform the operation(s) described with reference to block 2475 of FIG. 24 or block 2580 of FIG. 25.

Figure 32:
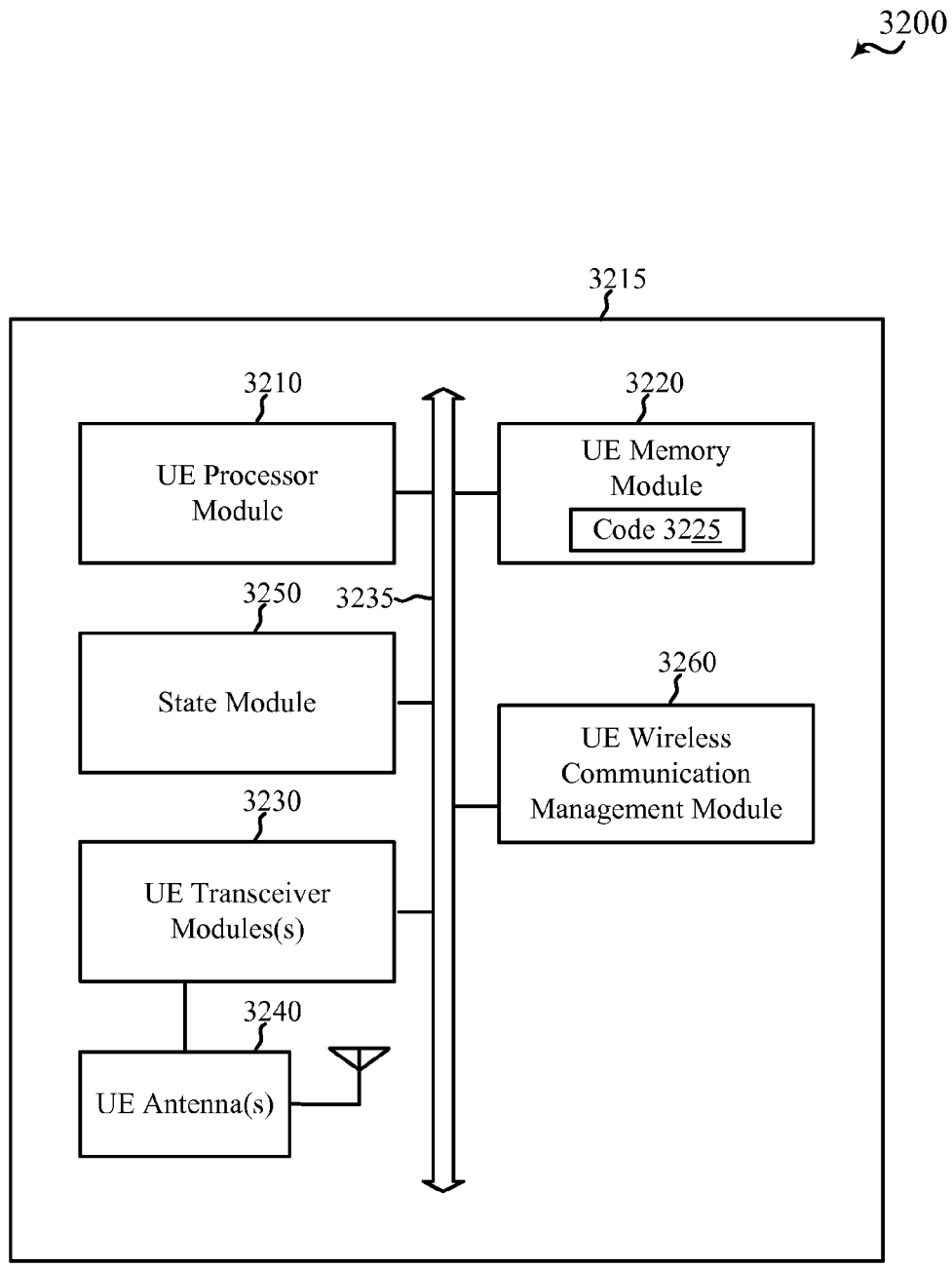
FIG. 32 shows a block diagram of a UE for use in wireless communication, in accordance with various aspects of the present disclosure.

FIG. 32 shows a block diagram 3200 of a UE 3215 for use in wireless communication, in accordance with various aspects of the present disclosure. The UE 3215 may have various configurations and may be included or be part of a personal computer (e.g., a laptop computer, a netbook computer, a tablet computer, etc.), a cellular telephone, a PDA, a digital video recorder (DVR), an internet appliance, a gaming console, an e-reader, etc. The UE 3215 may, in some examples, have an internal power supply (not shown), such as a small battery, to facilitate mobile operation. In some examples, the UE 3215 may be an example of aspects of one or more of the UEs 115, 2015, 2015-a, 2015-b, 2015-c, 2015-d, 2015-e, 2215, 2215-a, 2215-b, 2215-c, 2315, 2315-a, 2415, 2415-a, 2515, 2515-a, 2615, 2615-a, 2715, or 2715-a described with reference to FIG. 1, 20, 22, 23, 24, 25, 26, or 27, or aspects of one or more of the wireless apparatuses 2915, 3005, or 3115 described with reference to FIG. 29, 30, or 31. The UE 3215 may be configured to implement at least some of the UE or apparatus features and functions described with reference to FIG. 1, 20, 21, 22, 23, 24, 25, 26, 27, 29, 30, or 31.

The UE 3215 may include a UE processor module 3210, a UE memory module 3220, at least one UE transceiver module (represented by UE transceiver module(s) 3230), at least one UE antenna (represented by UE antenna(s) 3240), or a UE wireless communication management module 3260. Each of these components may be in communication with each other, directly or indirectly, over one or more buses 3235.

The UE memory module 3220 may include random access memory (RAM) or read-only memory (ROM). The UE memory module 3220 may store computer-readable, computer-executable code 3225 containing instructions that are configured to, when executed, cause the UE processor module 3210 to perform various functions described herein related to wireless communication, RNTI transmission reception, or interference cancellation based at least in part on an interfering group identifier (e.g., an identifier of an RNTI group). Alternatively, the code 3225 may not be directly executable by the UE processor module 3210 but be configured to cause the UE 3215 (e.g., when compiled and executed) to perform various of the functions described herein.

The UE processor module 3210 may include an intelligent hardware device (e.g., a central processing unit (CPU), a microcontroller, an ASIC, etc.). The UE processor module 3210 may process information received through the UE transceiver module(s) 3230 or information to be sent to the UE transceiver module(s) 3230 for transmission through the UE antenna(s) 3240. The UE processor module 3210 may handle, alone or in connection with the UE wireless communication management module 3260, various aspects of wireless communication for the UE 3215.

The UE transceiver module(s) 3230 may include a modem configured to modulate packets and provide the modulated packets to the UE antenna(s) 3240 for transmission, and to demodulate packets received from the UE antenna(s) 3240. The UE transceiver module(s) 3230 may, in some examples, be implemented as one or more UE transmitter modules and one or more separate UE receiver modules. The UE transceiver module(s) 3230 may support communications in the first radio frequency spectrum band or the second radio frequency spectrum band. The UE transceiver module(s) 3230 may be configured to communicate bi-directionally, via the UE antenna(s) 3240, with one or more of the base stations 105, 2005, 2005-a, 2005-b, 2005-c, 2005-d, 2005-e, 2205, 2205-a, 2305, 2405, 2405-a, 2505, 2505-a, 2605, 2605-a, 2705, or 2705-a described with reference to FIG. 1, 20, 22, 23, 24, 25, 26, or 27, or aspects of one or more of the wireless apparatuses 2805 or 3005 described with reference to FIG. 28 or 30. While the UE 3215 may include a single UE antenna, there may be examples in which the UE 3215 may include multiple UE antennas 3240.

The UE state module 3250 may be used, for example, to manage transitions of the UE 3215 between an RRC idle state and an RRC connected state, and may be in communication with other components of the UE 3215, directly or indirectly, over the one or more buses 3235. The UE state module 3250, or portions of it, may include a processor, or some or all of the functions of the UE state module 3250 may be performed by the UE processor module 3210 or in connection with the UE processor module 3210.

The UE wireless communication management module 3260 may be configured to perform or control some or all of the features or functions described with reference to FIG. 1, 20, 21, 22, 23, 24, 25, 26, 27, 29, 30, or 31 related to wireless communication, including some or all of the features or functions related to RNTI transmission reception or interference cancellation based at least in part on an interfering group identifier (e.g., an identifier of an RNTI group). The UE wireless communication management module 3260, or portions of it, may include a processor, or some or all of the functions of the UE wireless communication management module 3260 may be performed by the UE processor module 3210 or in connection with the UE processor module 3210. In some examples, the UE wireless communication management module 3260 may be an example of the wireless communication management module 2920, 3020, or 3120 described with reference to FIG. 29, 30, or 31.

Figure 33:
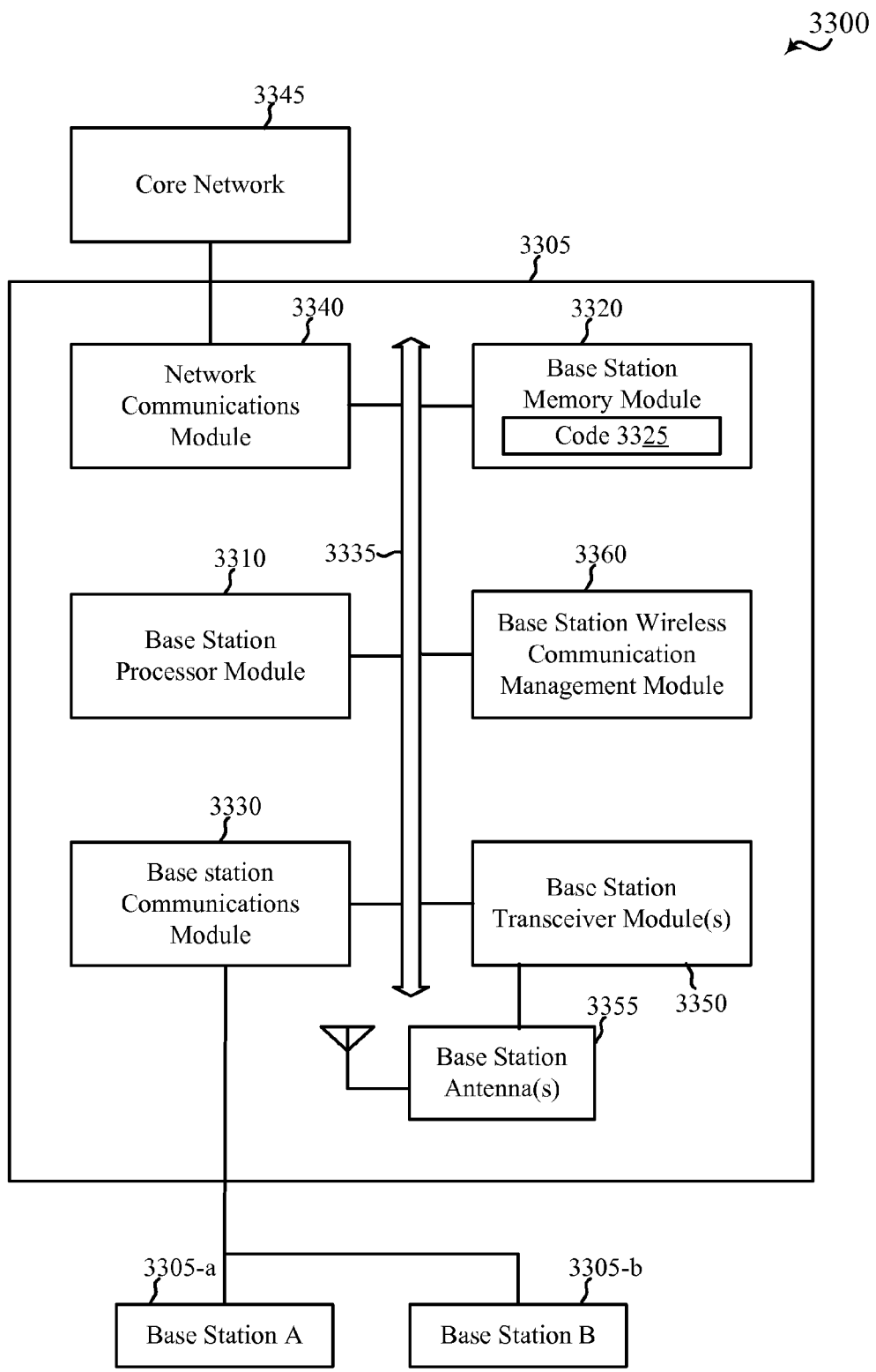
FIG. 33 shows a block diagram of a base station (e.g., a base station forming part or all of an eNB) for use in wireless communication, in accordance with various aspects of the present disclosure.

FIG. 33 shows a block diagram 3300 of a base station 3305 (e.g., a base station forming part or all of an eNB) for use in wireless communication, in accordance with various aspects of the present disclosure. In some examples, the base station 3305 may be an example of aspects of one or more of the base stations 105, 2005, 2005-a, 2005-b, 2005-c, 2005-d, 2005-e, 2205, 2205-a, 2305, 2405, 2405-a, 2505, 2505-a, 2605, 2605-a, 2705, or 2705-a described with reference to FIG. 1, 20, 22, 23, 24, 25, 26, or 27, or aspects of one or more of the wireless apparatuses 2805 or 3005 described with reference to FIG. 28 or 30. The base station 3305 may be configured to implement or facilitate at least some of the base station or device features and functions described with reference to FIG. 1, 20, 21, 22, 23, 24, 25, 26, 27, 28, 30, or 31.

The base station 3305 may include a base station processor module 3310, a base station memory module 3320, at least one base station transceiver module (represented by base station transceiver module(s) 3350), at least one base station antenna (represented by base station antenna(s) 3355), or a base station wireless communication management module 3360. The base station 3305 may also include one or more of a base station communications module 3330 or a network communications module 3340. Each of these components may be in communication with each other, directly or indirectly, over one or more buses 3335.

The base station memory module 3320 may include RAM or ROM. The base station memory module 3320 may store computer-readable, computer-executable code 3325 containing instructions that are configured to, when executed, cause the base station processor module 3310 to perform various functions described herein related to wireless communication, RNTI group management or transmissions, or interference cancellation based at least in part on an interfering group identifier (e.g., an identifier of an RNTI group). Alternatively, the code 3325 may not be directly executable by the base station processor module 3310 but be configured to cause the base station 3305 (e.g., when compiled and executed) to perform various of the functions described herein.

The base station processor module 3310 may include an intelligent hardware device, e.g., a CPU, a microcontroller, an ASIC, etc. The base station processor module 3310 may process information received through the base station transceiver module(s) 3350, the base station communications module 3330, or the network communications module 3340. The base station processor module 3310 may also process information to be sent to the transceiver module(s) 3350 for transmission through the antenna(s) 3355, to the base station communications module 3330, for transmission to one or more other base stations 105-*d* and 105-*e*, or to the network communications module 3340 for transmission to a core network 3345, which may be an example of one or more aspects of the core network 130 described with reference to FIG. 1. The base station processor module 3310 may handle, alone or in connection with the base station wireless communication management module 3360, various aspects of wireless communication for the base station 3305.

The base station transceiver module(s) 3350 may include a modem configured to modulate packets and provide the modulated packets to the base station antenna(s) 3355 for transmission, and to demodulate packets received from the base station antenna(s) 3355. The base station transceiver module(s) 3350 may, in some examples, be implemented as one or more base station transmitter modules and one or more separate base station receiver modules. The base station transceiver module(s) 3350 may support communications in the one or more radio frequency spectrum bands. The base station transceiver module(s) 3350 may be configured to communicate bi-directionally, via the antenna(s) 3355, with one or more UEs or other wireless apparatuses, such as one or more of the UEs 115, 2015, 2015-*a*, 2015-*b*, 2015-*c*, 2015-*d*, 2015-*e*, 2215, 2215-*a*, 2215-*b*, 2215-*c*, 2315, 2315-*a*, 2415, 2415-*a*, 2515, 2515-*a*, 2615, 2615-*a*, 2715, 2715-*a*, or 3215 described with reference to FIG. 1, 20, 22, 23, 24, 25, 26, 27, or 32, or one or more of the apparatuses 2915, 3005, or 3115 described with reference to FIG. 29, 30, or 31. The base station 3305 may, for example, include multiple base station antennas 3355 (e.g., an antenna array). The base station 3305 may communicate with the core network 3345 through the network communications module 3340. The base station 3305 may also communicate with other base stations, such as the base stations 3305-*a* and 3305-*b*, using the base station communications module 3330.

The base station wireless communication management module 3360 may be configured to perform or control some or all of the features or functions described with reference to FIG. 1, 20, 21, 22, 23, 24, 25, 26, 27, 28, 30, or 31 related to wireless communication, including some or all of the features or functions related to RNTI group management or transmissions or interference cancellation based at least in part on an interfering group identifier (e.g., an identifier of an RNTI group). The base station wireless communication management module 3360, or portions of it, may include a processor, or some or all of the functions of the base station wireless communication management module 3360 may be performed by the base station processor module 3310 or in connection with the base station processor module 3310. In some examples, the base station wireless communication management module 3360 may be an example of the wireless communication management module 2820, 3020, or 3120 described with reference to FIG. 28, 30, or 31.

Figure 34:
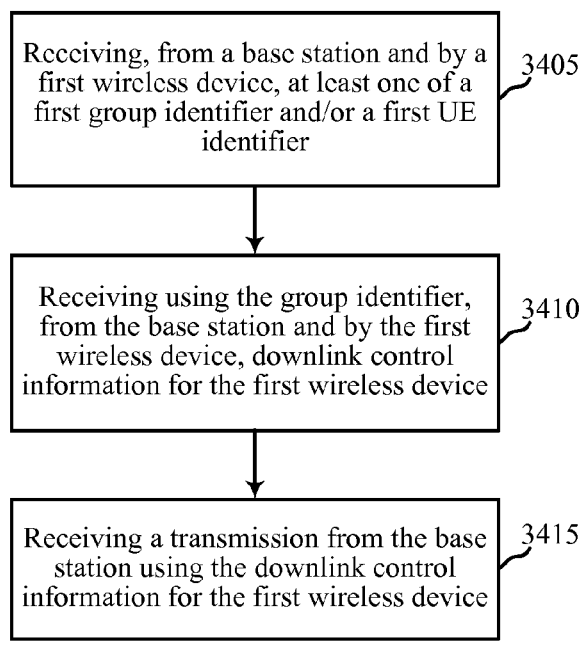
FIG. 34 is a flow chart illustrating an example of a method for wireless communication, in accordance with various aspects of the present disclosure.

FIG. 34 is a flow chart illustrating an example of a method 3400 for wireless communication, in accordance with various aspects of the present disclosure. For clarity, the method 3400 is described below with reference to aspects of one or more of the UEs 115, 2015, 2015-*a*, 2015-*b*, 2015-*c*, 2015-*d*, 2015-*e*, 2215, 2215-*a*, 2215-*b*, 2215-*c*, 2315, 2315-*a*, 2415, 2415-*a*, 2515, 2515-*a*, 2615, 2615-*a*, 2715, 2715-*a*, or 3215, described with reference to FIG. 1, 20-27, or 32, or aspects of the wireless apparatus 2915 described with reference to FIG. 29. In some examples, a UE or wireless apparatus may execute one or more sets of codes to control the functional elements of the UE or wireless apparatus to perform the functions described below. Additionally or alternatively, the UE or wireless apparatus may perform one or more of the functions described below using special-purpose hardware.

At block 3405, the method 3400 may include receiving, from a base station and by a first wireless device (e.g., by a UE), at least one of a first group identifier or a first UE identifier. The first group identifier may be associated with a first group of devices (e.g., an RNTI group) including the first wireless device and at least one other wireless device (e.g., at least a second wireless device). The first UE identifier may be assigned to the first wireless device and may identify the first wireless device within the first group of devices. In some examples, the operation(s) at block 3405 may further include receiving a range of UE identifiers associated with the first group of devices. The range of UE identifiers may include the first UE identifier and at least a second UE identifier. The second UE identifier may identify the second UE. In some examples, the first group identifier, the first UE identifier, or the range of UE identifiers may be received during a random access procedure. In some examples, the first UE identifier may be static or semi-static and may be transmitted from the first wireless device to the base station. The operation(s) at block 3405 may be performed using the wireless communication management module 2920, or 3260, described with reference to FIG. 29, or 32, or the ID management module 2935 described with reference to FIG. 29.

At block 3410, the method 3400 may include receiving, from the base station and by the first wireless device, downlink control information for the first wireless device. In some examples, the downlink control information may be included in a PDCCH or ePDCCH for the first wireless device. In some examples, the downlink control information for the first wireless device may be received using the first group identifier. For example, the downlink control information for the first wireless device may be decoded (e.g., descrambled (e.g., CRC-descrambled)) using the first group identifier. In some examples, the downlink control information for the first wireless device may be received using a deterministic function (e.g., an XOR) of the first group identifier and the first UE identifier. For example, the downlink control information may be decoded (e.g., descrambled (e.g., CRC-descrambled)) based at least in part on a deterministic function of the group identifier and the first UE identifier. The operation(s) at block 3410 may be performed using the wireless communication management module 2920, or 3260 described with reference to FIG. 29 or 32, or the control information processing management module 2940 described with reference to FIG. 29.

In examples in which the downlink control information for a UE is scrambled using the first group identifier, the downlink control information for the first wireless device may reference (e.g., include) the first UE identifier. Inclusion of the first UE identifier, in the downlink control information for the first wireless device, may enable the first wireless device to distinguish the downlink control information for the first wireless device from downlink control information for at least one other wireless device in the first group of devices, and thereby identify the downlink control information for the first wireless device based at least in part on the first UE identifier. For example, the first wireless device may sometimes receive downlink control information for at least one other wireless device in the first group of devices, which downlink control information for the at least one other device may also be decoded using the first group identifier. However, because the downlink control information for the at least one other wireless device does not reference (e.g., include) the first UE identifier, the first wireless device may determine that the downlink control information for the at least one other wireless device is not intended for the first wireless device. In examples in which the downlink control information for a UE is scrambled using a deterministic function (e.g., an XOR) of the first group identifier and a UE identifier, the downlink control information may not include the UE identifier, and the first wireless device may identify the downlink control information for the first wireless device based at least in part on an ability to decode (e.g., descramble (e.g., CRC-descramble)) the downlink control information for the first wireless device.

At block 3415, the method 3400 may include receiving a transmission (e.g., a downlink data transmission, such as a PDSCH) from the base station (e.g., another wireless device) using the downlink control information for the first wireless device. The operation(s) at block 3410 may be performed using the wireless communication management module 2920 or 3260 described with reference to FIG. 29 or 32, or the data processing management module 2945 described with reference to FIG. 29.

In some examples, the method 3400 may further include identifying the transmission from the base station using an RNTI based at least in part on the first UE identifier received at block 3405. In some examples, the RNTI may be based at least in part on a deterministic function (e.g., an XOR) of the first UE identifier and the first group identifier.

In some configurations of the method 3400, the first wireless device may include the first UE 2315 described with reference to FIG. 23, and the base station may include the base station 2305 described with reference to FIG. 23. In these configurations, the downlink control information may in some examples include the downlink control information 2335. Also or alternatively, the downlink data transmission received from the base station may include the first downlink data transmission 2350.

Thus, the method 3400 may provide for wireless communication. It should be noted that the method 3400 is just one implementation and that the operations of the method 3400 may be rearranged or otherwise modified such that other implementations are possible.

Figure 35:
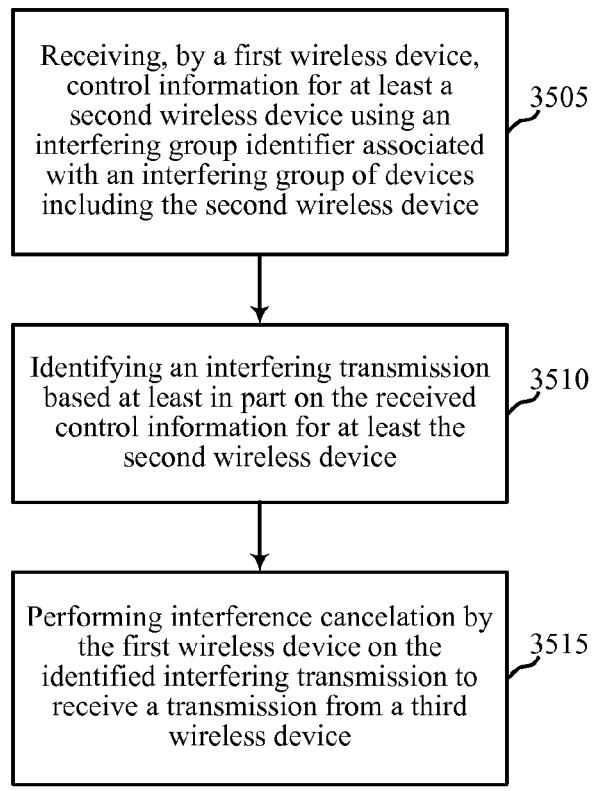
FIG. 35 is a flow chart illustrating an example of a method for wireless communication, in accordance with various aspects of the present disclosure.

FIG. 35 is a flow chart illustrating an example of a method 3500 for wireless communication, in accordance with various aspects of the present disclosure. For clarity, example configurations of the method 3500 are described below with reference to aspects of one or more of the UEs 115, 2015, 2015-*a*, 2015-*b*, 2015-*c*, 2015-*d*, 2015-*e*, 2215, 2215-*a*, 2215-*b*, 2215-*c*, 2315, 2315-*a*, 2415, 2415-*a*, 2515, 2515-*a*, 2615, 2615-*a*, 2715, 2715-*a*, 3215, or 1615 described with reference to FIG. 1, 20-27, 32, or 34, aspects of one or more of the base stations 105, 2005, 2005-*a*, 2005-*b*, 2005-*c*, 2005-*d*, 2005-*e*, 2205, 2205-*a*, 2305, 2405, 2405-*a*, 2505, 2505-*a*, 2605, 2605-*a*, 2705, 2705-*a*, 3305, or 3405 described with reference to FIG. 1, 20, 22, 23, 24, 25, 26, 27, 33, or 34, or aspects of one or more of the wireless apparatuses 3005 or 3115 described with reference to FIG. 30 or 13. In some examples, a UE, base station, or wireless apparatus may execute one or more sets of codes to control the functional elements of the UE, base station, or wireless apparatus to perform the functions described below. Additionally or alternatively, the UE, base station, or wireless apparatus may perform one or more of the functions described below using special-purpose hardware.

At block 3505, the method 3500 may include receiving, by a first wireless device, control information for at least a second wireless device. In some examples, the control information may be received using an interfering group identifier associated with an interfering group of devices. For example, control information for the second wireless device may be decoded (e.g., descrambled (e.g., CRC-descrambled)) using the interfering group identifier. The interfering group of devices may be considered interfering because one or more of the wireless devices in the group may receive or transmit transmissions that interfere with the reception or transmission of transmissions by the first wireless device. The interfering group of devices may include at least the second wireless device. In some examples, the control information may be received in one or more PDCCHs or ePDCCHs containing the control information. The operation(s) at block 3505 may be performed using the wireless communication management module 3020, 3120, 3260, 3360, 3484, or 3486 described with reference to FIG. 30, 31, 32, 33, or 34, or the control information processing management module 3040 or 3140 described with reference to FIG. 30 or 31.

At block 3510, the method 3500 may include identifying an interfering transmission based at least in part on the received control information for at least the second wireless device. The operation(s) at block 3510 may be performed using the wireless communication management module 3020, 3120, 3260, 3360, 1684, or 1686 described with reference to FIG. 30, 31, 32, 33, or 34, the interference determination module 3045 or 3150 described with reference to FIG. 30 or 31, or the data interference determination module 3160 described with reference to FIG. 31.

At block 3515, the method 3500 may include performing interference cancellation by the first wireless device on the identified interfering transmission to receive a transmission from a third wireless device. The operation(s) at block 3515 may be performed using the wireless communication management module 3020, 3120, 3260, 3360, 3484, or 3486 described with reference to FIG. 30, 31, 32, 33, or 34, or the interference cancellation management module 3055 or 3170 described with reference to FIG. 30 or 31.

In some examples, each of the at least second wireless device may include a UE, and each of the at least second wireless device may be assigned a UE identifier that identifies the wireless device within the interfering group of devices (e.g., the second wireless device may be assigned a second UE identifier). In these examples, a base station serving the interfering group of devices may transmit (either proactively or upon request) a range of UE identifiers associated with the interfering group of devices. The range of UE identifiers may include the second UE identifier. The method 3500 may then include the first wireless device receiving the range of UE identifiers (e.g., from the base station serving the interfering group of devices, or from a serving base station of the first wireless device, which serving base station of the first wireless device has already acquired the range of UE identifiers). Receiving, by the first wireless device, control information for at least the second wireless device may then include attempting to receive control information for each of the UEs represented in the range of UE identifiers based at least in part on deterministic functions (e.g., XORs) of the interfering group identifier and ones of the UE identifiers in the range of UE identifiers. For example, control information for the second wireless device may be decoded (e.g., descrambled (e.g., CRC-descrambled)) based at least in part on a deterministic function (e.g., an XOR) of the interfering group identifier and the second UE identifier.

In some examples of the method 3500, the first wireless device may receive the interfering group identifier from a base station. In some examples, the base station may include the third wireless device. In some examples, the first wireless device may receive the interfering group identifier during a random access procedure.

In some examples, the method 3500 may include identifying the transmission from the third wireless device using an RNTI based at least in part on a UE identifier assigned to the first wireless device. In some examples, the method 3500 may include identifying the transmission from the third wireless device using an RNTI based at least in part on a deterministic function (e.g., an XOR) of a UE identifier assigned to the first wireless device and a first group identifier associated with a first group of devices including the first wireless device.

In some examples of the method 3500, receiving the control information for at least the second wireless device may include receiving all downlink control information associated with the interfering group of devices. The downlink control information associated with the interfering group of devices may be received using the interfering group identifier.

In some examples of the method 3500, the control information for the second wireless device may include an identifier assigned to the second wireless device within the interfering group. In some of these examples, the interfering transmission may be identified using an RNTI based at least in part on the identifier assigned to the second wireless device within the interfering group. In other examples, the interfering transmission may be identified based at least in part on a deterministic function of (e.g., an XOR of) the identifier assigned to the second wireless device and the interfering group identifier.

In some examples, the method 3500 may include receiving, with the control information for at least the second wireless device, an indication of whether a legacy device transmission is scheduled for a same subframe as the transmission from the third wireless device or the interfering transmission.

In some configurations of the method 3500, the first wireless device may include the UE 2415 described with reference to FIG. 24, the second wireless device may include the second UE 2415-*a* described with reference to FIG. 24, and the third wireless device may include the first base station 2405 described with reference to FIG. 24. In these configurations, the interfering transmission may in some examples include a downlink data transmission, such as the interfering transmission 2465. Also or alternatively, the transmission received from the third wireless device may include a downlink data transmission, such as the first downlink data transmission 2460.

In some configurations of the method 3500, the first wireless device may include the UE 2515 described with reference to FIG. 25, the second wireless device may include the second UE 2515-*a* described with reference to FIG. 7, and the third wireless device may include the first base station 2505 described with reference to FIG. 25. In these configurations, the interfering transmission may in some examples include a downlink transmission, which downlink transmission may include control information (as in the downlink control information 2535) or data (as in the interfering transmission 2570). Also or alternatively, the transmission received from the third wireless device may include a downlink transmission, which downlink transmission may include control information (as in the downlink control information 2530) or data (as in the first downlink data transmission 2565).

In some configurations of the method 3500, the first wireless device may include the first base station 2605 described with reference to FIG. 26, the second wireless device may include the second UE 2615-*a* described with reference to FIG. 26, and the third wireless device may include the first UE 2615 described with reference to FIG. 26. In these configurations, the interfering transmission may in some examples include a downlink data transmission (e.g., the interfering transmission 2650). Also or alternatively, the transmission received from the third wireless device may include an uplink transmission (e.g., the uplink transmission 2645).

In some configurations of the method 3500, the first wireless device may include the first base station 2705 described with reference to FIG. 27, the second wireless device may include the second UE 2715-*a* described with reference to FIG. 27, and the third wireless device may include the first UE 2715 described with reference to FIG. 27. In these configurations, the interfering transmission may in some examples include an uplink transmission (e.g., the interfering transmission 2750). Also or alternatively, the transmission received from the third wireless device may include an uplink transmission (e.g., the uplink transmission 2745).

In some examples of the method 3500, the first wireless device may perform the method 3400 described with reference to FIG. 34 to receive the transmission from the third wireless device.

Thus, the method 3500 may provide for wireless communication. It should be noted that the method 3500 is just one implementation and that the operations of the method 3500 may be rearranged or otherwise modified such that other implementations are possible.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (WiFi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
receiving a first control channel element for a first user equipment (UE), the first control channel element comprising downlink control information for the first UE and downlink control information for a second UE, wherein the downlink control information for the second UE comprises a duplicated payload of a second control channel element for the second UE;
decoding downlink control information for the first UE and the second UE based at least in part on a group identifier and a UE identifier assigned to the first UE, the group identifier associated with a non-orthogonal multiple access (NOMA) group comprising the first UE and at least the second UE; and
receiving a set of NOMA downlink transmissions at the first UE based at least in part on the downlink control information for the first UE and the second UE.

2. The method of claim 1, wherein the downlink control information is decoded based at least in part on a deterministic function the group identifier and the UE identifier.

3. The method of claim 1, wherein the downlink control information for the first UE references a first UE identifier assigned to the first UE.

4. The method of claim 3, further comprising:
identifying, in the set of NOMA downlink transmissions, a first downlink transmission for the first UE using a first radio network temporary identifier (RNTI) based at least in part on the first UE identifier.

5. The method of claim 4, wherein the first RNTI is based at least in part on a deterministic function of the first UE identifier and the group identifier.

6. The method of claim 1, further comprising:
receiving downlink control information for at least the second UE based at least in part on the group identifier associated with the NOMA group.

7. The method of claim 6, wherein receiving the downlink control information for the second UE comprises:
receiving the downlink control information for the second UE based at least in part on a deterministic function of the group identifier and a second UE identifier assigned to the second UE.

8. The method of claim 1, further comprising:
determining, based at least in part on the downlink control information for the first UE and the downlink control information for the second UE, that an interfering transmission overlaps a downlink transmission for the first UE.

9. The method of claim 8, further comprising:
performing an interference cancellation operation on the interfering transmission based at least in part on the downlink control information for the second UE.

10. The method of claim 9, wherein the downlink control information for at the second UE references a second UE identifier assigned to the second UE, and wherein the interference cancellation operation is performed using a second radio network temporary identifier (RNTI) based at least in part on the second UE identifier.

11. The method of claim 10, wherein the second RNTI is based at least in part on a deterministic function of the second UE identifier and the group identifier.

12. The method of claim 1, wherein receiving the downlink control information for the second UE comprises:
receiving all downlink control information associated with the NOMA group based at least in part on the group identifier.

13. The method of claim 1, further comprising:
receiving the downlink control information for the second UE based at least in part on an indication of the second UE, wherein the downlink control information for the first UE comprises the indication.

14. An apparatus for wireless communication, comprising:
a processor;
memory coupled to the processor, wherein the processor is configured to:
receive a first control channel element for a first user equipment (UE), the first control channel element comprising downlink control information for the first UE and downlink control information for a second UE, wherein the downlink control information for the second UE comprises a duplicated payload of a second control channel element for the second UE;
decode downlink control information for the first UE and the second UE based at least in part on a group identifier and a UE identifier assigned to the first UE, the group identifier associated with a non-orthogonal multiple access (NOMA) group comprising the first UE and at least the second UE; and
receive a set of NOMA downlink transmissions at the first UE based at least in part on the downlink control information for the first UE and the second UE.

15. The apparatus of claim 14, wherein the downlink control information is decoded based at least in part on a deterministic function of the group identifier and the UE identifier.

16. The apparatus of claim 14, wherein the downlink control information for the first UE references a first UE identifier assigned to the first UE.

17. The apparatus of claim 16, wherein the processor is configured to:
identify, in the set of NOMA downlink transmissions, a first downlink transmission for the first UE using a first radio network temporary identifier (RNTI) based at least in part on the first UE identifier.

18. The apparatus of claim 14, wherein the processor is configured to:
receive the downlink control information for the second UE based at least in part on the group identifier and a second UE identifier assigned to the second UE.

19. The apparatus of claim 18, wherein the processor is configured to:
determine, based at least in part on the downlink control information for the first UE and the downlink control information for the second UE, that an interfering transmission overlaps a downlink transmission for the first UE.

20. The apparatus of claim 19, wherein the processor is configured to:
perform an interference cancellation operation on the interfering transmission based at least in part on the downlink control information for the second UE.

21. The apparatus of claim 20, wherein the downlink control information for the second UE references a second UE identifier assigned to the second UE.

22. The apparatus of claim 21, wherein the interference cancellation operation is performed using a second radio network temporary identifier (RNTI) based at least in part on the second UE identifier.

23. The apparatus of claim 14, wherein the processor is configured to:
receive the downlink control information for the second UE based at least in part on an indication of the second UE, wherein the downlink control information for the first UE comprises the indication.

24. The apparatus of claim 22, wherein the second RNTI is based at least in part on a deterministic function of the second UE identifier and the group identifier.

25. An apparatus for wireless communication, comprising:
   means for receiving a first control channel element for a first user equipment (UE), the first control channel element comprising downlink control information for the first UE and downlink control information for a second UE, wherein the downlink control information for the second UE comprises a duplicated payload of a second control channel element for the second UE;
   means for decoding downlink control information for a first user equipment (UE) based at least in part on a group identifier and a UE identifier assigned to the first UE, the group identifier associated with a non-orthogonal multiple access (NOMA) group comprising the first UE and at least the second UE; and
   means for receiving a set of NOMA downlink transmissions at the first UE based at least in part on the downlink control information for the first UE and the second UE.

26. The apparatus of claim 25, wherein the downlink control information is decoded based at least in part on a deterministic function of the group identifier and the UE identifier.

27. The apparatus of claim 25, wherein the downlink control information for the first UE references a first UE identifier assigned to the first UE.

28. The apparatus of claim 25, wherein the means for receiving the downlink control information for the second UE comprises:
   means for receiving the downlink control information for the second UE based at least in part on a deterministic function of the group identifier and a second UE identifier assigned to the second UE.

29. A non-transitory computer-readable medium for storing instructions executable by a processor, comprising:
   instructions to receive a first control channel element for a first user equipment (UE), the first control channel element comprising downlink control information for the first UE and downlink control information for a second UE, wherein the downlink control information for the second UE comprises a duplicated payload of a second control channel element for the second UE;
   instructions to decode downlink control information for the first UE and the second UE based at least in part on a group identifier and a UE identifier assigned to the first UE, the group identifier associated with a non-orthogonal multiple access (NOMA) group comprising the first UE and at least the second UE; and
   instructions to receive a set of NOMA downlink transmissions at the first UE based at least in part on the downlink control information for the first UE and the second UE.

* * * * *